United States Patent
Mondal et al.

(10) Patent No.: US 12,421,918 B1
(45) Date of Patent: Sep. 23, 2025

(54) HIGH-SPEED SHAFT RATING FOR TURBINE ENGINES

(71) Applicant: General Electric Company, Evendale, OH (US)

(72) Inventors: Bhaskar Nanda Mondal, Bengaluru (IN); Narayanan Payyoor, Thrissur (IN); Pranav Kamat, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/060,234

(22) Filed: Feb. 21, 2025

Related U.S. Application Data

(63) Continuation of application No. 18/330,155, filed on Jun. 6, 2023.

(30) Foreign Application Priority Data

Mar. 24, 2023 (IN) .............................. 202311020971

(51) Int. Cl.
*F02K 3/075* (2006.01)
*F02C 3/06* (2006.01)
*F02K 3/06* (2006.01)

(52) U.S. Cl.
CPC ................ *F02K 3/075* (2013.01); *F02C 3/06* (2013.01); *F02K 3/06* (2013.01); *F05D 2200/13* (2013.01);

(Continued)

(58) Field of Classification Search
CPC ............... F02C 3/06; F02K 3/06; F02K 3/075
See application file for complete search history.

(56) References Cited

U.S. PATENT DOCUMENTS

| 5,074,118 A | 12/1991 | Kepler |
| 6,174,130 B1 | 1/2001 | King et al. |

(Continued)

FOREIGN PATENT DOCUMENTS

| CN | 105822366 A | 8/2016 |
| EP | 0742634 A2 | 11/1996 |

(Continued)

OTHER PUBLICATIONS

Rauch, D. Design Study of an Air Pump and Integral Lift Engine ALF-504 Using the Lycoming 502 Core. NASA CR-120,992 (Year: 1972).

(Continued)

*Primary Examiner* — Lorne E Meade
(74) *Attorney, Agent, or Firm* — Venable LLP; Peter T. Hrubiec; Michele V. Frank

(57) ABSTRACT

A turbomachine engine includes an engine core including a high-pressure compressor, a high-pressure turbine, and a combustion chamber in flow communication with the high-pressure compressor and the high-pressure turbine. The engine core has a length ($L_{CORE}$), and the high-pressure compressor has an exit stage diameter ($D_{CORE}$). A high-pressure shaft is coupled to the high-pressure compressor and the high-pressure turbine. The high-pressure shaft is characterized by a high-speed shaft rating (HSR) from 1.5 to 6.2, and a ratio of $L_{CORE}/D_{CORE}$ is from 2.1 to 4.3.

27 Claims, 16 Drawing Sheets

(52) U.S. Cl.
CPC .... *F05D 2200/14* (2013.01); *F05D 2200/211* (2013.01); *F05D 2200/221* (2013.01)

(56) References Cited

U.S. PATENT DOCUMENTS

| | | |
|---|---|---|
| 6,749,518 B2 | 6/2004 | Carrier et al. |
| 6,968,701 B2 | 11/2005 | Glahn et al. |
| 7,217,099 B2 | 5/2007 | Casanova et al. |
| 7,331,757 B2 | 2/2008 | Janssen et al. |
| 8,256,202 B1 | 9/2012 | Paulino |
| 8,511,987 B2 | 8/2013 | Reinhardt et al. |
| 8,596,076 B1 | 12/2013 | Gritton et al. |
| 8,656,584 B2 | 2/2014 | Gabriel et al. |
| 9,464,669 B2 | 10/2016 | Kerr et al. |
| 9,885,242 B2 | 2/2018 | Atkins et al. |
| 10,119,466 B2 | 11/2018 | Schwarz et al. |
| 10,738,648 B2 | 8/2020 | Valencia |
| 11,047,338 B2 | 6/2021 | Dievart et al. |
| 11,073,090 B2 | 7/2021 | Nestico et al. |
| 11,181,046 B1 | 11/2021 | Brooks et al. |
| 11,199,132 B2 | 12/2021 | Diaz et al. |
| 11,203,971 B2 | 12/2021 | Kannangara et al. |
| 11,603,801 B2 | 3/2023 | Payyoor et al. |
| 11,724,813 B2 | 8/2023 | Payyoor et al. |
| 2005/0239562 A1 | 10/2005 | Lin et al. |
| 2006/0034693 A1 | 2/2006 | Lardellier |
| 2008/0113211 A1 | 5/2008 | Bruce et al. |
| 2008/0148708 A1 | 6/2008 | Chou et al. |
| 2010/0113170 A1 | 5/2010 | Schreiber et al. |
| 2012/0257960 A1 | 10/2012 | Reinhardt et al. |
| 2013/0052053 A1 | 2/2013 | Colson et al. |
| 2015/0345504 A1 | 12/2015 | Kadau et al. |
| 2016/0223011 A1 | 8/2016 | Lee et al. |
| 2016/0319670 A1 | 11/2016 | Atkins et al. |
| 2018/0003112 A1 | 1/2018 | Kupratis et al. |
| 2019/0078609 A1 | 3/2019 | Mori et al. |
| 2019/0153978 A1 | 5/2019 | Dievart et al. |
| 2020/0240327 A1 | 7/2020 | Menheere et al. |
| 2021/0108570 A1 | 4/2021 | Bemment |
| 2021/0115811 A1 | 4/2021 | Arakawa et al. |
| 2021/0189956 A1 | 6/2021 | Kannangara et al. |
| 2021/0189971 A1 | 6/2021 | Gaskell et al. |
| 2022/0136434 A1 | 5/2022 | Kannangara et al. |
| 2022/0154597 A1 | 5/2022 | Unton |
| 2022/0373019 A1 | 11/2022 | Payyoor et al. |
| 2023/0136238 A1 | 5/2023 | Payyoor et al. |

FOREIGN PATENT DOCUMENTS

| | | |
|---|---|---|
| EP | 2842911 A1 | 3/2015 |
| FR | 3127024 A1 | 3/2023 |
| FR | 3127025 A1 | 3/2023 |
| JP | 2019065834 A | 4/2019 |

OTHER PUBLICATIONS

Rotating Equipment Solutions. Shaft Length to Diameter Ratio (L/D)- Api 617 Centrifugal Compressor Selection. https://www.linkedin.com/pulse/shaft-length-diameter-ratio-Id-api-617-centrifugal-solutions/ Dec. 21, 2020 (Year: 2020).

Jane's Aero-Engines, Issue Seven, Edited by Bill Gunston, Jane's Information Group Inc., Alexandria, Virginia, 2000, pp. 1-47, 61, 465-512. (Year: 2000).

Dalton, III, W.N., "Ultra High Bypass Ratio Low Noise Engine Study", NASA/CR-2003-212523, National Aeronautics and Space Administration, Glenn Research Center, Nov. 2003, pp. 1-187. (Year: 2003).

Warwick, G., "Civil Engines: Pratt & Whitney gears up for the future with GTF", Flight International, Nov. 2007, accessed on Jul. 17, 2015 at http://www.flightglobal.com/news/articles/civil-engines-pratt-amp-whitney-gears-up-for-the-future-with-gtf. (Year: 2007).

Wemming, H., "Validation and Integration of a Rubber Engine Model into an MDO Environment", Linkoping University, Sweden, 2010, pp. 1-90. (Year: 2010).

Read, Bill, "Powerplant Revolution", Aerospace, May 2014, pp. 28-31. (Year: 2014).

Coy, Peter, "The Little Gear That Could Reshape the Jet Engine", Bloomberg Business, Oct. 15, 2015, pp. 1-4 [accessed on Nov. 10, 2015 at http://www.bloomberg.com/news/articles/2015-10-15/pratt-s-purepower-gtf-jet engine- innovation-took-almost-30-years] (Year: 2015).

Soares, Claire, "Gas Turbines A Handbook of Air, Land and Sea Applications", Butterworth-Heinemann, an imprint of Elsevier Inc., 2008, pp. 398-400. (Year: 2008).

Hepher, T., "The 'great engine game' behind new Boeing jet project", Reuters, Feb. 19, 2016 (Year: 2016).

Gray D. E. et al.,: "Energy Efficient Engine Program Technology Benefit/ Cost Study, vol. 2", NASA Contractor Report, NASA, Washington, DC, US vol. 2 Oct. 1, 1983 (Oct. 1, 1983), pp. 1-118, XP009502192, ISSN: 0565-7059 Retrieved from the Internet: URL:https://ntrs.nasa.gov/search.jsp?R=19900019249.

TCDS No. E17NE retrieved from drs.faa.gov/search (Year: 2014).

Extended European Search Report issued in related European Patent Application No. 23182738.7 dated Dec. 18, 2023.

HIGH-SPEED SHAFT RATING FOR TURBINE ENGINES

CROSS REFERENCE TO RELATED APPLICATIONS

This application is a continuation of U.S. patent application Ser. No. 18/330,155 filed on Jun. 6, 2023, which claims the benefit of Indian Patent Application No. 202311020971, filed on Mar. 24, 2023, the entire contents of which are hereby incorporated by reference in their entireties.

TECHNICAL FIELD

The present disclosure relates generally to engine cores for turbine engines.

BACKGROUND

A turbofan engine, or turbomachinery engine, includes one or more compressors, and a power turbine (also referred to as a low-pressure turbine) that drives a bypass fan. The bypass fan is coupled to the power turbine via a turbomachine shaft. The turbomachinery engine also includes an engine core comprising a high-pressure compressor, a combustor, and a high-pressure turbine. The high-pressure compressor is coupled to the high-pressure turbine via a high-pressure shaft.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 8 depicts a ratio of the length of the engine core to the diameter of the engine core ($L_{CORE}/D_{CORE}$) as a function of a first high-speed shaft operating parameter ($HSP_X$) given by relationship (5) detailed below.

DETAILED DESCRIPTION

Figure 1:
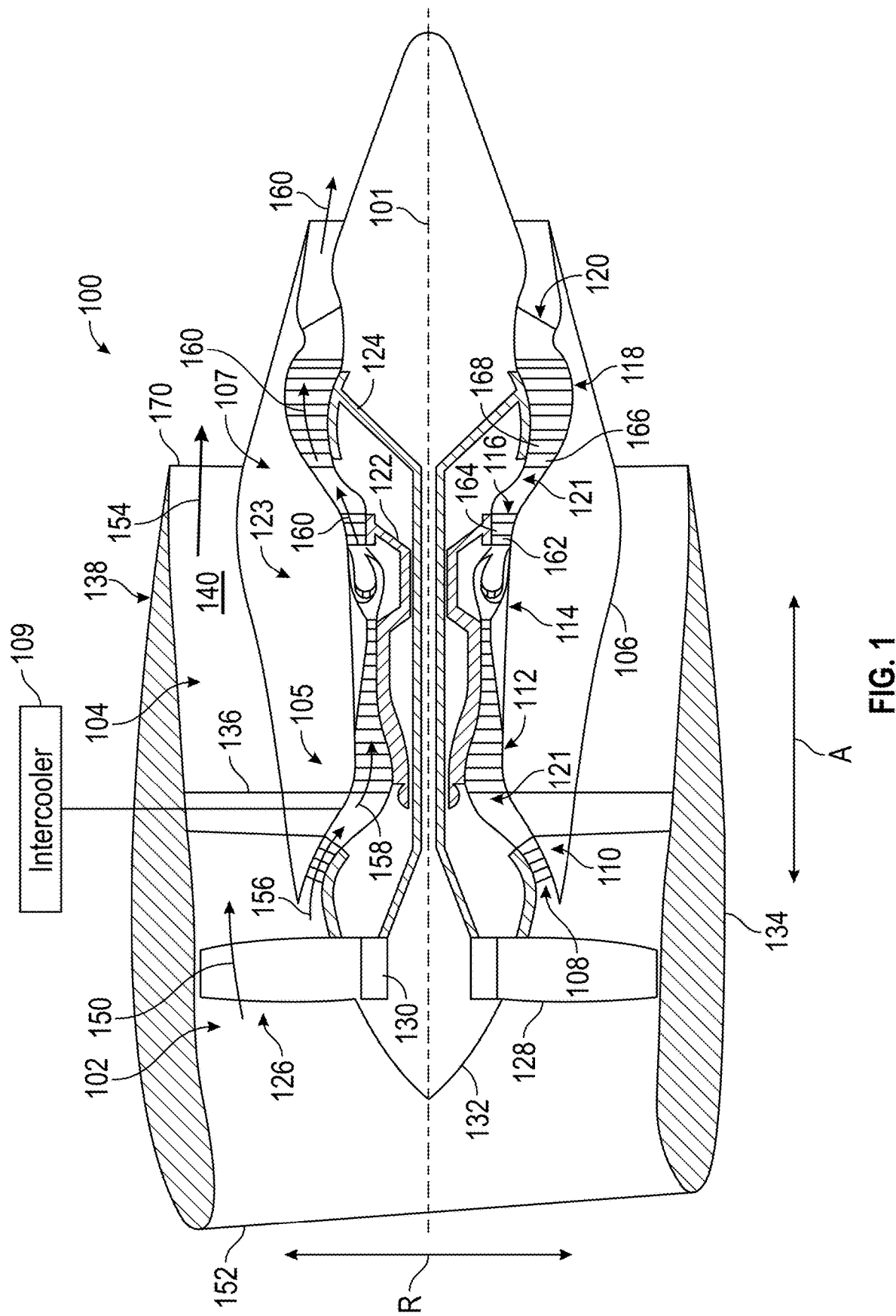
FIG. 1 is a schematic, cross-sectional diagram of a turbine engine, taken along a longitudinal centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed" component defines a component configured to operate at a rotational speed, such as a maximum allowable rotational speed, which is lower than that of a "high-speed" component of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a longitudinal centerline of the turbine engine. Moreover, the terms "radial" and "radially" refer to directions and orientations that extend substantially perpendicular to the longitudinal centerline of the turbine engine. In addition, as used herein, the terms "circumferential" and "circumferentially" refers to directions and orientations that extend arcuately about the longitudinal centerline of the turbine engine.

As used herein, "overall pressure ratio (OPR)" of a compressor is a ratio of the pressure at the exit of the compressor to the pressure at the inlet of the compressor.

As used herein, "redline speed" means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second. For a gas turbine engine that has a high-speed shaft and a low-speed shaft, both the high-speed shaft and the low-speed shaft have redline speeds, The redline speeds of the shafts are typically reported in an engine Type Certificate Data Sheet (TCDS). Alternatively, redline speeds can be referred to as maximum permissible shaft speed at take-off flight conditions (e.g., over a 5 minute duration).

As used herein, "critical speed" means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence, instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, "critical frequency" and "fundamental frequency" are referred to interchangeably and refer to the fundamental, or natural frequency, of the first-order bending mode of the shaft.

The term "subcritical speed" refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical, the shaft is more stable than when rotating at a critical speed. A "subcritical shaft" is a shaft that has a redline speed below the critical speed of the shaft.

The term "supercritical speed" refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since the fundamental mode of the shaft is below the redline speed. A "supercritical shaft" is a shaft that has a redline speed above the critical speed of the shaft.

As used herein, "bypass ratio" is a ratio between the mass flow rate of air drawn through the fan that goes around the core engine (e.g., the turbomachine) to the mass flow rate of the air that enters the core engine. In other words, the bypass ratio is the ratio of air that bypasses the core engine to the air that passes into the core engine.

As used herein, the term "ceramic matrix composite" ("CMC") refers to a subgroup of composite materials and a subgroup of ceramics. The terms "CMC" and "CMC material" are used interchangeably herein. When the engine component (e.g., the higher pressure turbine module, nozzle, or blades thereof) comprises or includes "CMC" or "CMC material," the engine component may include one of, or combinations of one or more of the ceramic matrix composite materials described herein. Such engine component may also include non-ceramic matrix composite materials, such as a metal alloy (e.g., a CMC material for an airfoil and a separate disk with a dovetail slot made from a metal alloy). Reference to a "first" or a "second" or a "third" CMC material does not preclude the materials from including multiple CMC materials, different CMC materials, or the same CMC materials.

More specifically, CMC refers to a class of materials that includes a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting the preform with a liquid resin or polymer followed by a thermal processing step to fill the voids with silicon carbide. CMC material as used herein may be formed using any known methods or hereafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbomachinery engine, also referred to as a turbine engine, a gas turbine engine, a turboprop engine, or a turbomachine. These turbomachinery engines can be applied across various technologies and industries. Various embodiments may be described herein in the context of aeronautical engines and aircraft machinery.

In some instances, a turbomachinery engine is configured as a direct drive engine. In other instances, a turbomachinery engine can be configured as an indirect drive engine with a gearbox. In some instances, a propulsor of a turbomachinery engine can be a fan encased within a fan case and/or a nacelle. This type of turbomachinery engine can be referred to as "a ducted engine." In other instances, a propulsor of a turbomachinery engine can be exposed (e.g., not within a fan case or a nacelle). This type of turbomachinery engine can be referred to as "an open rotor engine" or an "unducted engine," and includes, but is not limited to, ducted variable pitch fan configuration, counter rotating turbine/compressor configurations with a plurality of LP shafts connecting the compressors and the fan to the respective turbines and the engine core concentrically enveloping the plurality of LP shafts; and/or configurations with a reverse core in which the LP shafts do not concentrically pass through engine core.

A turbofan engine, or turbomachinery engine, includes a core engine and a power turbine that drives a bypass fan. The bypass fan generates the majority of the thrust of the turbofan engine. The generated thrust can be used to move a payload (e.g., an aircraft). A turbomachine shaft coupled to the power turbine and fan (either directly or through a gearbox) can experience vibrations during operation of the engine. For example, when the shaft rotates at the critical speed of the shaft, the shaft will vibrate excessively. The excessive vibration is due primarily to excitation of a first-order beam bending mode of the shaft. Thus, the shaft may be characterized by a first-order beam bending mode of the shaft, the fundamental resonance frequency (fundamental frequency) of this mode, and the critical speed of rotation of the shaft. If the first-order bending mode may be excited by a low-speed shaft rate occurring during a standard operating range of the engine, undetected vibration, as well as an increased risk of whirl instability, may result.

Newer engine architectures may be characterized by higher bypass ratio (e.g., greater than 8.0, greater than 10.0, or greater than 12.0) engine designs to improve overall efficiency of the engine in converting kinetic energy to mechanical energy in the form of propulsion. For example, the bypass ratio is greater than 8.0 for engine thrust class of less than 20,000 lbf, greater than 10.0 for engine thrust class of about 20,000 lbf, and greater than 12.0 for engine thrust class of greater than 30,000 lbf. Typically, the fan size is increased to achieve the higher bypass ratios and the low-pressure (LP) shaft that couples the LP turbine and the LP compressor is also increased to accommodate the larger fan sizes. The increase in the LP shaft, however, results in lower shaft speeds and lower overall power through the LP shaft to the fan. Additionally, the engine core (e.g., the high-pressure compressor, the combustor, and the high-pressure turbine) needs to fit within a smaller space as the bypass ratios are increased. These trends can result in reductions in stiffness-to-weight ratio for the shaft and structure that influences dynamics of the HP shaft. For example, with the higher bypass ratio engines, the flow size (e.g., mass flow rate) to the engine core decreases. Typically, the size (e.g., length and diameter) of the HP shaft is scaled down to accommodate the decreased flow size in order to decrease the overall size of the engine core (e.g., smaller engine core). However, components of the engine core (e.g., the blades, the vanes or the nozzles, the axial gaps between the blades and the vanes or the nozzles and/or the combustor) are unable to be scaled down to achieve the smaller engine core while maintaining the desired thrust for a particular engine thrust class.

The length of the engine core and the diameter of the engine core each affect the dynamics of the HP shaft. For example, the HP shaft dynamics is dependent on the engine core length to diameter ratio ($L_{CORE}/D_{CORE}$). Higher $L_{CORE}/D_{CORE}$ values result in reduced margins for Alford stability (e.g., a fundamental/first bending mode that is an excitation due to clearance changes around the periphery of the HP rotor) and for the third mode (e.g., an S-shaped bending mode that occurs at redline speeds) of the HP shaft. In particular, as the $L_{CORE}/D_{CORE}$ value increases, the Alford margin and the third mode margin decreases, thereby, lowering the maximum allowable redline speeds at which the HP shaft may rotate before experiencing instability due to Alford forces and/or excessive excitation of the third mode.

Typically, the decreased Alford margin and the third mode margin are mitigated by increasing the radius ratio (e.g., a ratio of the hub radius to the tip radius) of the HP compressor (e.g., increasing diameter of the HP compressor) and reducing the HP compressor stage count (e.g., resulting in a reduced engine core length). However, this results in poorer aerodynamic performance of the HP compressor and/or of the HP turbine (e.g., higher tip clearance to blade height ratios), increased weight of the engine core (e.g., and of the overall engine), and a reduced overall pressure ratio (OPR) due to lower pressure ratio from the HP compressor. To enable higher OPRs, the pressure ratio is transferred to a booster (e.g., low-pressure compressor), resulting in increased HP compressor inlet temperatures (e.g., also referred to as T25). This causes higher HP shaft redline speeds (e.g., for similar inlet corrected flow conditions), thereby decreasing the Alford margin and the third mode margin. Increasing the HP shaft length also increases the LP shaft length to accommodate the longer HP shaft. Further, the higher HP shaft redline speed and the smaller engine core diameter restricts the LP shaft diameter (e.g., reduced core bearing diameters due to DN limits (e.g., DN is the product of diameter (D) in mm and speed (N) in RPM and is used to determine the correct lubricant viscosity for a particular bearing), reduced HP disk bore diameters, etc.), thereby limiting the design space for subcritical shaft designs or a feasible diameter for the LP shaft to support the required torque. For example, as the shaft speeds increase, the bearings that support the HP shaft have to be decreased in diameter to accommodate the faster shaft speeds and smaller core size. This puts a constraint on the diameter of the LP shaft, thereby affecting the dynamics of the LP shaft.

Thus, a balance is ultimately struck (penalties vs. benefits) to maintain or to enhance engine performance (e.g., by increasing the bypass ratio), while also enabling an increase in the redline speed of the HP shaft, or not lowering the critical speed, e.g., add one or two additional stages to a compressor to increase efficiency, to allow for smaller engine cores and higher bypass ratio engines without operating at instabilities due to Alford forces or the third bending mode of the HP shaft.

As part of this effort, the inventors evaluated the influence of changes in size of the core, and resulting impact that these modifications have on the dynamics of the high-speed shaft, the low-speed shaft, and the interaction between these two shafts as can occur through dynamic excitation transmitted through shaft bearings. Thus, the inventors, as part of their investigation and evaluation of different engine architectures, considered how the dynamics of the HP shaft might change when the engine core changes in size and weight, in response to a need to operate at higher bypass ratios.

Different approaches for engine types, midshaft geometry, bearing support, and material compositions are needed for next-generation turbomachine engines, to permit high-speed operation without resulting in an unstable bending mode and Alford stability, and, therefore, vibrations during regular operation. The inventors, tasked with finding a suitable design to meet these requirements while lowering vibrations, or at least maintaining a tolerable vibration environment during flight conditions (e.g., takeoff or max thrust), conceived of and tested a wide variety of shafts and HP compressor geometries having different combinations of HP inlet temperature, HP pressure ratio, shaft length, shaft diameter, HP compressor inlet size, and HP compressor exit size in order to determine which embodiment(s) were most promising for a variety of contemplated engine designs, including different engine core sizes for different sized high-pressure compressors and high-pressure turbines. The various embodiments, as described herein including illustrated examples for both a ducted fan configuration and an open fan configuration of a gas turbine engine, include turbomachine shafts that employ one or more of the above-mentioned techniques to increase the maximum allowable redline speed of the HP shaft and/or to maintain a design speed for improved efficiency while mitigating or avoiding instability due to Alford forces and/or excessive excitation of the HP shaft third mode.

Referring now to the drawings, FIG. 1 is a schematic cross-sectional diagram of a turbine engine 100, taken along a longitudinal centerline axis 101 of the turbine engine 100, according to an embodiment of the present disclosure. For the embodiment depicted in FIG. 1, the turbine engine 100 is a high bypass ratio turbofan engine. The turbine engine 100 has an axial direction A (extending parallel to the longitudinal centerline axis 101 provided for reference) and a radial direction R that is normal to the axial direction A. In general, the turbine engine 100 includes a fan section 102 and a turbomachine 104 disposed downstream from the fan section 102. The terms "gas turbine engine," "turbomachine engine," "turbomachinery engine," and "turbine engine" are used interchangeably herein.

The turbomachine 104 depicted generally includes an outer casing 106 that is substantially tubular and defines an inlet 108. In this embodiment, the inlet 108 is annular. As schematically shown in FIG. 1, the outer casing 106 encases, in serial flow relationship, a compressor section 105 including a booster or a low-pressure (LP) compressor 110 followed downstream by a high-pressure (HP) compressor 112, a combustion section 114, a turbine section 107 including a high-pressure (HP) turbine 116 followed downstream by a low-pressure (LP) turbine 118, and a jet exhaust nozzle section 120. The LP turbine 118 is also referred to as a power turbine. The compressor section 105, the combustion section 114, the turbine section 107, and the jet exhaust nozzle section 120 together define a core air flowpath 121. A high-pressure (HP) shaft 122 (also referred to as a high-speed shaft) drivingly connects the HP turbine 116 to the HP compressor 112 to rotate the HP turbine 116 and the HP compressor 112 in unison. Together, the HP compressor 112, the combustion section 114, and the HP turbine 116 define an engine core 123 of the turbine engine 100. A low-pressure (LP) shaft 124 (also referred to as a low-speed shaft) drivingly connects the LP turbine 118 to the LP compressor 110 to rotate the LP turbine 118 and the LP compressor 110 in unison. In this way, the turbine engine 100 is a two-spool gas turbine engine.

In some embodiments, the turbine engine 100 includes an intercooler 109. The intercooler 109 cools the engine flow path air downstream of the LP compressor 110 before the engine flow path air enters the HP compressor 112 during flight conditions (e.g., takeoff or maximum thrust). The intercooler 109 can include any type of intercooler. For example, the intercooler 109 can include a heat exchanger in the inter-compressor frame or inter-compressor casing (e.g., in the outer casing 106) in which cooling fluid is used to absorb heat with the flow path air. The cooling fluid can include a thermal bus or fuel. The thermal bus can absorb heat from the core air and reject the heat into a heat sink, such as, for example, fuel and/or bypass air. In some embodiments, the intercooler 109 can include a heat exchanger between the core air and the bypass air. In some embodiments, the intercooler 109 includes water or steam that is injected into the core flow path at the inter-compressor frame. While the intercooler 109 is described in relation to FIG. 1, any of the turbine engines detailed herein can include an intercooler 109.

For the embodiment depicted in FIG. 1, the fan section 102 includes a fan 126 having a plurality of fan blades 128 coupled to a disk 130 in a spaced apart manner. As depicted in FIG. 1, the fan blades 128 extend outwardly from the disk 130 generally along the radial direction R. In some embodiments, each fan blade 128 is rotatable relative to the disk 130 about a pitch axis such that the pitch of the plurality of fan blades 128 can be collectively varied in unison. The plurality of fan blades 128 and the disk 130 are together rotatable about the longitudinal centerline axis 101 by the LP shaft 124. In this way, the turbine engine 100 is considered a direct drive turbine engine. The disk 130 is covered by a rotatable fan hub 132 aerodynamically contoured to promote an airflow through the plurality of fan blades 128. In addition, the fan section 102 includes an annular fan casing or a nacelle 134 that circumferentially surrounds the fan 126 and/or at least a portion of the turbomachine 104. The nacelle 134 is supported relative to the turbomachine 104 by a plurality of circumferentially spaced outlet guide vanes 136. Moreover, a downstream section 138 of the nacelle 134 extends over an outer portion of the turbomachine 104 to define a bypass airflow passage 140 therebetween. In this way, the turbine engine 100 is considered a ducted fan engine.

During operation of the turbine engine 100, a volume of air 150 enters the turbine engine 100 through an inlet 152 of the nacelle 134 and/or the fan section 102. As the volume of air 150 passes across the plurality of fan blades 128, a first portion of air 154 is directed or routed into the bypass airflow passage 140, and a second portion of air 156 is directed or is routed into the upstream section of the core air flowpath 121, or, more specifically, into the inlet 108 of the LP compressor 110. The ratio between the first portion of air 154 and the second portion of air 156 is commonly known as a bypass ratio. The turbine engine 100 has a high bypass ratio (e.g., greater than 8.0, greater than 10.0, or greater than 12.0), as detailed further below. The pressure of the second portion of air 156 is then increased, forming compressed air 158, and the compressed air 158 is routed through the HP compressor 112 and into the combustion section 114, where the compressed air 158 is mixed with fuel and burned to provide combustion gases 160.

The combustion gases 160 are routed into the HP turbine 116 and expanded through the HP turbine 116 where a portion of thermal and/or of kinetic energy from the combustion gases 160 is extracted via sequential stages of HP turbine stator vanes 162 that are coupled to the outer casing 106 and HP turbine rotor blades 164 that are coupled to the HP shaft 122, thus, causing the HP shaft 122 to rotate, thereby supporting operation of the HP compressor 112. The combustion gases 160 are then routed into the LP turbine 118 and expanded through the LP turbine 118. Here, a second portion of thermal and kinetic energy is extracted from the combustion gases 160 via sequential stages of LP turbine stator vanes 166 that are coupled to the outer casing 106 and LP turbine rotor blades 168 that are coupled to the LP shaft 124, thus, causing the LP shaft 124 to rotate, thereby supporting operation of the LP compressor 110 and rotation of the fan 126 via LP shaft 124.

The combustion gases 160 are subsequently routed through the jet exhaust nozzle section 120 of the turbomachine 104 to provide propulsive thrust. Simultaneously, the pressure of the first portion of air 154 is substantially increased as the first portion of air 154 is routed through the bypass airflow passage 140 before being exhausted from a fan nozzle exhaust section 170 of the turbine engine 100, also providing propulsive thrust.

The turbine engine 100 depicted in FIG. 1 is by way of example only. In other exemplary embodiments, the turbine engine 100 may have any other suitable configuration. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, a turbine engine may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, the turbine engine 100 can include a counter rotating LP shaft architecture in which two shafts of the turbine engine 100 rotate in opposite directions.

Figure 2:
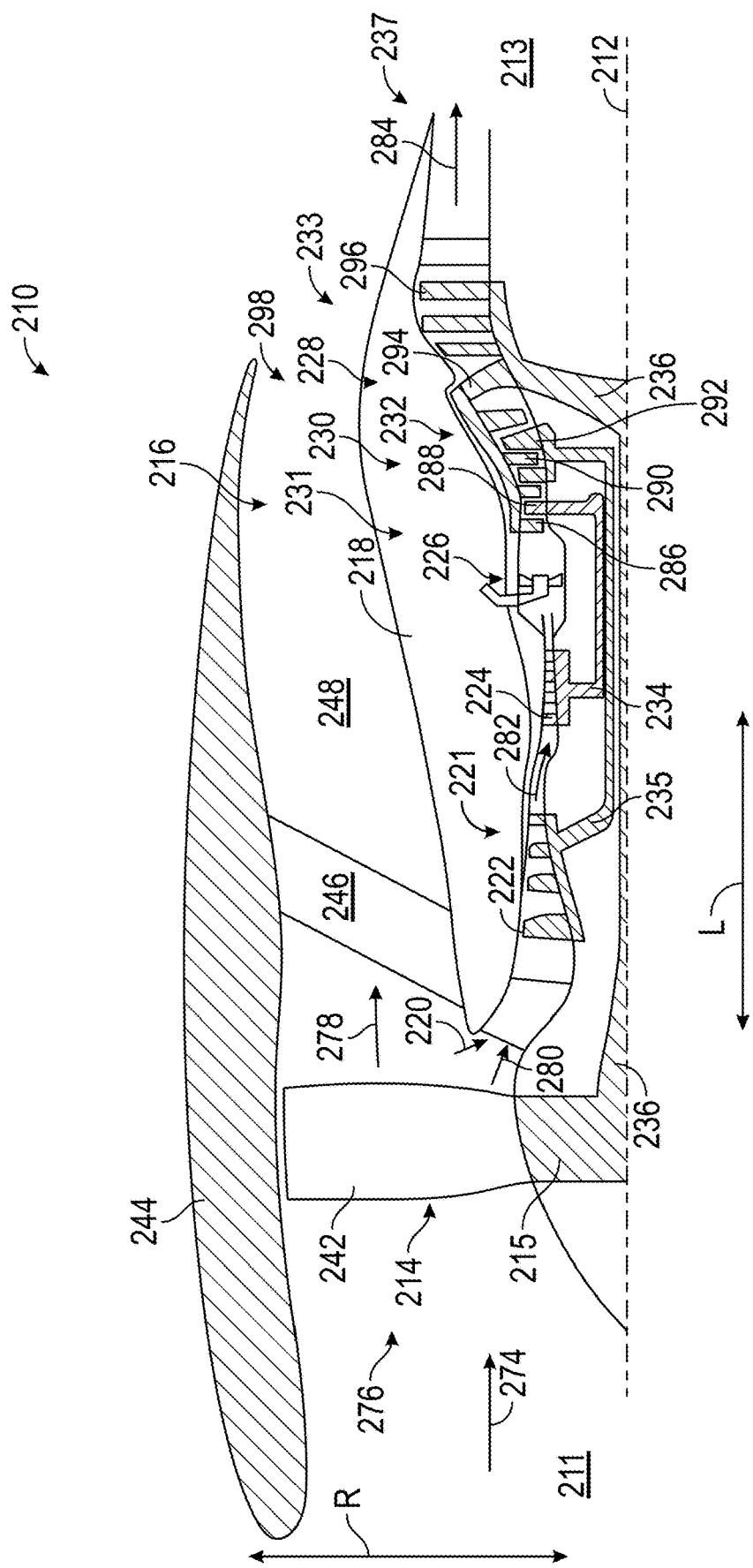
FIG. 2 is a schematic, cross-sectional diagram of a turbine engine, taken along a longitudinal centerline axis of the turbine engine, according to another embodiment of the present disclosure.

FIG. 2 is a schematic cross-sectional diagram of a turbine engine 210, taken along a longitudinal centerline axis 212 of the turbine engine 210, according to an embodiment of the present disclosure. The turbine engine 210 is similar in some respects to the turbine engine 100 discussed above with respect to FIG. 1. The turbine engine 210, however, is a three-spool turbine engine, as detailed further below. For the embodiment depicted in FIG. 2, the turbine engine 210 is a high bypass ratio turbofan engine. The turbine engine 210 has an axial direction A (extending parallel to the longitudinal centerline axis 212 provided for reference) and a radial direction R that is normal to the axial direction A. The turbine engine 210 extends from a forward end 211 to an aft end 213 along the axial direction A. The forward end 211 is upstream of the aft end 213. In general, the turbine engine 210 includes a fan section 214 and a turbomachine 216 disposed downstream from the fan section 214.

The turbine engine 210 include a substantially tubular, outer casing 218 that defines an inlet 220. The inlet 220 is annular. The outer casing 218 encases, in serial flow arrangement, a compressor section 221 including an intermediate-pressure (IP) compressor 222 followed downstream by a high-pressure (HP) compressor 224, a combustion section 226, and a turbine section 228 including a high-pressure (HP) turbine 230 followed downstream by an intermediate-pressure (IP) turbine 232, a low-pressure (LP) turbine 233, and a jet exhaust nozzle section 237. The LP turbine 233 is also referred to as a power turbine. A high-pressure (HP) shaft 234 (also referred to as a high-speed shaft) drivingly connects the HP turbine 230 to the HP compressor 224 to rotate the HP turbine 230 and the HP compressor 224 in unison. Together, the HP compressor 224, the combustion section 226, and the HP turbine 230 define an engine core 231 of the turbine engine 210. An intermediate-pressure (IP)

shaft 235 (also referred to as an intermediate-speed shaft) drivingly connects the IP turbine 232 to the IP compressor 222 to rotate the IP turbine 232 and the IP compressor 222 in unison. A low-pressure (LP) shaft 236 (also referred to as a low-speed shaft) drivingly connects the LP turbine 233 to the fan section 214 to rotate the LP turbine 233 and the plurality of fan blades 242 in unison. In this way, the turbine engine 210 is a three-spool turbine engine.

The fan section 214 further includes or defines one or more stages of a plurality of fan blades 242 that are coupled to and extend outwardly in the radial direction R from a fan shaft 215 and/or from the LP shaft 236. The plurality of fan blades 242 are rotatable about the longitudinal centerline axis 212 by the LP shaft 236. In this way, the turbine engine 210 is considered a direct drive turbine engine. An annular fan casing or a nacelle 244 circumferentially surrounds at least a portion of the fan section 214 and/or at least a portion of the outer casing 218. The nacelle 244 is supported relative to the outer casing 218 by a plurality of outlet guide vanes 246 that are circumferentially spaced about the outer casing 218. At least a portion of the nacelle 244 extends over an outer portion (in radial direction R) of the outer casing 218 so as to define a bypass airflow passage 248 therebetween. In this way, the turbine engine 210 is considered a ducted fan engine.

The turbine engine 210 of FIG. 2 operates in a similar manner as the turbine engine 100 of FIG. 1. During operation of the turbine engine 210, a volume of air 274 enters the turbine engine 210 through an inlet 276 of the nacelle 244 and/or the fan section 214. As the volume of air 274 passes across the plurality of fan blades 242, a first portion of air 278 is directed or routed into the bypass airflow passage 248, and a second portion of air 280 is directed or is routed into the upstream section of the turbomachine 216, or, more specifically, into the inlet 220. The ratio between the first portion of air 278 and the second portion of air 280 is commonly known as a bypass ratio. The turbine engine 210 has a high bypass ratio (e.g., greater than 8.0, greater than 10.0, or greater than 12.0), as detailed further below. The pressure of the second portion of air 280 is then increased through the IP compressor 222, forming compressed air 282, and the compressed air 282 is routed through the HP compressor 224 and into the combustion section 226, where the compressed air 282 is mixed with fuel and burned to provide combustion gases 284.

The combustion gases 284 are routed into the HP turbine 230 and expanded through the HP turbine 230 where a portion of thermal and/or of kinetic energy from the combustion gases 284 is extracted via sequential stages of HP turbine stator vanes 286 that are coupled to the outer casing 218 and HP turbine rotor blades 288 that are coupled to the HP shaft 234, thus, causing the HP shaft 234 to rotate, thereby supporting operation of the HP compressor 224. The combustion gases 284 are then routed into the IP turbine 232 and expanded through the IP turbine 232. Here, a second portion of thermal and kinetic energy is extracted from the combustion gases 284 via sequential stages of IP turbine stator vanes 290 that are coupled to the outer casing 218 and IP turbine rotor blades 292 that are coupled to the IP shaft 235, thus, causing the IP shaft 235 to rotate, thereby supporting operation of the IP compressor 222. The combustion gases 284 are then routed into the LP turbine 233 and expanded further through the LP turbine 233. Here, a third portion of thermal and kinetic energy is extracted from the combustion gases 284 via sequential stages of LP turbine stator vanes 294 that are coupled to the outer casing 218 and LP turbine rotor blades 296 that are coupled to the LP shaft 236, thus, causing the LP shaft 236 to rotate, thereby supporting operation and rotation of the fan section 214 via the LP shaft 236.

The combustion gases 284 are subsequently routed through the jet exhaust nozzle section 237 of the turbomachine 216 to provide propulsive thrust. Simultaneously, the pressure of the first portion of air 278 is substantially increased as the first portion of air 278 is routed through the bypass airflow passage 248 before being exhausted from a fan nozzle exhaust section 298 of the turbine engine 210, also providing propulsive thrust.

The turbine engine 210 depicted in FIG. 2 is by way of example only. In other exemplary embodiments, the turbine engine 210 may have any other suitable configuration, as detailed above with respect to FIG. 1.

Figure 3:
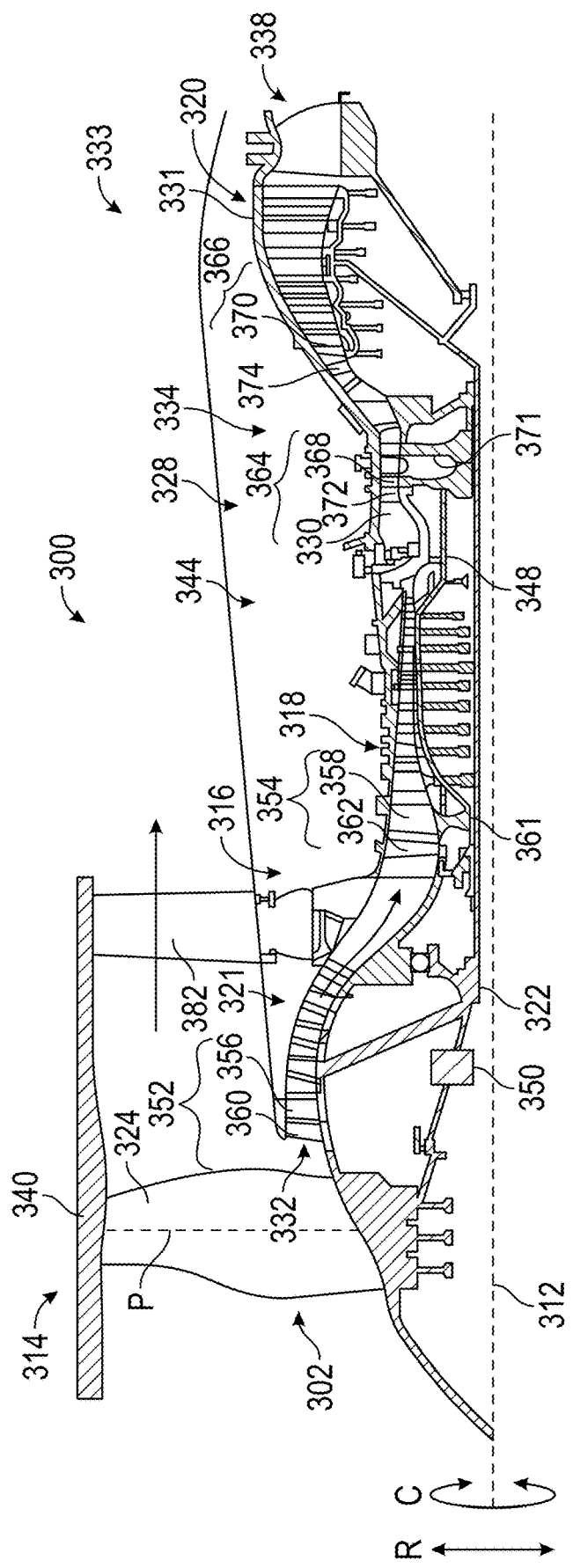
FIG. 3 is a schematic, cross-sectional view of a ducted, indirect-drive, turbine engine, taken along a longitudinal centerline axis of the turbine engine, according to an embodiment of the present disclosure.

FIG. 3 shows a schematic, cross-sectional view of a ducted, indirect-drive, turbine engine 300, taken along a longitudinal centerline axis 312 of the turbine engine 300, according to an embodiment of the present disclosure. The turbine engine 300 is similar in some respects to the turbine engine 100 discussed above with respect to FIG. 1.

As shown in FIG. 3, the turbine engine 300 includes, in downstream serial flow relationship, a fan section 314 including a fan 302, a compressor section 316 including a booster or a low-pressure (LP) compressor 321 and a high-pressure (HP) compressor 318, a combustion section 328 including a combustor 330, a turbine section 333 including an HP turbine 334 and an LP turbine 320, and an exhaust nozzle 338.

The fan section 314 includes a fan casing or a nacelle 340 surrounding the fan 302. The fan 302 includes a plurality of fan blades 324 disposed radially about the longitudinal centerline axis 312. The HP compressor 318, the combustor 330, and the HP turbine 334 form an engine core 344 of the turbine engine 300, which generates combustion gases. The engine core 344 is surrounded by a core casing 331, which is coupled to the nacelle 340. The nacelle 340 is supported relative to the turbomachine by a plurality of outlet guide vanes 382 that are circumferentially spaced about the core casing 331.

A high-speed shaft 348 is disposed coaxially about the longitudinal centerline axis 312 of the turbine engine 300 and drivingly connects the HP turbine 334 to the HP compressor 318. A low-speed shaft 322 (also referred to as a low-pressure shaft), which is disposed coaxially about the longitudinal centerline axis 312 of the turbine engine 300 and within the larger diameter annular high-speed shaft 348, drivingly connects the LP turbine 320 to the LP compressor 321. The low-speed shaft 322 also drivingly connects the LP turbine 320 to the fan 302 through a gearbox assembly 350. In this way, the turbine engine 300 is considered an indirect drive turbine engine. The high-speed shaft 348 and the low-speed shaft 322 are rotatable about the longitudinal centerline axis 312.

The LP compressor 321 and the HP compressor 318, respectively, include a respective plurality of compressor stages 352, 354, in which a respective set of compressor blades 356, 358 rotate relative to a respective set of compressor vanes 360, 362 to compress or to pressurize gas entering through an inlet 332. Referring now only to the HP compressor 318, a single compressor stage 354 includes multiple compressor blades 358 provided on a rotor disk 361 (or blades and a disk are integrated together, referred to as a blisk). A compressor blade extends radially outwardly relative to the longitudinal centerline axis 312, from a blade platform to a blade tip. Compressor vanes 362 are positioned upstream/downstream of and adjacent to rotating compressor blades 358. The rotor disk 361 for a stage of compressor blades 358 is mounted to the high-speed shaft 348. A stage of the HP compressor 318 refers to a single disk of rotor blades or both the rotor blades and adjacent stator vanes (either meaning can apply within the context of this disclosure without loss of clarity).

The HP turbine 334 has one or two stages 364. In a single turbine stage 364, turbine blades 368 are provided on a rotor disk 371. A turbine blade extends radially outwardly relative to the longitudinal centerline axis 312, from a blade platform to a blade tip. The HP turbine 334 can also include a stator vane 372. The HP turbine 334 may have both an upstream nozzle adjacent the combustor exit and an exit nozzle aft of the rotor, or a nozzle upstream of rotor blades or downstream of the rotor blades.

Air exiting the HP turbine 334 enters the LP turbine 320 (also referred to as a power turbine), which has a plurality of stages of rotating blades 370. The LP turbine 320 can have three, four, five, or six stages. In a single LP turbine stage 366 (containing a plurality of blades coupled to the low-speed shaft 322) a turbine blade is provided on a rotor disk (connected to the low-speed shaft 322) and extends radially outwardly relative to the longitudinal centerline axis 312, from a blade platform to a blade tip. The LP turbine 320 can also include a stator vane 374. The LP turbine 320 may have both an upstream nozzle and an exit nozzle aft of a stage, followed by the exhaust nozzle 338 of the engine.

The turbine engine 300 of FIG. 3 operates in a similar manner as the engine of FIG. 1. Airflow exiting the fan section 314 is split such that a portion of the airflow is channeled into the inlet 332 to the LP compressor 321, which then supplies pressurized airflow to the HP compressor 318, which further pressurizes the air. The pressurized airflow from the HP compressor 318 is mixed with fuel in the combustor 330 and ignited, thereby generating combustion gases. Some work is extracted from the combustion gases by the HP turbine 334, which drives the HP compressor 318 to produce a self-sustaining combustion. The combustion gases discharged from the HP turbine enter the LP turbine 320, which extracts additional work to drive the LP compressor 321 and the fan 302 (through the gearbox assembly 350). The gas discharged from the LP turbine exits through the exhaust nozzle 338.

Some of the air supplied by the fan 302 bypasses the engine core 344 and is used for cooling of portions, especially hot portions, of the turbine engine 300, and/or used to cool or to power other aspects of the aircraft. In the context of the turbine engine 300, the hot portions refer to a variety of portions of the turbine engine 300 downstream of the combustion section 328 (e.g., the turbine section 333). Other sources of cooling fluid include, but are not limited to, fluid discharged from the LP compressor 321 or the HP compressor 318.

The turbine engine 300 depicted in FIG. 3 is by way of example only. In other embodiments, the turbine engine may have any other suitable configuration, including, for example, any other suitable number or configurations of shafts or spools, fan blades, turbines, compressors, or combination thereof. The gearbox assembly may have any suitable configuration, including, for example, a star gear configuration, a planet gear configuration, a single-stage, a multi-stage, epicyclic, non-epicyclic, etc., as detailed further below. The gearbox may have a gear ratio in a range of, for example, 3:1 to 4:1, 3:5 to 4:1, 3.25:1 to 3.5:1, or 4:1 to 5:1. The fan assembly may be any suitable fixed-pitched assembly or variable-pitched assembly. In a variable-pitch assembly, for example, the plurality of fan blades 324 may be controlled to be pitched about a pitch axis P to vary a pitch of the plurality of fan blades 324. The turbine engine includes additional components not shown in FIG. 3, such as rotor blades, stator vanes, etc. The fan assembly may be configured in any other suitable manner (e.g., as a fixed pitch fan) and further may be supported using any other suitable fan frame configuration. In some embodiments, the turbine engine 300 can include an interdigitated turbine and gear assembly, and/or can include vaneless counter rotating turbine (VCRT) architecture with an aft gearbox. Aspects of the present disclosure may be incorporated into any other suitable turbine engine, including, but not limited to, turbofan engines, propfan engines, turbojet engines, turboprop, and turboshaft engines.

Figure 4:
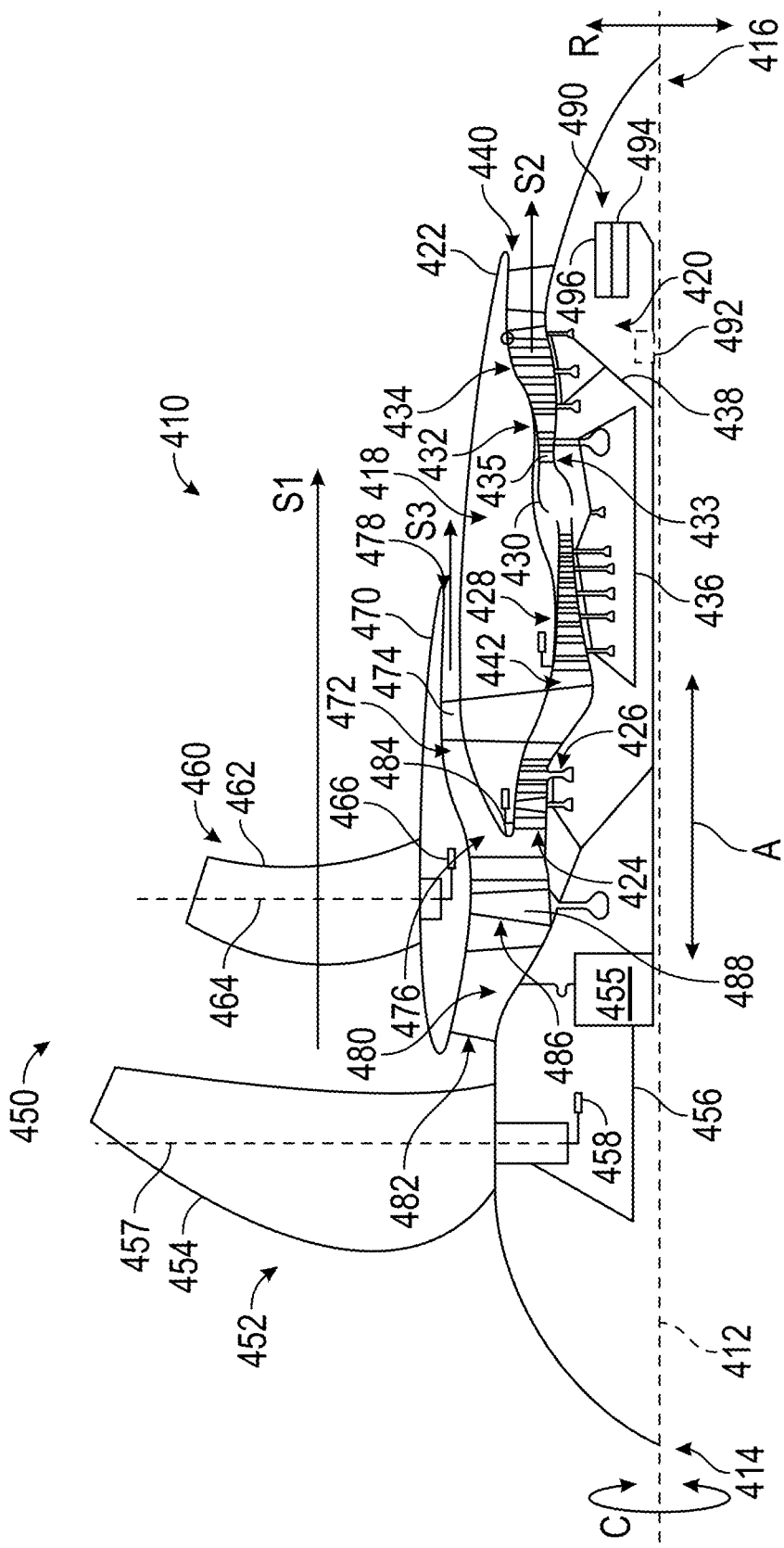
FIG. 4 is a schematic view of an unducted, three-stream, turbine engine for an aircraft, taken along a longitudinal centerline axis of the turbine engine, according to an embodiment of the present disclosure.

FIG. 4 shows a schematic view of an unducted, three-stream, turbine engine 410 for an aircraft that may incorporate one or more embodiments of the present disclosure. The turbine engine 410 is a "three-stream engine" in that the architecture of the turbine engine 410 provides three distinct streams (labeled S1, S2, and S3) of thrust-producing airflow during operation, as detailed further below.

As shown in FIG. 4, the turbine engine 410 defines an axial direction A, a radial direction R, and a circumferential direction C. Moreover, the turbine engine 410 defines a longitudinal centerline axis 412 that extends along the axial direction A. In general, the axial direction A extends parallel to the longitudinal centerline axis 412, the radial direction R extends outward from, and inward to, the longitudinal centerline axis 412 in a direction orthogonal to the axial direction A, and the circumferential direction C extends three hundred sixty degrees (360°) around the longitudinal centerline axis 412. The turbine engine 410 extends between a forward end 414 and an aft end 416, e.g., along the axial direction A.

The turbine engine 410 includes a core engine 420 and a fan assembly 450 positioned upstream thereof. Generally, the core engine 420 includes, in serial flow order, a compressor section, a combustion section, a turbine section, and an exhaust section. Particularly, as shown in FIG. 4, the core engine 420 includes an engine core 418 and a core cowl 422 that annularly surrounds the core engine 420. The core engine 420 and the core cowl 422 define a core inlet 424 having an annular shape. The core cowl 422 further encloses and supports a low-pressure (LP) compressor 426 (also referred to as a booster) for pressurizing the air that enters the core engine 420 through core inlet 424. A high-pressure (HP) compressor 428 receives pressurized air from the LP compressor 426 and further increases the pressure of the air. The pressurized air flows downstream to a combustor 430 where fuel is injected into the pressurized air and ignited to raise the temperature and the energy level of the pressurized air, thereby generating combustion gases.

The combustion gases flow from the combustor 430 downstream to a high-pressure (HP) turbine 432. The HP turbine 432 drives the HP compressor 428 through a first shaft, also referred to as a high-pressure (HP) shaft 436 (also referred to as a "high-speed shaft 436"). In this regard, the HP turbine 432 is drivingly coupled with the HP compressor 428. Together, the HP compressor 428, the combustor 430, and the HP turbine 432 define the engine core 418. The combustion gases then flow to a power turbine or low-pressure (LP) turbine 434. The LP turbine 434 drives the LP compressor 426 and components of the fan assembly 450 through a second shaft, also referred to as a low-pressure (LP) shaft 438 (also referred to as a "low-speed shaft 438"). In this regard, the LP turbine 434 is drivingly coupled with the LP compressor 426 and components of the fan assembly 450. The low-speed shaft 438 is coaxial with the high-speed shaft 436 in the embodiment of FIG. 4. After driving each of the HP turbine 432 and the LP turbine 434, the combustion gases exit the core engine 420 through a core exhaust nozzle 440. The core engine 420 defines a core flowpath, also referred to as a core duct 442, that extends between the core inlet 424 and the core exhaust nozzle 440. The core duct 442 is an annular duct positioned generally inward of the core cowl 422 along the radial direction R.

The fan assembly 450 includes a primary fan 452. For the embodiment of FIG. 4, the primary fan 452 is an open rotor fan, also referred to as an unducted fan. However, in other embodiments, the primary fan 452 may be ducted, e.g., by a fan casing or a nacelle circumferentially surrounding the primary fan 452. The primary fan 452 includes an array of fan blades 454 (only one shown in FIG. 4). The fan blades 454 are rotatable about the longitudinal centerline axis 412 via a fan shaft 456. As shown in FIG. 4, the fan shaft 456 is coupled with the low-speed shaft 438 via a speed reduction gearbox, also referred to as a gearbox assembly 455, e.g., in an indirect-drive configuration. The gearbox assembly 455 is shown schematically in FIG. 4. The gearbox assembly 455 includes a plurality of gears for adjusting the rotational speed of the fan shaft 456 and, thus, the primary fan 452 relative to the low-speed shaft 438 to a more efficient rotational fan speed. The gearbox assembly may have a gear ratio of, for example, 4:1 to 12:1, or 7:1 to 12:1, or 4:1 to 10:1, or 5:1 to 9:1, or 6:1 to 9:1, and may be configured in an epicyclic star or a planet gear configuration. The gearbox may be a single stage or a compound gearbox.

The fan blades 454 can be arranged in equal spacing around the longitudinal centerline axis 412. Each fan blade 454 has a root and a tip, and a span defined therebetween. Each fan blade 454 defines a central blade axis 457. For the embodiment of FIG. 4, each fan blade 454 of the primary fan 452 is rotatable about their respective central blade axis 457, e.g., in unison with one another. One or more actuators 458 are controlled to pitch the fan blades 454 about their respective central blade axis 457. In other embodiments, each fan blade 454 is fixed or is unable to be pitched about the central blade axis 457.

The fan assembly 450 further includes a fan guide vane array 460 that includes fan guide vanes 462 (only one shown in FIG. 4) disposed around the longitudinal centerline axis 412. For the embodiment of FIG. 4, the fan guide vanes 462 are not rotatable about the longitudinal centerline axis 412. Each fan guide vane 462 has a root and a tip, and a span defined therebetween. The fan guide vanes 462 can be unshrouded as shown in FIG. 4 or can be shrouded, e.g., by an annular shroud spaced outward from the tips of the fan guide vanes 462 along the radial direction R. Each fan guide vane 462 defines a central vane axis 464. For the embodiment of FIG. 4, each fan guide vane 462 of the fan guide vane array 460 is rotatable about their respective central vane axis 464, e.g., in unison with one another. One or more actuators 466 are controlled to pitch the fan guide vanes 462 about their respective central vane axis 464. In other embodiments, each fan guide vane 462 is fixed or is unable to be pitched about the central vane axis 464. The fan guide vanes 462 are mounted to a fan cowl 470.

The fan cowl 470 annularly encases at least a portion of the core cowl 422 and is generally positioned outward of the core cowl 422 along the radial direction R. Particularly, a downstream section of the fan cowl 470 extends over a forward portion of the core cowl 422 to define a fan flowpath, also referred to as a fan duct 472. Incoming air enters through the fan duct 472 through a fan duct inlet 476 and exits through a fan exhaust nozzle 478 to produce propulsive thrust. The fan duct 472 is an annular duct positioned generally outward of the core duct 442 along the radial direction R. The fan cowl 470 and the core cowl 422 are connected together and supported by a plurality of struts 474 (only one shown in FIG. 4) that extend substantially radially and are circumferentially spaced about the longitudinal centerline axis 412. The plurality of struts 474 are each aerodynamically contoured to direct air flowing thereby. Other struts in addition to the plurality of struts 474 can be used to connect and to support the fan cowl 470 and/or the core cowl 422.

The turbine engine 410 also defines or includes an inlet duct 480. The inlet duct 480 extends between an engine inlet 482 and the core inlet 424 and the fan duct inlet 476. The engine inlet 482 is defined generally at the forward end of the fan cowl 470 and is positioned between the primary fan 452 and the fan guide vane array 460 along the axial direction A. The inlet duct 480 is an annular duct that is positioned inward of the fan cowl 470 along the radial direction R. Air flowing downstream along the inlet duct 480 is split, not necessarily evenly, into the core duct 442 and the fan duct 472 by a splitter 484 of the core cowl 422. The inlet duct 480 is wider than the core duct 442 along the radial direction R. The inlet duct 480 is also wider than the fan duct 472 along the radial direction R.

The fan assembly 450 also includes a mid-fan 486. The mid-fan 486 includes a plurality of mid-fan blades 488 (only one shown in FIG. 4). The plurality of mid-fan blades 488 are rotatable, e.g., about the longitudinal centerline axis 412. The mid-fan 486 is drivingly coupled with the LP turbine 434 via the low-speed shaft 438. The plurality of mid-fan blades 488 can be arranged in equal circumferential spacing about the longitudinal centerline axis 412. The plurality of mid-fan blades 488 are annularly surrounded (e.g., ducted) by the fan cowl 470. In this regard, the mid-fan 486 is positioned inward of the fan cowl 470 along the radial direction R. The mid-fan 486 is positioned within the inlet duct 480 upstream of both the core duct 442 and the fan duct 472. A ratio of a span of a fan blade 454 to that of a mid-fan blade 488 (a span is measured from a root to tip of the respective blade) is greater than 2 and less than 10, to achieve the desired benefits of the third stream (S3), particularly the additional thrust it offers to the engine, which can enable a smaller diameter blade 454 (benefits engine installation).

Accordingly, air flowing through the inlet duct 480 flows across the plurality of mid-fan blades 488 and is accelerated downstream thereof. At least a portion of the air accelerated by the mid-fan blades 488 flows into the fan duct 472 and is ultimately exhausted through the fan exhaust nozzle 478 to produce propulsive thrust. Also, at least a portion of the air accelerated by the plurality of mid-fan blades 488 flows into the core duct 442 and is ultimately exhausted through the core exhaust nozzle 440 to produce propulsive thrust. Generally, the mid-fan 486 is a compression device positioned downstream of the engine inlet 482. The mid-fan 486 is operable to accelerate air into the fan duct 472, also referred to as a secondary bypass passage.

During operation of the turbine engine 410, an initial airflow or an incoming airflow passes through the fan blades 454 of the primary fan 452 and splits into a first airflow and a second airflow. The first airflow bypasses the engine inlet 482 and flows generally along the axial direction A outward of the fan cowl 470 along the radial direction R. The first airflow accelerated by the fan blades 454 passes through the fan guide vanes 462 and continues downstream thereafter to produce a primary propulsion stream or a first thrust stream S1. A majority of the net thrust produced by the turbine engine 410 is produced by the first thrust stream S1. The second airflow enters the inlet duct 480 through the engine inlet 482.

The second airflow flowing downstream through the inlet duct 480 flows through the plurality of mid-fan blades 488 of the mid-fan 486 and is consequently compressed. The second airflow flowing downstream of the mid-fan blades 488 is split by the splitter 484 located at the forward end of the core cowl 422. Particularly, a portion of the second airflow flowing downstream of the mid-fan 486 flows into the core duct 442 through the core inlet 424. The portion of the second airflow that flows into the core duct 442 is progressively compressed by the LP compressor 426 and the HP compressor 428, and is ultimately discharged into the combustion section. The discharged pressurized air stream flows downstream to the combustor 330 where fuel is introduced to generate combustion gases or products.

The combustor 430 defines an annular combustion chamber that is generally coaxial with the longitudinal centerline axis 412. The combustor 430 receives pressurized air from the HP compressor 428 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle of the HP turbine 432. A first stage turbine nozzle 433 is defined by an annular flow channel that includes a plurality of radially extending, circumferentially spaced nozzle vanes 435 that turn the combustion gases so that they flow angularly and impinge upon first stage turbine blades of the HP turbine 432. The combustion gases exit the HP turbine 432 and flow through the LP turbine 434 and exit the core duct 442 through the core exhaust nozzle 440 to produce a core air stream, also referred to as a second thrust stream S2. As noted above, the HP turbine 432 drives the HP compressor 428 via the high-speed shaft 436, and the LP turbine 434 drives the LP compressor 426, the primary fan 452, and the mid-fan 486 via the low-speed shaft 438.

The other portion of the second airflow flowing downstream of the mid-fan 486 is split by the splitter 484 into the fan duct 472. The air enters the fan duct 472 through the fan duct inlet 476. The air flows generally along the axial direction A through the fan duct 472 and is ultimately exhausted from the fan duct 472 through the fan exhaust nozzle 478 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The turbine engine 410 depicted in FIG. 4 is by way of example only. In other embodiments, the turbine engine 410 may have any other suitable configuration. For example, in other embodiments, the primary fan 452 may be configured in any other suitable manner (e.g., as a fixed pitch fan) and further may be supported using any other suitable fan frame configuration. In other embodiments, the primary fan 452 can be ducted by a fan casing or a nacelle such that a bypass passage is defined between the fan casing and the fan cowl 470. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream). In other embodiments, the turbine engine 410 is configured as an unducted, two stream turbine engine such that the turbine engine 410 does not include the fan duct 472. In some embodiments, the fan guide vane array 460 is configured as a secondary fan such that the fan guide vanes 462 provide a second stage of the primary fan 452 and rotate with respect to the longitudinal centerline axis 412. In some embodiments, the turbine engine 410 can include an interdigitated turbine and gear assembly, and/or can include vaneless counter rotating turbine (VCRT) architecture with an aft gearbox.

Further, for the depicted embodiment of FIG. 4, the turbine engine 410 includes an electric machine 490 (motor-generator) operably coupled with a rotating component thereof. In this regard, the turbine engine 410 is a hybrid-electric propulsion machine. Particularly, as shown in FIG. 4, the electric machine 490 is operatively coupled with the low-speed shaft 438. The electric machine 490 can be mechanically connected to the low-speed shaft 438, either directly, or indirectly, e.g., by way of a gearbox assembly 492 (shown schematically in FIG. 4). Further, although in this embodiment the electric machine 490 is operatively coupled with the low-speed shaft 438 at an aft end of the low-speed shaft 438, the electric machine 490 can be coupled with the low-speed shaft 438 at any suitable location or can be coupled to other rotating components of the turbine engine 410, such as the high-speed shaft 436 or the low-speed shaft 438. For instance, in some embodiments, the electric machine 490 can be coupled with the low-speed shaft 438 and positioned forward of the mid-fan 486 along the axial direction. In some embodiments the turbine engines of FIGS. 1 to 3 also includes an electric machine coupled to the LP shaft and located in the tail cone of the engine.

In some embodiments, the electric machine 490 can be an electric motor operable to drive or to motor the low-speed shaft 438, e.g., during an engine burst. In other embodiments, the electric machine 490 can be an electric generator operable to convert mechanical energy into electrical energy. In this way, electrical power generated by the electric machine 490 can be directed to various engine and/or aircraft systems. In some embodiments, the electric machine 490 can be a motor/generator with dual functionality. The electric machine 490 includes a rotor 494 and a stator 496.

The rotor 494 is coupled to the low-speed shaft 438 and rotates with rotation of the low-speed shaft 438. In this way, the rotor 494 rotates with respect to the stator 496, thereby generating electrical power. Although the electric machine 490 has been described and illustrated in FIG. 4 as having a particular configuration, the present disclosure may apply to electric machines having alternative configurations. For instance, the rotor 494 and/or the stator 496 may have different configurations or may be arranged in a different manner than illustrated in FIG. 4.

Figure 5:
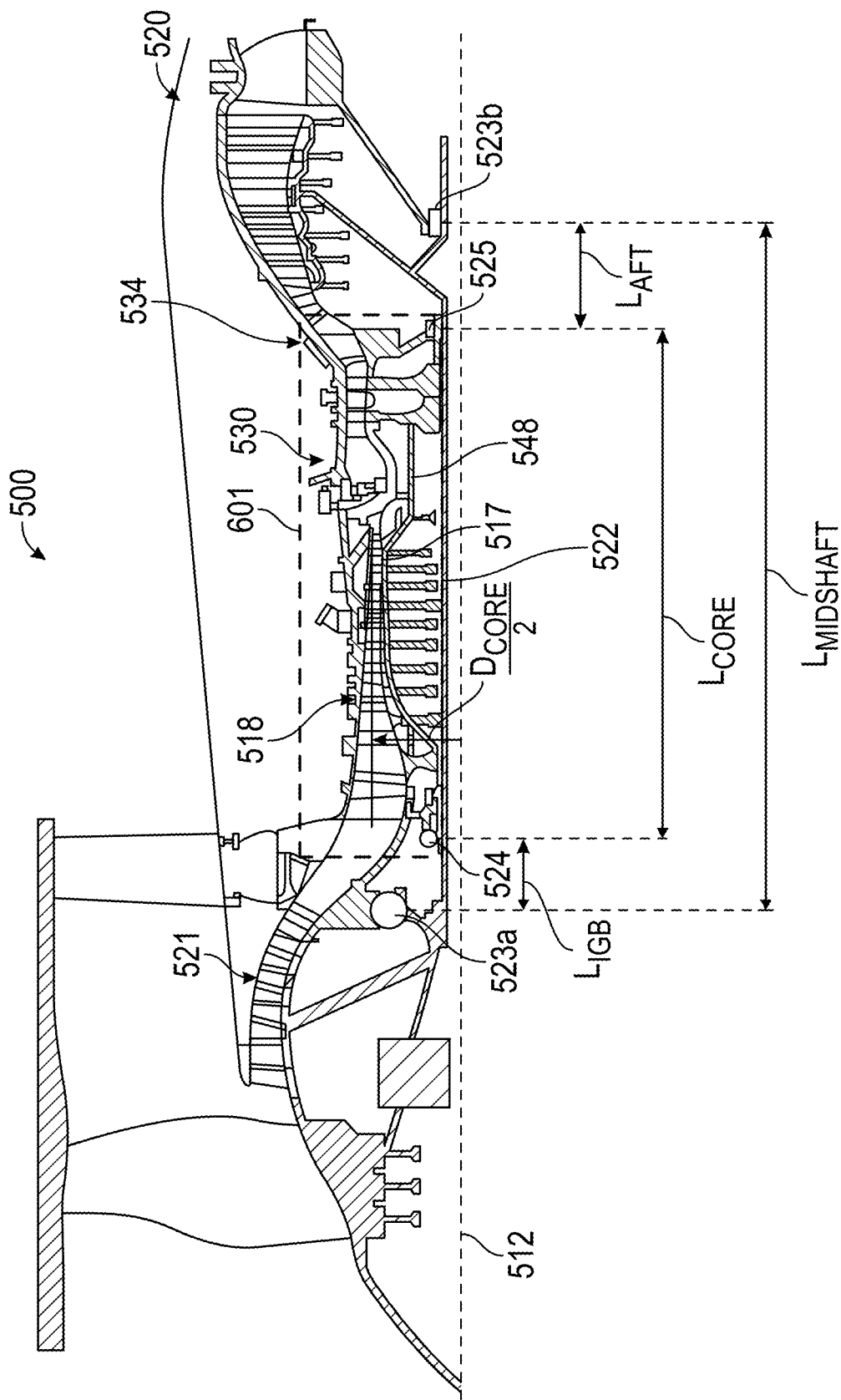
FIG. 5 is a cross-sectional view of an exemplary turbine engine, taken along a longitudinal centerline axis of the turbine engine, according to the present disclosure.

FIG. 5 is a cross-sectional view of an exemplary turbine engine 500, taken along a longitudinal centerline axis 512 of the turbine engine 500, according to the present disclosure. The turbine engine 500 includes a low-pressure (LP) compressor 521, a high-pressure (HP) compressor 518, a low-pressure (LP) turbine 520, and a high-pressure (HP) turbine 534. These features operate in the same manner as described with respect to FIGS. 1 to 4. A low-pressure shaft 522 (also referred to as a "low-speed shaft") extends between the low-pressure compressor 521 and the low-pressure turbine 520. A high-pressure shaft 548 extends between the high-pressure compressor 518 and the high-pressure turbine 534. Together, the high-pressure compressor 518, a combustor 530 (e.g., any of the combustors or combustion sections detailed herein), and the high-pressure turbine 534 define an engine core.

The low-pressure shaft 522 is rotationally supported in the turbine engine 500 with one or more bearings. In the embodiment illustrated in FIG. 5, the turbine engine 500 includes a first bearing 523a (also referred to in the art as "Brg 2"), a second bearing 524 (also referred to in the art as "Brg 3"), a third bearing 525 (also referred to in the art as "Brg 4"), and a fourth bearing 523b (also referred to in the art as "Brg 5"). The low-pressure shaft 522 is supported by one bearing on a forward side of the core engine (e.g., first bearing 523a) and one bearing on an aft side of the core engine (e.g., fourth bearing 523b). The high-pressure shaft 548 is supported by the second bearing 524 on a forward side and the third bearing 525 on the aft side. The first bearing 523a and the second bearing 524 may be ball bearings, although other types of bearings or rotational supports are contemplated. The third bearing 525 and the fourth bearing 523b may be roller bearings, although other types of bearings or rotational supports are contemplated. Although shown as a single bearing at each location, the bearings may be a plurality of bearings. For example, the first bearing 523a could comprise two axially spaced bearings.

In FIG. 5, the length $L_{MIDSHAFT}$ is a length of a portion of the low-pressure shaft 522, referred to as a midshaft. The length $L_{MIDSHAFT}$ is defined between the inboard low-pressure shaft forward bearing (e.g., the first bearing 523a) and the inboard low-pressure shaft aft bearing (e.g., the fourth bearing 523b). The length $L_{MIDSHAFT}$ is the lateral distance, parallel to the longitudinal centerline axis 512, defined between midpoints of the first bearing 523a and the fourth bearing 523b.

The length $L_{IGB}$ is the length from the inboard low-pressure shaft forward bearing (e.g., the first bearing 523a) to the core forward bearing (e.g., the second bearing 524). The length $L_{IGB}$ is the lateral distance, parallel to the longitudinal centerline axis 512, defined between midpoints of the first bearing 523a and the second bearing 524.

The length $L_{CORE}$ is the length of the engine core (e.g., the length including the high-pressure compressor 518, the combustor, and the high-pressure turbine 534). The length $L_{CORE}$ is defined between the core forward bearing (e.g., the second bearing 524) and the core aft bearing (e.g., the third bearing 525). The length $L_{CORE}$ is the lateral distance, parallel to the longitudinal centerline axis 512, defined between midpoints of the second bearing 524 and the third bearing 525. In this way, the length $L_{CORE}$ is the length of the high-pressure shaft 548 from the second bearing 524 to the third bearing 525.

The length $L_{AFT}$ is the length from aft of the core to the inboard low-pressure shaft aft bearing (e.g., the fourth bearing 523b). The length $L_{AFT}$ is the lateral distance, parallel to the longitudinal centerline axis 512, defined between midpoints of the third bearing 525 and the fourth bearing 523b.

The core diameter $D_{CORE}$ represents the diameter of the engine core. The diameter $D_{CORE}$ is defined by the outer diameter of the exit from a last stage 517 of the high-pressure compressor 518, also referred to as the exit stage diameter. In this way, the last stage 517 defines an exit of the HP compressor 518. The radius of the core is shown in FIG. 5 as $D_{CORE}/2$.

Figure 6:
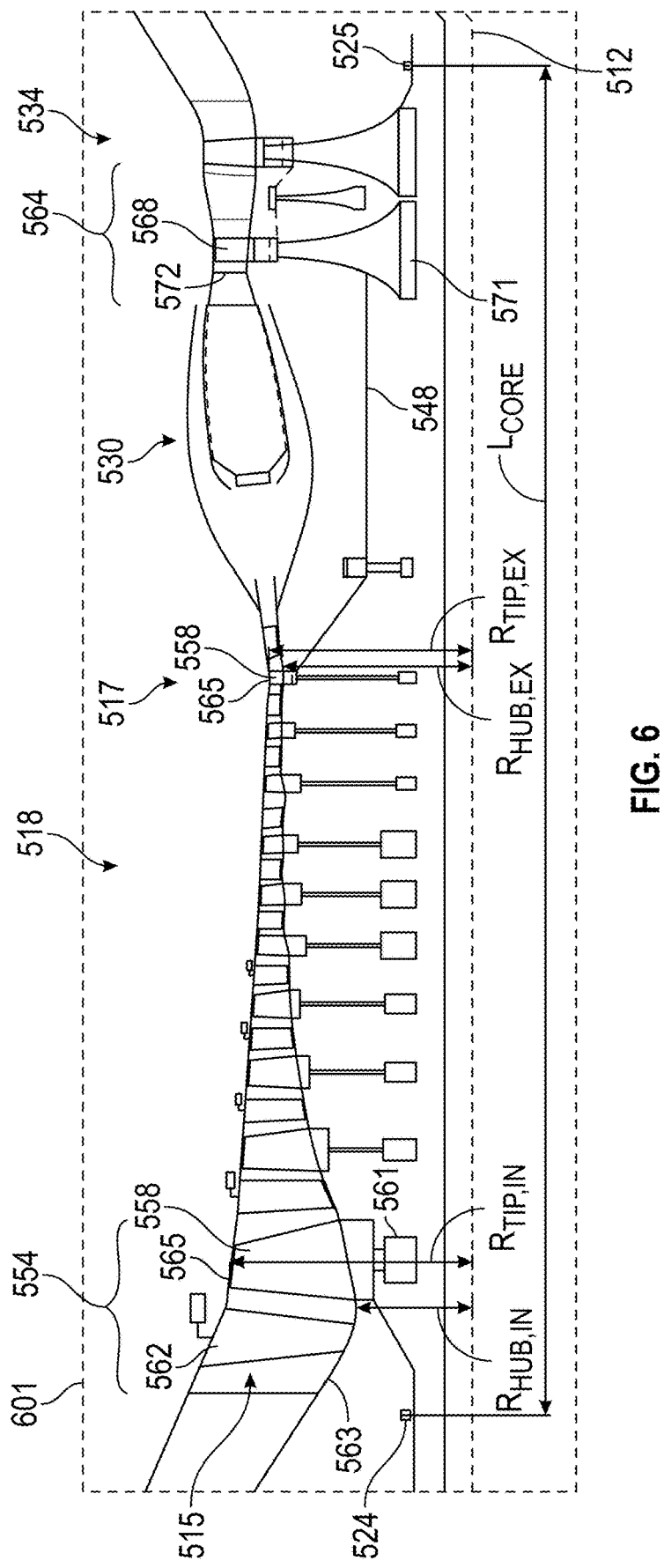
FIG. 6 is an enlarged, schematic view of the turbine engine of FIG. 5, taken at detail 601 in FIG. 5, according to the present disclosure.

FIG. 6 is an enlarged, cross-sectional view of the turbine engine 500, taken at detail 601 in FIG. 5, according to the present disclosure. In particular, FIG. 6 shows an enlarged view of the HP compressor 518, the combustor 530, and the HP turbine 534.

The HP compressor 518 includes a plurality of compressor stages 554 (only one of which is labeled in FIG. 6 for clarity), in which a set of HP compressor blades 558 rotate relative to a set of HP compressor vanes 562 to compress or to pressurize gas entering through an HP compressor inlet 515. The HP compressor inlet 515 is defined by a first compressor stage 554 of the HP compressor 518. A single HP compressor stage 554 includes multiple compressor blades 558 provided on a rotor disk 561 (or blades and a disk are integrated together, referred to as a blisk). A compressor blade extends radially outwardly relative to the longitudinal centerline axis 512, from a blade platform to a blade tip. The HP compressor vanes 562 are positioned upstream/downstream of and adjacent to rotating HP compressor blades 558. The rotor disk 561 for a stage of HP compressor blades 558 is mounted to the high-pressure shaft 548. A stage of the HP compressor 518 refers to a single disk of rotor blades or both the rotor blades and adjacent stator vanes (either meaning can apply within the context of this disclosure without loss of clarity).

The HP turbine 534 has one or two HP turbine stages 564. In a single HP turbine stage 564, HP turbine blades 568 are provided on a rotor disk 571. A turbine blade extends radially outwardly relative to the longitudinal centerline axis 512, from a blade platform to a blade tip. The HP turbine 534 can also include an HP turbine stator vane 572. The HP turbine 534 may have both an upstream nozzle adjacent the combustor exit and an exit nozzle aft of the rotor, or a nozzle upstream of rotor blades or downstream of the rotor blades.

In FIG. 6, the radius $R_{HUB,IN}$ is a radius of a hub 563 at the HP compressor inlet 515. The radius $R_{HUB,IN}$ is defined from the longitudinal centerline axis 512 to the hub 563 at the HP compressor inlet 515 in the radial direction. The radius $R_{TIP,IN}$ is a radius of a tip 565 of the HP compressor blade 558 of the first stage (e.g., at the HP compressor inlet 515). The radius $R_{TIP,IN}$ is defined from the longitudinal centerline axis 512 to the tip 565 of the HP compressor blade 558 at the HP compressor inlet 515 in the radial direction.

The radius $R_{HUB,EX}$ is a radius of the hub 563 at the last stage 517 (e.g., at the exit of the HP compressor 518). The radius $R_{HUB,EX}$ is defined from the longitudinal centerline axis 512 to the hub 563 at the last stage 517 in the radial direction. The radius $R_{TIP,EX}$ is a radius of the tip 565 of the HP compressor blade 558 of the last stage 517 of the HP compressor 518. The radius $R_{TIP,EX}$ is defined from the longitudinal centerline axis 512 to the tip 565 of the HP compressor blade 558 at the last stage 517 of the HP compressor 518 in the radial direction. In this way, the radius $R_{TIP,EX}$ corresponds to the radius of the core $$\frac{D_{CORE}}{2}.$$

Figure 7A:
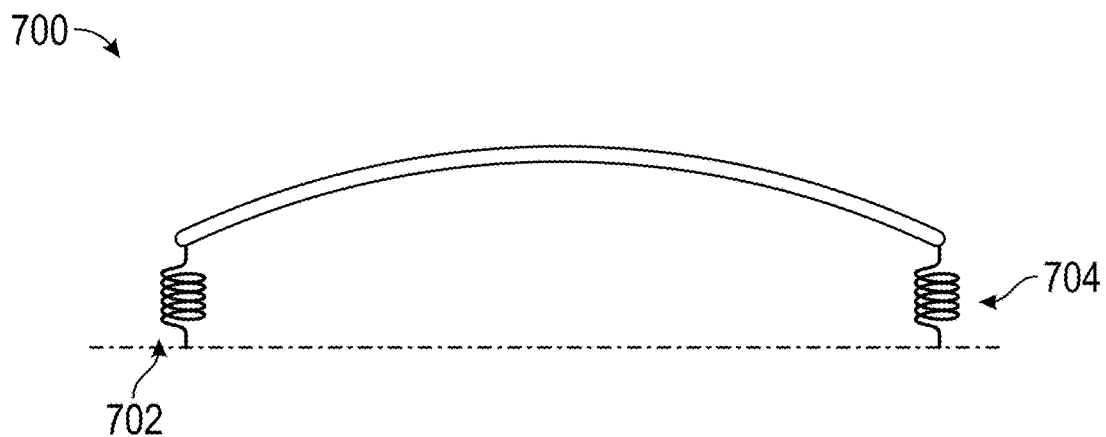
FIG. 7A shows a first bending mode of a shaft.
Figure 7B:
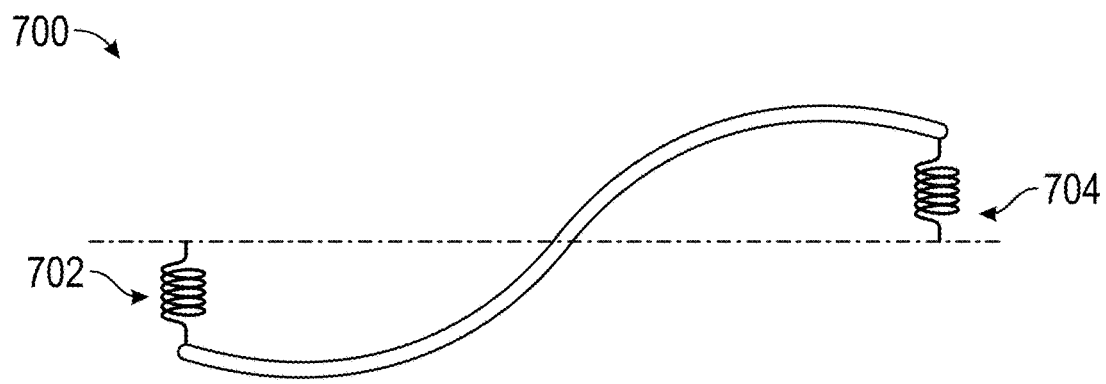
FIG. 7B shows a second bending mode of a shaft.
Figure 7C:
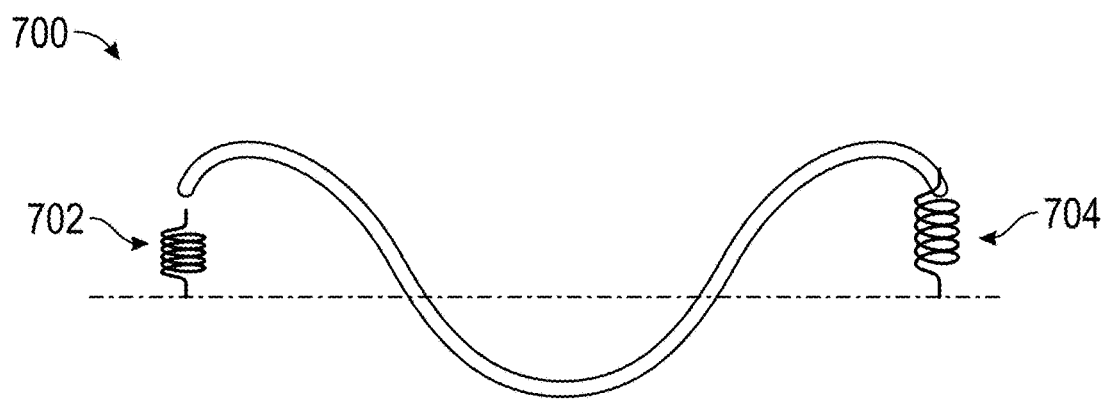
FIG. 7C shows a third bending mode of a shaft.

FIGS. 7A to 7C show a schematic view of a high-pressure shaft (HP shaft) corresponding to the predominate three typical mode shapes of the HP shaft that need to be taken into consideration when designing an engine core and avoiding dynamic instability in the HP shaft, as realized by the inventors. For example, the HP shaft illustrated in FIGS. 7A to 7C can be the high-pressure shaft 548 of FIGS. 5 and 6. The HP shaft extends from the HP compressor to the HP turbine. The deformed HP shaft is supported by the HP shaft forward and aft bearings 702 and 704, respectively. The bearings are represented by their stiffnesses (shown as springs). FIG. 7A illustrates a first mode, also referred to as a fundamental bounce mode, also known as a bow rotor mode, of the high-pressure shaft 700. The first mode can occur at sub-idle speeds of the high-pressure shaft, which are about sixty percent to eighty percent below a redline speed of the high-pressure shaft (e.g., about forty percent below cruise speeds). In FIG. 7B, the high-pressure shaft 700 has a second mode, also known as the pitch mode. The second mode occurs at near to cruise speeds of the high-pressure shaft, which are about twenty percent to thirty percent below the high-pressure shaft redline speeds. In FIG. 7C, the high-pressure shaft 700 has a third mode, also known as a S-shaped mode. The third mode occurs near redline speeds of the high-pressure shaft.

As mentioned earlier, the inventors sought to improve upon the operating speed of a high-speed shaft, also referred to as the high-pressure shaft. With regard to the speed of the high-pressure shaft, consideration was given not simply to those factors (e.g., the length of the engine core, the diameter of the engine core, or the number of stages present in the HP compressor or the HP turbine) affecting the high-speed shaft, but also to factors considering the inlet temperature of the HP compressor and the inlet corrected flow. In contrast to existing gas turbine engines requiring higher bypass ratios and smaller engine cores, embodiments considered presented challenges in determining how the engine core (e.g., the HP shaft) could be reduced in size without operating at or near the Alford margin and/or the third mode margin of the HP shaft, while enabling higher bypass ratio engines and without affecting performance of the HP compressor and/or the HP turbine.

A selection of HP compressor sizes and HP shaft sizes takes into consideration other factors, some of which can limit the selection of a shaft. The inventors, however, realized during the course of making the several embodiments referred to in the foregoing that there is a particular range of designs, and constraints on feasible designs that provided an unexpected benefit. The interplay among components can make it particularly difficult to select or to develop one component during engine design and prototype testing, especially when some components are at different stages of completion. For example, one or more components may be nearly complete, yet one or more other components may be in an initial or a preliminary phase where only one (or a few) design parameters are known. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration.

Even taken separately from the integration of a shaft design with the rest of an engine, modifying an existing shaft to increase the redline speed of the shaft is challenging, and the impact of the different types of improvements and configurations on redline speed is not easily predictable without empirical experimentation and simulation, which can be enormously expensive and time-consuming. In some cases, a modification may even result in lowering the redline speed. For example, to reduce HP compressor length, the number of HP compressor stages can be reduced and the pressure ratio can be reduced. Further, transferring the pressure ratio to the LP compressor results in higher HP compressor inlet temperature and reduced HP compressor inlet corrected flow, both of which result in higher redline speed and, hence, reduced Alford margin and/or reduced third mode margin.

As part of this effort, the inventors evaluated the influence of using different materials for the engine core (rotor disks, airfoils) and changes in radius (e.g., changes in the radius ratio of the core), and their impact on the HP compressor pressure ratio and the inlet temperature and the resulting impact that these modifications have on the dynamics of the high-speed shaft, the low-speed shaft, and the interaction between these two shafts as can occur through dynamic excitation transmitted through shaft bearings. Next generation engines will operate with a higher power density (power/weight), which can mean lengthening the core by adding additional compression stages to the high-pressure compressor. Additionally, or alternatively, a core operating at a higher power density is expected to operate at higher temperatures at the compressor exit stage and the downstream turbine stages. In this regard, higher-temperature-tolerant material can be used to enable operating at higher temperatures, such as, a ceramic matrix composite (CMC) material. The use of such higher temperature-tolerant material is expected to bring about changes in weight and component size and volume, which is expected to influence the behavior of both the high-speed shaft and the low-speed shaft. Thus, the inventors, as part of their investigation and evaluation of different engine architectures, also considered how the dynamics of the low-speed shaft and the high-speed shaft might change when the engine core changes in size and weight, in response to a need to operate at higher power densities enabled by use of higher temperature-tolerant material.

CMC material is expected to be used in the HPT, LPT, and HPC parts of a core engine as this type of material can withstand higher temperatures than more traditional metal alloys. Given the differences in material properties for a CMC material, particularly, the higher strength to weight ratio (or higher specific modulus) of CMC versus a metal alloy used in existing gas turbine engines in use currently, there is a need to ascertain the expected effects on HP shaft dynamics and LP shaft dynamics. Use of a CMC material introduces opportunities to increase a critical speed of the LP shaft, not only due to a weight reduction but also in making more space available for increasing the LP shaft diameter extending through the core given the higher strength of these materials. The components made, at least in-part, from CMC material may include the HP compressor rotors and disks, the HP turbine nozzles and/or rotors and rotor disks, and the LP turbine nozzles and/or rotors and disks. CMC allows for components to be made more stiff or reduced in size while having the same strength properties as metal alloys, thereby having equivalent capability for sustaining high stresses associated with centrifugal forces at high temperatures and operating speeds, in addition to reducing the weight of the core, as compared to metals. CMC also introduces new and untested structural dynamics, which can introduce tradeoffs or compromise among a desired aero-performance (temperatures, rotation rates, pressure ratios) and stable dynamics at cruise, takeoff/max thrust and redline speeds for both the HP shaft and LP shaft. Accordingly, components of the HP compressor and/or components of the HP turbine in the embodiments 1 to 120 in TABLES 1 to 5 below can be made from CMC. For example, rotors, blades, blades and discs, a single stage, or multiple stages in the high-pressure compressor module and/or in the high-pressure turbine module may be formed partially or wholly of CMC.

The inventors also found, during the course of evaluating several different core designs (designs that reduce the size of the engine core) from the perspective of maintaining dynamic stability among the HP shaft the following relationships. These relationships take into account the tradeoffs that need to be made, so that the design accounts not only for features of the core length, size and weight, and representative of a higher overall pressure ratio and increased operating temperatures, but also the effects that these changes in the core can have on the HP compressor inlet temperature and the inlet corrected flow that affect the HP shaft redline speed.

A first relationship concerns the high-pressure shaft redline speed, or high-speed shaft rating HSR given by (1):

$$HSR = \frac{1}{k} * N2_{r/l} * D_{CORE} * \left(\frac{L_{CORE}}{D_{CORE}}\right)^2 \quad (1)$$

$L_{CORE}$ and $D_{CORE}$ are defined as described previously, and $L_{CORE}/D_{CORE}$ is a ratio of the length of the engine core to the diameter of the engine core. $N2_{r/l}$ is the redline speed for the HP shaft, for example, reported in the engine Type Certificate Data Sheet (TCDS), and k is a constant with a value of $10^6$ inch-RPM. The redline speed $N2_{r/l}$ is from 10,580 RPM to 35,788 RPM. $L_{CORE}$ is from 36.4 inches (in) to 66.8 inches (in). $D_{CORE}$ is from 9.4 inches to 31.8 inches. HSR is from 1.5 to 6.2.

For stable operating conditions, the high-pressure shaft third mode should be placed as a percentage below the redline speed of the HP shaft or above the redline speed of the HP shaft and satisfying (2a), (2b), (2c), or (2d):

−0.1>(−0.1822*HSR+HST)>0 (2a)

−0.2>(−0.1822*HSR+HST)>0 (2b)

−0.3>(−0.1822*HSR+HST)>0 (2c)

(−0.1822*HSR+HST)>−0.1 (2d)

HST accounts for the effects that the HPC pressure ratio and the HPC exit temperature can have on the third mode. T25 is the temperature in Rankine (° R) at the high-pressure compressor (HPC) inlet. A good approximation for HST can be made in terms of only the T25, using (3):

HST=−0.726*T25/$T_{STD}$+1.61 (3)

where T25 is from 579° R to 803° R, HST is from 0.49 to 0.8, and $T_{STD}$ is the standard temperature defined by a constant value of 518.67° R.

For stable operating conditions, the high-pressure shaft second mode is a function of the minimum speed of the HP shaft at cruise as a percentage of the redline speed of the HP shaft. For example, for stable operating conditions, the high-pressure shaft second mode should satisfy (4):

$$\left(-0.1215 * HSR + \left(\frac{2 * HST - 1}{3}\right)\right) < -0.1 \quad (4)$$

Relationships (2a) to (2d) and (4) account for individual configurations of the HP shaft that have variations in mode margin due to additional parameters, such as, for example, the bearing support stiffness, additional mass added for maintainability, and/or features such as power screws. For example, if the excess margin is 20% of the third mode, but the second mode is at −10% margin, then the mitigation is to soften the bearing support such that the third mode margin falls to 10% and the second mode margin becomes −20%. Accordingly, the relationships (2a) to (2d) and (4) provide for providing a balance among the third mode margin and the second mode margin of the HP shaft.

Such a configuration of the high-pressure shaft third mode in relationships (2a) to (2d) accounts for stable operating conditions while considering variations in architectural differences in various types of turbine engines, as well as ensuring that the HP shaft is not excessively excited at the high-pressure shaft second mode during high power steady state operations (e.g., cruise, climb, and/or takeoff). For example, the third mode margin can be −10% of the redline speed of the HP shaft per relationship (2a), −20% of the redline speed of the HP shaft per relationship (2b), or −30% of the redline speed of the HP shaft per relationship (2c). The third mode margin can also be greater than −10% of the redline speed of the HP shaft per relationship (2d) to account for the architectural differences in various types of turbine engines. For example, the third mode may fall within −10% of redline speed of the HP shaft and the bearing support structure can be stiffened or softened to move the third mode margin to just above the redline speed of the HP shaft.

Further, such a configuration of the high-pressure shaft second mode in relationship (4) accounts for stable operating conditions while considering variations in architectural differences in various types of turbine engine, as well as ensuring that the HP shaft is not excessively excited at the high-pressure shaft second mode during high power steady state operations (e.g., cruise, climb, and/or takeoff). For example, the second mode margin can be −10% of the redline speed of the HP shaft per relationship (4).

Another relationship for HSR concerns the low-pressure shaft redline speed, or high-speed shaft rating $HSR_{LP}$ given by (5):

$$HSR_{LP} = \frac{1}{k} * N1_{r/l} * D_{CORE} * \left(\frac{L_{CORE}}{D_{CORE}}\right)^2 \quad (5)$$

$L_{CORE}$ and $D_{CORE}$ are defined as described previously. $N1r/l$ is the redline speed for the LP shaft, for example, reported in the engine Type Certificate Data Sheet (TCDS), and k is a constant with a value of $10^6$ inch-RPM. For stable operating conditions, the high-pressure shaft first mode is a function of the minimum speed of the LP shaft at cruise as a percentage of the redline speed of the LP shaft. For example, for stable operating conditions, the high-pressure shaft first mode is placed either below (as a percentage) or just above the redline speed of the LP shaft satisfying relationship (6a), (6b), (6c), or (6d):

$$-0.1 > \left(\frac{0.55}{(HSR_{LP})^2} + LST\right) > 0 \qquad (6a)$$

$$-0.2 > \left(\frac{0.55}{(HSR_{LP})^2} + LST\right) > 0 \qquad (6b)$$

$$-0.3 > \left(\frac{0.55}{(HSR_{LP})^2} + LST\right) > 0 \qquad (6c)$$

$$\left(\frac{0.55}{(HSR_{LP})^2} + LST\right) > -0.1 \qquad (6d)$$

LP Speed Temperature Correction (LST) accounts for the effects that the HPC pressure ratio and the HPC exit temperature can have on the first mode. T25 is the temperature in Rankine (° R) at the high-pressure compressor (HPC) inlet. A good approximation for LST can be made in terms of only the T25, using (7):

$$LST = -1.193 * T25/T_{STD} + 1.18 \qquad (7)$$

where T25 is from 579° R to 803° R, LST is from −0.15 to −0.67, and $T_{STD}$ is the standard temperature defined by a constant value of 518.67° R.

Relationships (1) through (7) when used individually or together (depending on application or changes made to a design) can identify an improved core accounting for characteristics associated with a higher power density (use of CMC material, increased number of HPC and/or HPT stages, increased bore height or length of the LP shaft) and bounding those features within constraints to avoid dynamic instability by interaction between one or more vibration modes of the LP shaft and HP shaft. Further, relationships (6a) to (6d) account for individual configurations of the HP shaft that have variations in mode margin due to additional parameters, such as, for example, the bearing support stiffness, additional mass added for maintainability, and/or features such as power screws. For example, if the first mode is within −20% of the redline speed of the LP shaft (e.g., is between the redline speed of the LP shaft and −20% of the redline speed of the LP), then the mitigation is to either soften or to stiffen the bearing support such that the first mode margin falls below −20% of the redline speed of the LP shaft or above the redline speed of the LP shaft. Such a configuration of the high-pressure shaft first mode in relationships (6a) to (6d) accounts for stable operating conditions while considering variations in architectural differences in various types of turbine engine, as well as ensuring that the HP shaft is not excessively excited at the high-pressure shaft first mode during high power steady state operations (e.g., cruise, climb, and/or takeoff). For example, the first mode margin can be −10% of the redline speed of the LP shaft per relationship (6a), −20% of the redline speed of the LP shaft per relationship (6b), or −30% of the redline speed of the LP shaft per relationship (6c). The first mode margin can also be greater than −10% of the redline speed of the LP shaft per relationship (6d) to account for the architectural differences in various types of turbine engines. For example, the first mode may fall within −10% of redline speed of the LP shaft and the bearing support structure can be stiffened or softened to move the first mode margin to just above the redline speed of the LP shaft.

The area of the exit of the HP compressor (e.g., area at the last stage of the HP compressor), also referred to as the HP compressor exit flow area, provides a measure of the bypass ratio (BPR) of the engine. As mentioned earlier, as the BPR increases (e.g., BPR greater than 8.0, greater than 10.0, or greater than 12.0), the engine core size (e.g., the HP compressor exit flow area) decreases and the $L_{CORE}/D_{CORE}$ increases, thereby making it challenging to meet the HP shaft third mode margins. To ensure stable operation of the HP shaft, the $L_{CORE}/D_{CORE}$ is from 2.1 to 4.3. As detailed further below with respect to FIGS. 8 and 9, a first relationship concerns the $L_{CORE}/D_{CORE}$ as a function of a first high-speed shaft operating parameter $HSP_X$ that is given by the following relationship (8):

$$HSP_X = \frac{(A_{ex})^2 * P_{STD} * OPR_{T/O}}{FN_{T/O} * (N_{Stg}/10)^2} \qquad (8)$$

where $P_{STD}$ is standard pressure (e.g., absolute pressure of one atmosphere) defined by a constant value of 14.696 psi (or 14.7 psi), $FN_{T/O}$ is sea-level static thrust at takeoff flight conditions corresponding to a maximum thrust rating for an engine core configuration, for example, reported in the engine Type Certificate Data Sheet (TCDS) and is from 12,675 lbf to 107,480 lbf, $OPR_{T/O}$ is the overall pressure ratio of the engine at takeoff flight conditions corresponding to the maximum thrust rating for an engine core configuration reported in, for example, ICAO ENGINE nvPM EMISSIONS DATA SHEET and is from 26.3 to 82, $N_{Stg}$ is the number of stages in the HP compressor and is 8, 9, 10, or 11, and $A_{EX}$ is the area of the HP compressor exit and is provided by the following relationship (9):

$$A_{EX} = \pi * (R_{TIP,EX}^2 - R_{HUB,EX}^2) \qquad (9)$$

where $R_{TIP,EX}$ and $R_{HUB,EX}$ are measured as detailed above with respect to FIG. 6. $A_{EX}$ is from 11 in² to 95 in².

As alluded to earlier, the inventors further considered the effects of the HP compressor inlet temperature and the inlet corrected flow on the HP shaft redline speed. Based on the studies done, it was found unexpectedly that there are certain relationships among the HP compressor inlet temperature and the inlet corrected flow at takeoff flight conditions, and the HP dynamics that influence the design of the engine core from the perspective of maintaining stable dynamics during engine operations.

A second relationship concerns the HP compressor tip radius ratio and the HP compressor area ratio, referred to as an area ratio high-speed shaft rating ($HSP_{AR}$) and is given by (10):

$$HSP_{AR} = \frac{\left(\frac{L_{CORE}}{D_{CORE}}\right)^2 * AR}{\sqrt{\frac{R_{HUB,IN}}{R_{TIP,IN}}} * \sqrt{\frac{R_{TIP,EX}}{R_{TIP,IN}}}} \qquad (10)$$

where $R_{HUB,IN}/R_{TIP,IN}$ is referred to as the inlet radius ratio, $R_{TIP,EX}/R_{TIP,IN}$ is referred to as the HP compressor tip radius ratio, and AR is the area ratio of the compressor and is the ratio of the area at the inlet of the HP compressor to the area at the exit of the HP compressor ($A_{IN}/A_{EX}$). $A_{IN}$ is the HP compressor inlet flow area and is given by the following relationship (11):

$$A_{IN} = \pi * (R_{TIP,IN} - R_{HUB,IN}) \qquad (11)$$

where $R_{TIP,IN}$ and $R_{HUB,IN}$ are measured as detailed above with respect to FIG. 6. AR is from 5.6 to 13.9, the inlet radius ratio is from 0.4 to 0.6, $R_{TIP,EX}$ is from 4.73 in. to 15.83 in., and $R_{TIP,IN}$ is from 5.68 in. to 16.32 in.

A third relationship concerns the HP compressor tip radius ratio and the HP compressor inlet area, referred to as an inlet area high-speed shaft rating (HSP_$A_{IN}$) and is given by (12):

$$\text{HSP\_}A_{IN} = \frac{\left(\frac{L_{CORE}}{D_{CORE}}\right)^2 * A_{IN}}{\sqrt{\frac{R_{HUB,IN}}{R_{TIP,IN}}} * \sqrt{\frac{R_{TIP,EX}}{R_{TIP,IN}}}} \quad (12)$$

where $R_{HUB,IN}/R_{TIP,IN}$ is referred to as the inlet radius ratio, $R_{TIP,EX}/R_{TIP,IN}$ is referred to as the HP compressor tip radius ratio, and $A_{IN}$ is the area at the inlet of the HP compressor. $A_{IN}$ is from 85 in$^2$ to 703 in$^2$.

As detailed further below with respect to FIG. 12, HSP_$A_{IN}$ is a function of a second high-speed shaft operating parameter (HSP$_{X1}$). HSP$_{X1}$ is given by (13):

$$HSP_{X1} = \frac{A_{EX} * 1000}{FN_{T/O} * (N_{Stg}/10)^2} \quad (13)$$

OPR$_{T/O}$ is the overall pressure ratio of the engine at takeoff flight conditions and is from 26.3 to 82, FN$_{T/O}$ is sea-level static thrust at takeoff flight conditions and is from 12,674 lbf to 107,480 lbf, and $A_{EX}$ is the area of the HP compressor exit and is provided by relationship (9) above.

A fourth relationship concerns the HP compressor exit rim speed, the HP compressor exit temperature, and the HP compressor stage count, referred to as an exit rim speed high-speed shaft rating (HSP_$U_{RIM,R/L}$) and is given by (14):

$$\text{HSP\_}U_{RIM,R/L} = \frac{\left(\frac{L_{CORE}}{D_{CORE}}\right)^2}{N_{stg} * A_{F,IN}^{1/3}} * \left(\frac{T3_{T/O}}{U_{RIM,R/L}}\right)^3 \quad (14)$$

where $N_{stg}$ is the number of stages of the HP compressor and is 8, 9, 10, or 11, $T3_{T/O}$ is the exit temperature of the HP compressor at takeoff flight conditions and is from 1455° R to 2020° R, $A_{F,IN}$ is the frontal area of the HP compressor, and $U_{RIM,R/L}$ is the exit rim speed of the HP compressor at redline speeds (e.g., the rotational speed of the exit stage of the HP compressor at the hub of the exit stage). $A_{F,IN}$ is given by (15):

$$A_{F,IN} = \pi * (R_{TIP,IN})^2 \quad (15)$$

The frontal area $A_{F,IN}$ is from 101 in$^2$ to 837 in$^2$, and $R_{TIP,IN}$ is from 5.68 in to 16.32 in. $U_{RIM,R/L}$ is given by (16):

$$U_{RIM,R/L} = \frac{\pi * N2_{R/L}}{30} * \frac{R_{HUB,EX}}{12} \quad (16)$$

where $N2_{R/L}$ is in RPM, $R_{HUB,EX}$ is in inches and $U_{RIM,R/L}$ is in ft/s.

The exit rim speed of the HP compressor $U_{RIM,R/L}$ is from 1,347 ft/s to 1,557 ft/s, the redline speed of the HP compressor $N2_{R/L}$ is from 10,580 RPM to 35,788 RPM, and $R_{HUB,EX}$ is from 4.31 in to 14.85 in. $T3_{T/O}$ is from 1,455° R to 2,020° R, and is given by (17):

$$T3_{T/O} = T25_{T/O} * (3.465 * AR - 5.7)^{\frac{\gamma - 1}{\gamma * \eta_{Poly}}} \quad (17)$$

where $T25_{T/O}$ is the HP compressor inlet temperature at takeoff flight conditions, AR is the area ratio of the HP compressor, γ is the gas constant of air and is equal to 1.37, $\eta_{Poly}$ is the compressor efficiency and is approximately equal to 0.9. $T25_{T/O}$ is from 579° R to 803° R and is given by (18):

$$T25_{T/O} = T_{ISA} * \left(\frac{1.25 * OPR_{T/O}}{3465 * AR - 5.7}\right)^{\frac{\gamma - 1}{\gamma * \eta_{Poly}}} + T_{IC} \quad (18)$$

where $T_{ISA}$ is ambient temperature and is approximately equal to 545.67° R, OPR$_{T/O}$ is the overall pressure ratio of the engine at takeoff flight conditions, γ is the gas constant of air and is equal to 1.37, $\eta_{Poly}$ is the compression efficiency and is approximately equal to 0.9, $T_{IC}$ is the intercooler temperature drop (e.g., reduction) at takeoff flight conditions upstream of the HP compressor (e.g., between the LP compressor and the HP compressor), and is from −100° R to 0° R, AR is the area ratio of the compressor and is the ratio of the area at the inlet of the HP compressor to the area at the exit of the HP compressor ($A_{IN}/A_{EX}$).

A fifth relationship concerns the HP compressor tip radius ratio and HP compressor inlet temperature, referred to as a radius ratio high-speed shaft rating (HSP$_{RR}$) and is given by (19):

$$HSP_{RR} = \frac{\left(\frac{L_{core}}{D_{core}} * \frac{T25_{T/O}}{T_{STD}}\right)^2}{\sqrt{\frac{R_{HUB,IN}}{R_{TIP,IN}}} * \sqrt{\frac{R_{TIP,EX}}{R_{TIP,IN}}}} \quad (19)$$

where $R_{HUB,IN}/R_{TIP,IN}$ is referred to as the inlet radius ratio, $R_{TIP,EX}/R_{TIP,IN}$ is referred to as the HP compressor tip radius ratio, $T_{STD}$ is the standard temperature and is equal to 518.67° R, and $T25_{T/O}$ is the HP compressor inlet temperature at takeoff flight conditions. The $T25_{T/O}$ is given by the relationship (18) above.

As discussed above, the HP compressor inlet temperature and the inlet corrected flow impact the HP shaft redline speed. The lower HP compressor inlet temperature and the higher inlet corrected flow at the takeoff flight conditions can be obtained by: 1. Increased HP compressor pressure ratio with low HP compressor inlet radius ratio, higher HP compressor exit radius, or higher HP compressor stage count, 2. Intercooling the HP compressor inlet air, 3. Lowering the HP compressor inlet pressure, 4. Water/steam ingestion forward of the HP compressor inlet, 5. Lower specific (corrected) flow, 6. Lower exhaust gas temperature (EGT), 7. Lower OPR or BPR. The lower HP compressor inlet radius ratio and the water/steam ingestion have favorable effects on performance (e.g., increase performance of the HP compressor), the higher HP compressor exit radius, the higher HP compressor stage count, the intercooling, the lowering HP compressor inlet pressure, and the lower specific flow have minor effects on the performance of the HP compressor, while the lower exhaust gas temperature and the lower OPR or BPR have negative effects on the overall engine performance.

Accordingly, the relationships (1) to (19) detailed herein when used together or individually can identify an improved engine core accounting for characteristics associated with lower HP compressor inlet temperatures and higher HP compressor inlet corrected flow, accounting for the factors and tradeoffs discussed above, and bounding those features within constraints to avoid dynamic instability by interaction between one or more vibration modes of the HP shaft. For example, the relationships (1) to (19) results in the unexpected result of lowering the HP compressor tip radius ratio and increasing the HP compressor pressure ratio, thereby lowering the HP compressor inlet temperature at a fixed OPR and increasing the HP compressor inlet corrected flow while accounting for a feasible $L_{CORE}/D_{CORE}$ for avoiding undesired HP shaft dynamics (e.g., the Alford stability and/or the third mode of the HP shaft). Thus, the inventors have unexpectedly discovered the relationships detailed above among the $L_{CORE}/D_{CORE}$, the HP compressor inlet radius ratio, the HP compressor exit radius, and/or the HP compressor inlet temperature and the HP compressor inlet corrected flow, for optimizing performance (e.g., higher T3 or OPR, and/or larger HP compressor blade heights and/or improved clearance) at optimal $L_{CORE}/D_{CORE}$. The relationships detailed above also account for a feasible dynamics margin design space for HP compressor stage count of 9, 10, or greater, and/or for 8 stages at lower HP compressor tip radius ratios with improved performance. The relationships, thus, provide for higher OPR or BPR or exhaust gas temperature configurations with HP compressor stage counts of 8 or greater and either subcritical or supercritical midshaft of the LP shaft.

TABLES 1 to 6 list embodiments of the HP compressor and the HP shaft along with their associated HSR, $HSR_{LP}$, $L_{CORE}/D_{CORE}$, $HSP_{AR}$, $HSP\_A_{IN}$, $HSP\_U_{RIM,R/L}$, and $HSP_{RR}$ values. TABLES 1 to 6 include embodiments 1 to 120 and show values for various parameters of each of the relationships (1) to (19) detailed above. The parameters shown in each of TABLES 1 to 6 can be combined such that each embodiment 1 to 120 includes values for every parameter shown in TABLES 1 to 6.

TABLE 1 lists embodiments of HSR and $HSR_{LP}$, along with the associated $N2_{R/L}$ and $N1_{R/L}$ values. The embodiments inform of the dimensions or qualities of the HP compressor, the HP shaft, and the LP shaft that are believed reasonable and practical for the HP compressor, the HP shaft, and the LP shaft for providing a balance among improving the third mode margin of the HP shaft, without overly reducing performance of the HP compressor and/or the HP turbine. In other words, the HSR and $HSR_{LP}$ indicates the operating ranges of interest, taking into account the constraints in which the HP compressor operates, e.g., the HP compressor inlet temperature and the HP compressor inlet corrected flow, that have not been previously considered in HP compressor and HP shaft designs, as detailed above, as well as ensuring the HP dynamics do not excite the LP shaft and vice-versa.

TABLE 1

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 1 | 24788 | 3.4 | 3.9 | 0.56 | 10137 | 1.6 | −0.54 |
| 2 | 23020 | 2.9 | 2.9 | 0.57 | 9772 | 1.2 | −0.53 |
| 3 | 22481 | 2.9 | 3.1 | 0.64 | 8515 | 1.2 | −0.41 |
| 4 | 22417 | 3.0 | 3.2 | 0.64 | 8515 | 1.2 | −0.41 |
| 5 | 22246 | 2.8 | 2.6 | 0.57 | 9772 | 1.2 | −0.53 |
| 6 | 20928 | 2.9 | 2.8 | 0.59 | 10137 | 1.3 | −0.49 |
| 7 | 19967 | 2.8 | 2.6 | 0.63 | 10137 | 1.3 | −0.44 |
| 8 | 21281 | 2.6 | 2.5 | 0.56 | 9772 | 1.1 | −0.54 |

TABLE 1-continued

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 9 | 21695 | 2.8 | 2.7 | 0.56 | 9772 | 1.2 | −0.54 |
| 10 | 19922 | 3.0 | 2.9 | 0.56 | 9346 | 1.4 | −0.54 |
| 11 | 20809 | 2.7 | 2.7 | 0.52 | 9346 | 1.2 | −0.61 |
| 12 | 20809 | 2.5 | 2.3 | 0.52 | 9346 | 1.0 | −0.61 |
| 13 | 20809 | 2.3 | 1.9 | 0.57 | 9346 | 0.8 | −0.52 |
| 14 | 35788 | 4.3 | 6.2 | 0.59 | 8771 | 1.5 | −0.50 |
| 15 | 35788 | 4.0 | 5.5 | 0.64 | 8771 | 1.4 | −0.42 |
| 16 | 12306 | 2.1 | 1.5 | 0.70 | 10393 | 1.2 | −0.32 |
| 17 | 10580 | 2.1 | 1.5 | 0.64 | 7748 | 1.1 | −0.42 |
| 18 | 24181 | 2.8 | 2.7 | 0.58 | 10632 | 1.2 | −0.51 |
| 19 | 23523 | 2.7 | 2.7 | 0.53 | 10076 | 1.2 | −0.59 |
| 20 | 18378 | 2.2 | 1.7 | 0.73 | 9791 | 0.9 | −0.27 |
| 21 | 18401 | 2.3 | 1.7 | 0.67 | 9696 | 0.9 | −0.37 |
| 22 | 21259 | 2.5 | 2.2 | 0.65 | 10096 | 1.0 | −0.39 |
| 23 | 23255 | 2.8 | 2.7 | 0.67 | 10423 | 1.2 | −0.37 |
| 24 | 20398 | 2.5 | 2.1 | 0.66 | 10329 | 1.1 | −0.38 |
| 25 | 24432 | 2.8 | 2.9 | 0.55 | 10616 | 1.3 | −0.57 |
| 26 | 19914 | 2.4 | 2.0 | 0.77 | 10539 | 1.1 | −0.20 |
| 27 | 19790 | 2.4 | 2.0 | 0.73 | 10174 | 1.0 | −0.26 |
| 28 | 24618 | 3.0 | 3.1 | 0.67 | 11814 | 1.5 | −0.36 |
| 29 | 23073 | 2.7 | 2.6 | 0.67 | 10795 | 1.2 | −0.36 |
| 30 | 24152 | 2.9 | 2.9 | 0.66 | 11535 | 1.4 | −0.38 |
| 31 | 24437 | 2.8 | 2.8 | 0.64 | 11113 | 1.3 | −0.41 |
| 32 | 23043 | 2.7 | 2.6 | 0.61 | 10323 | 1.2 | −0.47 |
| 33 | 20310 | 2.5 | 2.1 | 0.77 | 10081 | 1.1 | −0.20 |
| 34 | 23662 | 2.7 | 2.6 | 0.70 | 11102 | 1.2 | −0.31 |
| 35 | 24039 | 2.8 | 2.8 | 0.69 | 11420 | 1.3 | −0.32 |
| 36 | 20133 | 2.6 | 2.3 | 0.69 | 9988 | 1.1 | −0.34 |
| 37 | 20410 | 2.7 | 2.6 | 0.61 | 9229 | 1.2 | −0.45 |
| 38 | 22900 | 2.9 | 3.0 | 0.58 | 9844 | 1.3 | −0.51 |
| 39 | 28164 | 3.6 | 4.3 | 0.68 | 9745 | 1.5 | −0.35 |
| 40 | 25626 | 3.6 | 4.5 | 0.58 | 6545 | 1.2 | −0.51 |
| 41 | 23225 | 3.3 | 3.6 | 0.64 | 7866 | 1.2 | −0.41 |
| 42 | 21410 | 3.3 | 3.5 | 0.69 | 8122 | 1.3 | −0.34 |
| 43 | 19521 | 2.8 | 2.6 | 0.58 | 9891 | 1.3 | −0.51 |
| 44 | 18233 | 2.8 | 2.6 | 0.62 | 9936 | 1.4 | −0.45 |
| 45 | 19710 | 2.6 | 2.2 | 0.54 | 11250 | 1.3 | −0.58 |
| 46 | 18510 | 2.6 | 2.2 | 0.61 | 11406 | 1.3 | −0.47 |
| 47 | 15207 | 2.5 | 2.1 | 0.72 | 11633 | 1.6 | −0.28 |
| 48 | 17374 | 2.4 | 1.9 | 0.62 | 12784 | 1.4 | −0.44 |
| 49 | 20022 | 2.7 | 2.7 | 0.61 | 9295 | 1.3 | −0.46 |
| 50 | 19304 | 2.4 | 2.0 | 0.57 | 11428 | 1.2 | −0.53 |
| 51 | 17220 | 2.4 | 2.0 | 0.65 | 11778 | 1.3 | −0.40 |
| 52 | 18140 | 2.2 | 1.7 | 0.59 | 12842 | 1.2 | −0.50 |
| 53 | 16123 | 2.2 | 1.7 | 0.66 | 13224 | 1.4 | −0.38 |
| 54 | 18670 | 2.5 | 2.1 | 0.64 | 11034 | 1.3 | −0.41 |
| 55 | 15873 | 2.3 | 1.9 | 0.73 | 11849 | 1.4 | −0.26 |
| 56 | 27161 | 2.8 | 2.9 | 0.65 | 8771 | 0.9 | −0.40 |
| 57 | 22208 | 2.4 | 2.1 | 0.78 | 10971 | 1.0 | −0.18 |
| 58 | 24006 | 2.6 | 2.6 | 0.61 | 9004 | 1.0 | −0.47 |
| 59 | 20495 | 2.3 | 1.9 | 0.64 | 11554 | 1.1 | −0.41 |
| 60 | 17397 | 2.1 | 1.7 | 0.73 | 12849 | 1.2 | −0.26 |
| 61 | 24405 | 2.3 | 2.1 | 0.49 | 9321 | 0.8 | −0.67 |
| 62 | 18478 | 2.2 | 1.8 | 0.74 | 12364 | 1.2 | −0.25 |
| 63 | 19700 | 2.3 | 2.0 | 0.61 | 10906 | 1.1 | −0.47 |
| 64 | 20730 | 2.5 | 2.2 | 0.77 | 8367 | 0.9 | −0.20 |
| 65 | 26513 | 3.0 | 3.5 | 0.58 | 8624 | 1.1 | −0.52 |
| 66 | 20516 | 2.8 | 2.7 | 0.69 | 8012 | 1.1 | −0.33 |
| 67 | 27440 | 3.1 | 3.4 | 0.61 | 9166 | 1.1 | −0.46 |
| 68 | 22948 | 2.8 | 2.7 | 0.58 | 9942 | 1.2 | −0.51 |
| 69 | 23902 | 2.7 | 2.8 | 0.64 | 9569 | 1.1 | −0.41 |
| 70 | 23444 | 2.9 | 2.9 | 0.53 | 6816 | 0.9 | −0.59 |
| 71 | 22409 | 2.4 | 2.1 | 0.67 | 8736 | 0.8 | −0.36 |
| 72 | 26430 | 2.8 | 2.9 | 0.59 | 7546 | 0.8 | −0.50 |
| 73 | 24926 | 3.2 | 3.5 | 0.65 | 9124 | 1.3 | −0.40 |
| 74 | 24030 | 2.9 | 3.0 | 0.72 | 7481 | 0.9 | −0.28 |
| 75 | 24497 | 3.1 | 3.4 | 0.73 | 8976 | 1.2 | −0.27 |
| 76 | 25286 | 3.0 | 3.3 | 0.61 | 9854 | 1.3 | −0.46 |
| 77 | 27176 | 2.9 | 3.2 | 0.49 | 6886 | 0.8 | −0.66 |
| 78 | 24306 | 3.1 | 3.1 | 0.72 | 10523 | 1.4 | −0.28 |
| 79 | 21613 | 2.4 | 2.0 | 0.66 | 9631 | 0.9 | −0.38 |
| 80 | 27294 | 3.4 | 4.0 | 0.70 | 8494 | 1.2 | −0.31 |
| 81 | 26052 | 3.6 | 4.2 | 0.71 | 8157 | 1.3 | −0.31 |
| 82 | 26029 | 3.5 | 4.2 | 0.67 | 8882 | 1.4 | −0.37 |
| 83 | 21762 | 2.7 | 2.6 | 0.72 | 7908 | 0.9 | −0.29 |
| 84 | 24839 | 3.4 | 3.8 | 0.60 | 8481 | 1.3 | −0.48 |
| 85 | 25546 | 3.1 | 3.4 | 0.54 | 9088 | 1.2 | −0.57 |

TABLE 1-continued

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 86 | 23396 | 3.0 | 3.2 | 0.78 | 10436 | 1.4 | −0.19 |
| 87 | 21419 | 2.7 | 2.5 | 0.76 | 8521 | 1.0 | −0.21 |
| 88 | 26095 | 3.1 | 3.4 | 0.70 | 9709 | 1.3 | −0.32 |
| 89 | 23364 | 2.9 | 2.9 | 0.72 | 9835 | 1.2 | −0.28 |
| 90 | 24653 | 3.4 | 3.9 | 0.74 | 8923 | 1.4 | −0.25 |
| 91 | 23589 | 3.3 | 3.7 | 0.59 | 8376 | 1.3 | −0.50 |
| 92 | 20805 | 2.7 | 2.5 | 0.80 | 8693 | 1.0 | −0.15 |
| 93 | 23344 | 3.2 | 3.6 | 0.60 | 6345 | 1.0 | −0.48 |
| 94 | 26303 | 3.4 | 4.0 | 0.72 | 8481 | 1.3 | −0.29 |
| 95 | 23050 | 2.7 | 2.5 | 0.71 | 8264 | 0.9 | −0.30 |
| 96 | 23094 | 3.3 | 3.6 | 0.65 | 8411 | 1.3 | −0.39 |
| 97 | 24334 | 3.4 | 3.8 | 0.72 | 7411 | 1.2 | −0.29 |
| 98 | 24109 | 2.8 | 2.8 | 0.73 | 9936 | 1.2 | −0.26 |
| 99 | 27525 | 3.1 | 3.5 | 0.65 | 8938 | 1.1 | −0.39 |
| 100 | 26067 | 2.8 | 3.1 | 0.49 | 7071 | 0.8 | −0.66 |
| 101 | 24924 | 3.1 | 3.4 | 0.52 | 9768 | 1.3 | −0.60 |
| 102 | 25797 | 3.6 | 4.3 | 0.70 | 8334 | 1.4 | −0.31 |
| 103 | 24704 | 3.4 | 4.0 | 0.65 | 8037 | 1.3 | −0.40 |
| 104 | 26645 | 3.4 | 3.8 | 0.61 | 9325 | 1.3 | −0.46 |
| 105 | 23578 | 3.3 | 3.7 | 0.71 | 8428 | 1.3 | −0.30 |
| 106 | 27652 | 3.4 | 3.9 | 0.66 | 8802 | 1.2 | −0.38 |
| 107 | 21015 | 3.1 | 3.3 | 0.66 | 8078 | 1.3 | −0.39 |
| 108 | 24454 | 2.7 | 2.6 | 0.66 | 9936 | 1.1 | −0.38 |
| 109 | 25294 | 2.8 | 2.9 | 0.68 | 9283 | 1.1 | −0.35 |
| 110 | 24002 | 3.3 | 3.8 | 0.68 | 8082 | 1.3 | −0.35 |
| 111 | 25956 | 3.2 | 3.6 | 0.62 | 9610 | 1.3 | −0.45 |
| 112 | 23911 | 3.2 | 3.5 | 0.69 | 8746 | 1.3 | −0.33 |
| 113 | 24993 | 3.1 | 3.3 | 0.55 | 6672 | 0.9 | −0.56 |
| 114 | 24106 | 2.8 | 2.8 | 0.64 | 7524 | 0.9 | −0.42 |
| 115 | 26699 | 3.1 | 3.6 | 0.59 | 7611 | 1.0 | −0.49 |
| 116 | 24229 | 2.9 | 3.2 | 0.65 | 8541 | 1.1 | −0.39 |
| 117 | 21483 | 2.6 | 2.4 | 0.68 | 7855 | 0.9 | −0.34 |
| 118 | 23965 | 3.0 | 3.2 | 0.64 | 8443 | 1.1 | −0.42 |
| 119 | 26550 | 2.9 | 3.1 | 0.53 | 7813 | 0.9 | −0.59 |
| 120 | 24214 | 3.1 | 3.2 | 0.61 | 8266 | 1.1 | −0.46 |

With reference to TABLE 1, $N2_{R/L}$ is in a range from 10,580 RPM to 35,788 RPM, HSR is in a range from 1.5 to 6.2, HST is in a range from 0.49 to 0.8, $N1_{R/L}$ is in a range from 6,345 RPM to 13,225 RPM, $HSR_{LP}$ is in a range from 0.8 to 1.6, and LST is in a range from −0.15 to −0.67.

TABLE 2 lists embodiments of the HP compressor and the HP shaft along with the associated HSR and $L_{CORE}/D_{CORE}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the HSR and the $L_{CORE}/D_{CORE}$ ratio indicates the operating ranges of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 2

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP,EX}$ (in) | $R_{HUB,EX}$ (in) | $A_{EX}$ (in²) | $L_{CORE}$ (in) | $L_{CORE}/D_{CORE}$ | HSR | $HSP_X$ |
|---|---|---|---|---|---|---|---|---|---|---|---|---|
| 1 | 35940 | 1113 | 24788 | 49.5 | 10 | 6.9 | 6.39 | 21 | 46.5 | 3.4 | 3.9 | 9.3 |
| 2 | 36228 | 1113 | 23020 | 44.1 | 9 | 7.6 | 7.1 | 22 | 43.9 | 2.9 | 2.9 | 10.8 |
| 3 | 36228 | 1175 | 22481 | 41.8 | 10 | 7.9 | 7.39 | 22 | 46.2 | 2.9 | 3.1 | 8.5 |
| 4 | 36228 | 1175 | 22417 | 40.7 | 10 | 7.7 | 7.26 | 22 | 46.8 | 3.0 | 3.2 | 7.7 |
| 5 | 36228 | 1113 | 22246 | 44.1 | 9 | 7.8 | 7.31 | 23 | 43 | 2.8 | 2.6 | 12.2 |
| 6 | 36228 | 1113 | 20928 | 44.1 | 10 | 8 | 7.43 | 29 | 46.2 | 2.9 | 2.8 | 15.1 |
| 7 | 36228 | 1113 | 19967 | 44.1 | 11 | 8.4 | 7.78 | 32 | 47.2 | 2.8 | 2.6 | 15 |
| 8 | 3628 | 1113 | 21281 | 44.1 | 9 | 8.4 | 7.86 | 26 | 43.9 | 2.6 | 2.5 | 15.5 |
| 9 | 36228 | 1113 | 21695 | 44.1 | 9 | 8 | 7.5 | 25 | 44.9 | 2.8 | 2.7 | 13.5 |
| 10 | 39515 | 1113 | 19922 | 44.1 | 9 | 8.4 | 7.8 | 32 | 49.8 | 3.0 | 2.9 | 20.6 |
| 11 | 39515 | 1113 | 20809 | 44.1 | 8 | 8.8 | 8.11 | 34 | 47.7 | 2.7 | 2.7 | 30.4 |
| 12 | 27633 | 1113 | 20809 | 37.4 | 8 | 8.8 | 8.11 | 34 | 43.7 | 2.5 | 2.3 | 36.9 |
| 13 | 19324 | 1113 | 20809 | 31.7 | 8 | 8.8 | 8.11 | 34 | 39.7 | 2.3 | 1.9 | 44.7 |
| 14 | 18124 | 1113 | 35788 | 40.9 | 9 | 4.7 | 4.31 | 12 | 40.3 | 4.3 | 6.2 | 5.7 |
| 15 | 12674 | 1113 | 35788 | 34.6 | 9 | 4.7 | 4.31 | 12 | 38.2 | 4.0 | 5.5 | 6.9 |
| 16 | 75161 | 1113 | 12306 | 47.8 | 10 | 13 | 12.57 | 68 | 56.2 | 2.1 | 1.5 | 43 |
| 17 | 107480 | 1113 | 10580 | 56.4 | 10 | 16 | 14.85 | 95 | 66.8 | 2.1 | 1.5 | 69.1 |
| 18 | 25247 | 1063 | 24181 | 44.9 | 8 | 7.4 | 6.83 | 24 | 40.9 | 2.8 | 2.7 | 24.2 |
| 19 | 25288 | 1080 | 23523 | 41.7 | 8 | 7.6 | 7.06 | 26 | 41.7 | 2.7 | 2.7 | 25.4 |
| 20 | 29198 | 1158 | 18378 | 32.5 | 8 | 9.2 | 8.7 | 30 | 40.9 | 2.2 | 1.7 | 23.4 |
| 21 | 26169 | 1208 | 18401 | 26.3 | 8 | 9.2 | 8.6 | 34 | 41.7 | 2.3 | 1.7 | 26 |
| 22 | 23249 | 1088 | 21259 | 32.5 | 8 | 8.2 | 7.59 | 28 | 40.9 | 2.5 | 2.2 | 25.7 |
| 23 | 29699 | 1071 | 23255 | 53.5 | 9 | 7.4 | 6.94 | 22 | 41.7 | 2.8 | 2.7 | 16.2 |
| 24 | 20081 | 1073 | 20398 | 32.5 | 9 | 8.2 | 7.72 | 26 | 40.9 | 2.5 | 2.1 | 19.5 |
| 25 | 27940 | 1102 | 24432 | 62.9 | 9 | 7.4 | 6.93 | 19 | 41.7 | 2.8 | 2.9 | 14.8 |
| 26 | 24574 | 1074 | 19914 | 53.5 | 10 | 8.6 | 8.3 | 18 | 41.7 | 2.4 | 2 | 10.1 |
| 27 | 28698 | 1119 | 19790 | 53.4 | 10 | 8.5 | 8.12 | 19 | 40.9 | 2.4 | 2 | 10.2 |
| 28 | 22111 | 1160 | 24618 | 53.5 | 10 | 7 | 6.67 | 15 | 41.7 | 3.0 | 3.1 | 8.4 |
| 29 | 24668 | 1079 | 23073 | 62.9 | 10 | 7.5 | 7.17 | 16 | 40.9 | 2.7 | 2.6 | 9.7 |
| 30 | 25477 | 1186 | 24152 | 62.9 | 10 | 7.2 | 6.83 | 15 | 41.7 | 2.9 | 2.9 | 7.6 |
| 31 | 26508 | 1103 | 24437 | 82 | 10 | 7.2 | 6.93 | 13 | 40.9 | 2.8 | 2.8 | 8.1 |
| 32 | 31781 | 1128 | 23043 | 62.9 | 10 | 7.7 | 7.3 | 20 | 41.7 | 2.7 | 2.6 | 11.7 |
| 33 | 29444 | 1134 | 20310 | 34.9 | 8 | 8.6 | 8.06 | 29 | 42.4 | 2.5 | 2.1 | 22.3 |
| 34 | 25868 | 1165 | 23662 | 40.6 | 8 | 7.4 | 6.86 | 22 | 40.3 | 2.7 | 2.6 | 17.3 |
| 35 | 25169 | 1135 | 24039 | 51.2 | 9 | 7.4 | 7.03 | 18 | 41.9 | 2.8 | 2.8 | 12.5 |
| 36 | 29459 | 1107 | 20133 | 43 | 9 | 8.7 | 8.16 | 26 | 44.5 | 2.6 | 2.3 | 17.7 |
| 37 | 30518 | 1065 | 20410 | 58.8 | 10 | 8.7 | 8.28 | 22 | 47 | 2.7 | 2.6 | 13.9 |
| 38 | 25749 | 1069 | 22900 | 64.6 | 10 | 7.8 | 7.4 | 18 | 45.4 | 2.9 | 3 | 11.6 |
| 39 | 18136 | 1113 | 28164 | 40.6 | 10 | 5.8 | 5.48 | 11 | 41.9 | 3.6 | 4.3 | 4.3 |

TABLE 2-continued

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP,EX}$ (in) | $R_{HUB,EX}$ (in) | $A_{EX}$ (in²) | $L_{CORE}$ (in) | $L_{CORE}/D_{CORE}$ | HSR | $HSP_X$ |
|---|---|---|---|---|---|---|---|---|---|---|---|---|
| 40 | 36229 | 1113 | 25626 | 40.7 | 9 | 6.6 | 6.03 | 24 | 48.3 | 3.6 | 4.5 | 11.4 |
| 41 | 36254 | 1113 | 23225 | 40.6 | 10 | 7.2 | 6.66 | 23 | 47.3 | 3.3 | 3.6 | 8.8 |
| 42 | 36253 | 1113 | 21410 | 40.4 | 10 | 7.7 | 7.23 | 23 | 50.3 | 3.3 | 3.5 | 8.6 |
| 43 | 52524 | 1113 | 19521 | 40.7 | 9 | 8.6 | 7.92 | 34 | 48.2 | 2.8 | 2.6 | 16.5 |
| 44 | 52523 | 1113 | 18233 | 41 | 9 | 9.1 | 8.48 | 34 | 51.2 | 2.8 | 2.6 | 16.6 |
| 45 | 52525 | 1113 | 19710 | 40.1 | 9 | 8.5 | 7.85 | 36 | 43.7 | 2.6 | 2.2 | 17.7 |
| 46 | 52561 | 1113 | 18510 | 40.7 | 10 | 9 | 8.36 | 35 | 46 | 2.6 | 2.2 | 13.9 |
| 47 | 52558 | 1113 | 15207 | 40.1 | 10 | 11 | 10.17 | 34 | 54.1 | 2.5 | 2.1 | 12.7 |
| 48 | 52560 | 1113 | 17374 | 40.6 | 10 | 9.5 | 8.9 | 34 | 45.2 | 2.4 | 1.9 | 13.1 |
| 49 | 52523 | 1113 | 20022 | 40.8 | 9 | 8.9 | 8.3 | 34 | 49 | 2.7 | 2.7 | 16.8 |
| 50 | 52524 | 1113 | 19304 | 40.8 | 9 | 9.3 | 8.61 | 36 | 44.2 | 2.4 | 2 | 18.2 |
| 51 | 52522 | 1113 | 17220 | 40.9 | 9 | 10 | 9.65 | 34 | 48.1 | 2.4 | 2 | 16.7 |
| 52 | 52523 | 1113 | 18140 | 40.8 | 9 | 9.8 | 9.16 | 35 | 43.2 | 2.2 | 1.7 | 17.1 |
| 53 | 52522 | 1113 | 16123 | 40.8 | 9 | 11 | 10.31 | 33 | 47.2 | 2.2 | 1.7 | 15.8 |
| 54 | 52560 | 1113 | 18670 | 40.7 | 10 | 9.5 | 8.9 | 35 | 46.7 | 2.5 | 2.1 | 14 |
| 55 | 52558 | 1113 | 15873 | 39.9 | 10 | 11 | 10.47 | 34 | 51.5 | 2.3 | 1.9 | 13.3 |
| 56 | 18124 | 1113 | 27161 | 40.8 | 9 | 6.7 | 6.42 | 12 | 37.6 | 2.8 | 2.9 | 5.7 |
| 57 | 18136 | 1113 | 22208 | 39.4 | 10 | 8.3 | 8.04 | 12 | 39.4 | 2.4 | 2.1 | 4.7 |
| 58 | 36228 | 1113 | 54006 | 40.9 | 9 | 7.9 | 7.4 | 24 | 41.6 | 2.6 | 2.6 | 11.8 |
| 59 | 36228 | 1113 | 20495 | 41 | 9 | 9.1 | 8.67 | 24 | 41.3 | 2.3 | 1.9 | 12.1 |
| 60 | 36228 | 1113 | 17397 | 40.2 | 9 | 11 | 10.21 | 24 | 45 | 2.1 | 1.7 | 11.4 |
| 61 | 36230 | 1113 | 24405 | 40.1 | 9 | 7.8 | 7.28 | 27 | 36.4 | 2.3 | 2.1 | 14.4 |
| 62 | 36253 | 1113 | 18478 | 39.8 | 10 | 10 | 9.61 | 24 | 43.6 | 2.2 | 1.8 | 9.5 |
| 63 | 52523 | 1113 | 19700 | 40.9 | 9 | 9.6 | 9.02 | 36 | 44.7 | 2.3 | 2 | 17.9 |
| 64 | 29791 | 1141 | 20730 | 46.7 | 10 | 8.7 | 8.42 | 16 | 42.9 | 2.5 | 2.2 | 5.6 |
| 65 | 38564 | 1123 | 26513 | 48.5 | 8 | 7.1 | 6.58 | 21 | 43.1 | 3.0 | 3.5 | 13 |
| 66 | 41861 | 1258 | 20516 | 39.3 | 10 | 8.3 | 7.81 | 22 | 46.9 | 2.8 | 2.7 | 6.7 |
| 67 | 34695 | 1249 | 27440 | 40.3 | 9 | 6.7 | 6.2 | 19 | 40.8 | 3.1 | 3.4 | 7.4 |
| 68 | 45080 | 1187 | 22948 | 40.2 | 9 | 7.6 | 6.99 | 26 | 42.5 | 2.8 | 2.7 | 11.1 |
| 69 | 38835 | 1252 | 23902 | 42.3 | 8 | 7.8 | 7.37 | 19 | 42.6 | 2.7 | 2.8 | 9.4 |
| 70 | 41411 | 1128 | 23444 | 39.3 | 8 | 7.6 | 7 | 29 | 43.7 | 2.9 | 2.9 | 17.7 |
| 71 | 40010 | 1281 | 22409 | 44.2 | 9 | 8.3 | 7.93 | 18 | 39.9 | 2.4 | 2.1 | 6.8 |
| 72 | 34589 | 1261 | 26430 | 40.1 | 8 | 7.1 | 6.62 | 19 | 39 | 2.8 | 2.9 | 9.5 |
| 73 | 36392 | 1184 | 24926 | 45.2 | 10 | 6.7 | 6.3 | 18 | 43.6 | 3.2 | 3.5 | 6.1 |
| 74 | 29097 | 1266 | 24030 | 46.7 | 9 | 7.4 | 7.07 | 13 | 42.5 | 2.9 | 3 | 5.1 |
| 75 | 29975 | 1273 | 24497 | 47.3 | 10 | 7.1 | 6.77 | 13 | 44.3 | 3.1 | 3.4 | 4 |
| 76 | 35983 | 1230 | 25286 | 38.4 | 8 | 7.1 | 6.62 | 21 | 43.2 | 3.0 | 3.3 | 10.3 |
| 77 | 35202 | 1136 | 27176 | 39.2 | 8 | 6.9 | 6.33 | 26 | 40.4 | 2.9 | 3.2 | 16.8 |
| 78 | 28834 | 1252 | 24306 | 42.3 | 10 | 6.9 | 6.54 | 14 | 42.2 | 3.1 | 3.1 | 4.2 |
| 79 | 38443 | 1282 | 21613 | 38.2 | 9 | 8.5 | 8.13 | 20 | 40.2 | 2.4 | 2 | 7.5 |
| 80 | 27754 | 1263 | 27294 | 43.6 | 10 | 6.2 | 5.82 | 13 | 42.4 | 3.4 | 4 | 4.1 |
| 81 | 27382 | 1156 | 26052 | 43.3 | 10 | 6.4 | 5.96 | 15 | 45.4 | 3.6 | 4.2 | 5.4 |
| 82 | 34118 | 1225 | 26029 | 48.9 | 10 | 6.4 | 5.99 | 15 | 45.2 | 3.4 | 4.2 | 4.8 |
| 83 | 41362 | 1282 | 21762 | 48.9 | 10 | 8 | 7.65 | 17 | 43.3 | 2.7 | 2.6 | 4.9 |
| 84 | 33372 | 1118 | 24839 | 44.3 | 10 | 6.8 | 6.35 | 20 | 46 | 3.4 | 3.8 | 7.9 |
| 85 | 44425 | 1118 | 25546 | 43.2 | 9 | 7 | 6.29 | 28 | 43.2 | 3.1 | 3.4 | 13.4 |
| 86 | 28190 | 1269 | 23396 | 45.3 | 10 | 7.5 | 7.2 | 13 | 45.3 | 3.0 | 3.2 | 3.8 |
| 87 | 35231 | 1273 | 21419 | 47.9 | 10 | 8.1 | 7.83 | 15 | 43.4 | 2.7 | 2.5 | 4.3 |
| 88 | 28272 | 1262 | 26095 | 44.8 | 10 | 6.7 | 6.33 | 13 | 41.4 | 3.1 | 3.4 | 4.1 |
| 89 | 42416 | 1282 | 23364 | 48.5 | 10 | 7.6 | 7.26 | 17 | 43.9 | 2.9 | 2.9 | 4.9 |
| 90 | 28346 | 1263 | 24653 | 40 | 10 | 6.8 | 6.15 | 15 | 46.4 | 3.4 | 3.9 | 4.5 |
| 91 | 43315 | 1115 | 23589 | 41.3 | 9 | 7.2 | 6.59 | 27 | 47.4 | 3.3 | 3.7 | 12.5 |
| 92 | 33540 | 1259 | 20805 | 47.8 | 10 | 8.5 | 8.24 | 14 | 45.2 | 2.7 | 2.5 | 4.3 |
| 93 | 42603 | 1139 | 23344 | 41.4 | 9 | 7.4 | 6.8 | 26 | 47.5 | 3.2 | 3.6 | 12.1 |
| 94 | 29583 | 1278 | 26303 | 47.6 | 10 | 6.5 | 6.13 | 13 | 44.3 | 3.4 | 4 | 3.8 |
| 95 | 31357 | 1281 | 23050 | 41.7 | 10 | 7.6 | 7.24 | 15 | 40.7 | 2.7 | 2.5 | 4.7 |
| 96 | 44345 | 1215 | 23094 | 42.4 | 10 | 7.3 | 6.78 | 23 | 47.5 | 3.3 | 3.6 | 7.2 |
| 97 | 36178 | 1233 | 24334 | 45.9 | 10 | 6.9 | 6.5 | 17 | 46.5 | 3.4 | 3.8 | 5.2 |
| 98 | 33158 | 1260 | 24109 | 46 | 10 | 7.4 | 7.02 | 15 | 41.6 | 2.8 | 2.8 | 4.4 |
| 99 | 32153 | 1279 | 27525 | 48.7 | 10 | 6.6 | 6.27 | 14 | 40.9 | 3.1 | 3.5 | 4.3 |
| 100 | 44003 | 1118 | 26067 | 48.4 | 8 | 7.4 | 6.78 | 26 | 41.9 | 2.8 | 3.1 | 17.6 |
| 101 | 42640 | 1127 | 24924 | 41.3 | 9 | 6.9 | 6.22 | 27 | 43 | 3.1 | 3.4 | 13.1 |
| 102 | 30510 | 1281 | 25797 | 39.3 | 10 | 6.4 | 6.02 | 16 | 46 | 3.6 | 4.3 | 4.7 |
| 103 | 39341 | 1137 | 24704 | 43.8 | 9 | 6.9 | 6.37 | 22 | 47.6 | 3.4 | 4 | 9.7 |
| 104 | 38354 | 1216 | 26645 | 43.6 | 10 | 6.3 | 5.83 | 19 | 42.8 | 3.4 | 3.8 | 6.3 |
| 105 | 39061 | 1277 | 23578 | 48.7 | 10 | 7 | 6.64 | 16 | 46.9 | 3.3 | 3.7 | 4.6 |
| 106 | 34146 | 1256 | 27652 | 45.3 | 10 | 6.2 | 5.83 | 16 | 41.9 | 3.4 | 3.9 | 4.9 |
| 107 | 44129 | 1158 | 21015 | 42.1 | 10 | 7.9 | 7.38 | 25 | 49.6 | 3.1 | 3.3 | 8.5 |
| 108 | 39281 | 1281 | 24454 | 47.1 | 9 | 7.5 | 7.13 | 17 | 40.3 | 2.7 | 2.6 | 6.1 |
| 109 | 27391 | 1213 | 25294 | 45 | 9 | 7.2 | 6.87 | 14 | 40.6 | 2.8 | 2.9 | 5.8 |
| 110 | 36428 | 1203 | 24002 | 43.8 | 10 | 7 | 6.61 | 19 | 47.1 | 3.3 | 3.8 | 6.2 |
| 111 | 45242 | 1281 | 25956 | 44.8 | 10 | 6.7 | 6.15 | 20 | 42.8 | 3.2 | 3.6 | 6.1 |
| 112 | 31468 | 1271 | 23911 | 46.1 | 10 | 6.9 | 6.55 | 14 | 44.7 | 3.2 | 3.5 | 4.2 |
| 113 | 44365 | 1118 | 24993 | 44.5 | 9 | 7 | 6.32 | 27 | 42.7 | 3.1 | 3.3 | 13.1 |
| 114 | 40875 | 1186 | 24106 | 46.7 | 8 | 7.7 | 7.31 | 20 | 42.6 | 2.8 | 2.8 | 11 |
| 115 | 38425 | 1246 | 26699 | 40.3 | 9 | 6.8 | 6.28 | 21 | 42.5 | 3.1 | 3.6 | 8.6 |
| 116 | 42939 | 1208 | 24229 | 44.4 | 8 | 7.6 | 7.14 | 21 | 44.7 | 2.9 | 3.2 | 10.8 |

TABLE 2-continued

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP,EX}$ (in) | $R_{HUB,EX}$ (in) | $A_{EX}$ (in²) | $L_{CORE}$ (in) | $L_{CORE}/D_{CORE}$ | HSR | $HSP_X$ |
|---|---|---|---|---|---|---|---|---|---|---|---|---|
| 117 | 38881 | 1139 | 21483 | 46.8 | 9 | 8.5 | 8.13 | 20 | 43.8 | 2.6 | 2.4 | 9.1 |
| 118 | 43139 | 1250 | 23965 | 43.5 | 10 | 7.3 | 6.8 | 21 | 44.3 | 3.0 | 3.2 | 6.5 |
| 119 | 36707 | 1195 | 26550 | 40.8 | 8 | 7.2 | 6.66 | 23 | 41.1 | 2.9 | 3.1 | 13 |
| 120 | 43047 | 1201 | 24214 | 42.7 | 10 | 7.2 | 6.65 | 23 | 43.8 | 3.1 | 3.2 | 7.7 |

The ranges of $FN_{T/O}$, $N2_{R/L}$, $OPR_{T/O}$, $R_{HUB,EX}$, $A_{EX}$, $L_{CORE}$, and $L_{CORE}/D_{CORE}$ are detailed above. HSR is given by relationship (1) above and is from 1.5 to 6.2. The exhaust gas temperature (EGT) is from 1,063° C. to 1,282° C. at redline speeds of the HP shaft. The EGT is a measure of BPR of the turbine engine along with the fan diameter. The EGT is limited by material capability of the LP turbine inlet blades. For example, the LP turbine inlet blades can include metallic single crystal blades uncooled (e.g., minimum capability), cooled (+200° C.), or CMC blade uncooled (+100° C. to +150° C.). The fan diameter is a function of the thrust requirement, and the core size is decided by the EGT and the OPR. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). Accordingly, embodiments 1 to 120 provide for lowering the core size, while accounting for the dynamics margins and overall engine performance.

Figure 8:
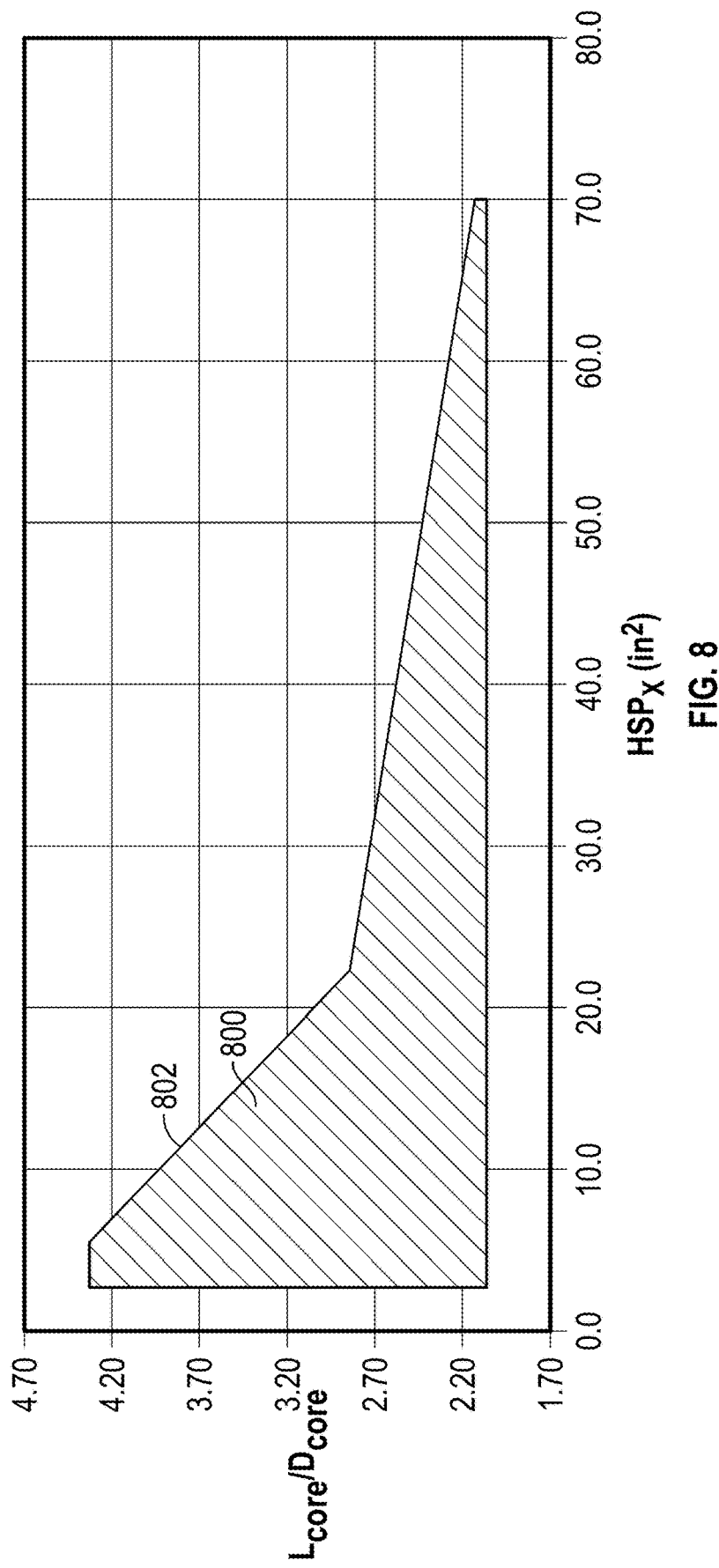
FIG. 8 represents, in graph form, a range of a high-speed shaft rating (HSR). In particular.

FIG. 8 represents, in graph form, the $L_{CORE}/D_{CORE}$ as a function of the $HSP_X$. $HSP_X$ is given by relationship (8) detailed above. $L_{CORE}/D_{CORE}$ is in a range from 2.1 to 4.3 and $HSP_X$ is in a range from 3.8 in² to 69.1 in². An area 800 represents the boundaries of $L_{CORE}/D_{CORE}$ and $HSP_X$. $L_{CORE}/D_{CORE}$ and $HSP_X$ are bounded by an upper bound 802. The upper bound 802 is given by (20):

$$\frac{L_{CORE}}{D_{CORE}} < \text{MAX}(4.8 - 0.088 * (HSP_X), 3.18 - 0.015 * (HSP_X)) \quad (20)$$

With reference to TABLE 2 and FIG. 8, in general, $L_{CORE}/D_{CORE}$ decreases as $HSP_X$ increases, and $L_{CORE}/D_{CORE}$ increases as $HSP_X$ decreases. $HSP_X$ increases with increased $A_{EX}$ and/or increases $OPR_{T/O}$, and decreases with increased $FN_{T/O}$. The area 800 shows the behavior of lower core size, leading to higher $L_{CORE}/D_{CORE}$ due to $L_{CORE}$ not scaling with flow size, as detailed above. For direct drive engines, reducing the core size leads to an increase in $L_{CORE}/D_{CORE}$ (e.g., up to 3.25), which has an effect on the dynamics margins, thereby limiting the design of the engine core. For geared engines (e.g., indirect drive), the $L_{CORE}/D_{CORE}$ is limited to about 3.0, which has been achieved with 8 stage compressors. The BPR can be increased in three ways: 1. Increased thrust from the same engine core size by increasing the fan size, 2. Smaller engine core size with increased OPR by increasing the LP compressor pressure ratio or increasing T25, or 3. Smaller engine core size with increased EGT. All three methods of increasing the BPR lead to lowering the $HSP_X$, thereby increasing $L_{CORE}/D_{CORE}$. To increase $L_{CORE}/D_{CORE}$ with minimal effects on the dynamics margins, the HP compressor tip radius ratio is increased, and the number of HP compressor stages is reduced. Additionally, smaller blade heights at the HP compressor exit can be utilized.

Accordingly, the area 800 illustrates feasible dynamics zone for higher stage count compressors with higher $L_{CORE}/D_{CORE}$ than engines without the benefit of the present disclosure (e.g., engines at lower $HSP_X$). This is achieved by balancing the HP compressor inlet temperature, corrected inlet flows, and higher HP compressor pressure ratios with the radius ratio.

Figure 9:
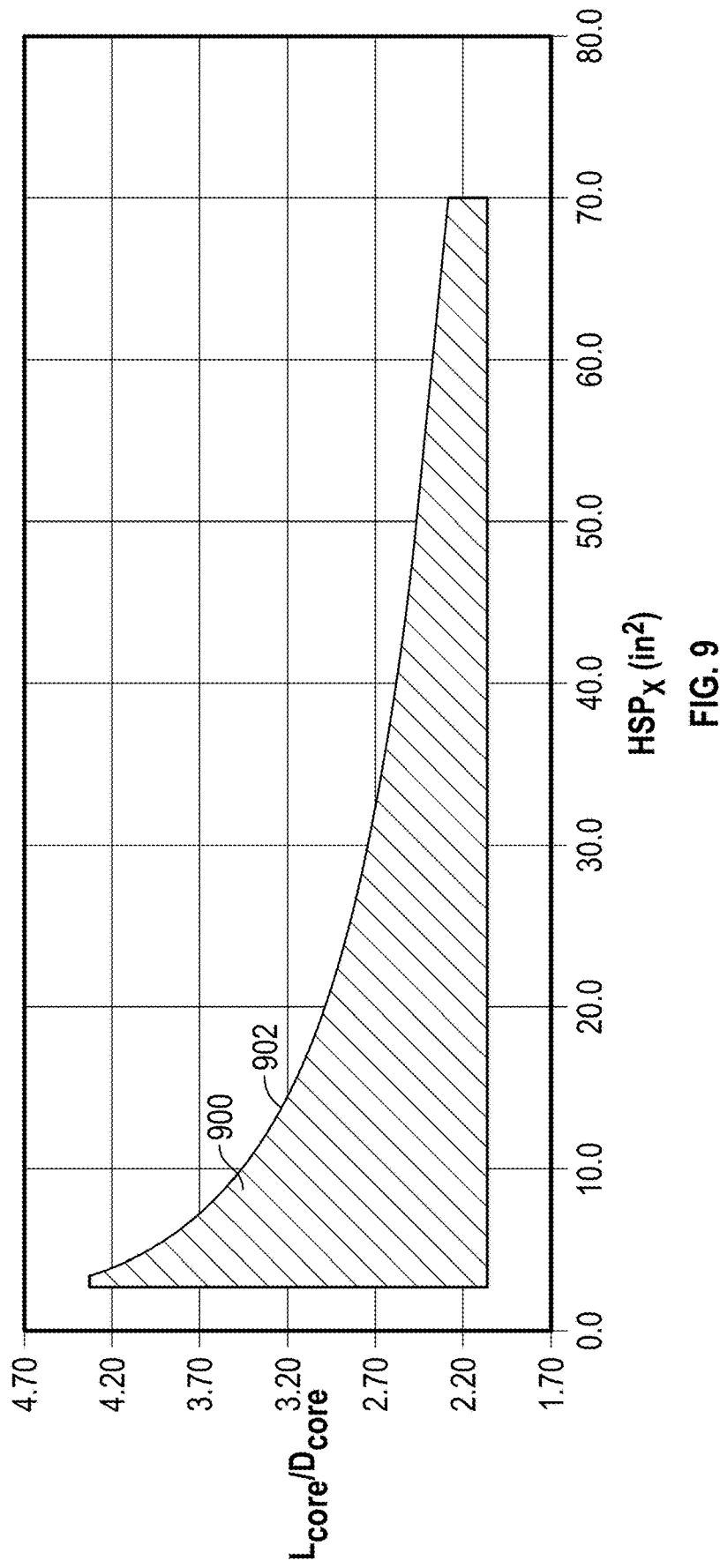
FIG. 9 represents, in graph form, a range of a high-speed shaft rating (HSR), according to another embodiment.

FIG. 9 represents, in graph form, the $L_{CORE}/D_{CORE}$ as a function of the $HSP_X$, according to another embodiment. $HSP_X$ is given by relationship (8) detailed above. $L_{CORE}/D_{CORE}$ is in a range from 2.1 to 4.35 and $HSP_X$ is in a range from 3.86 in² to 69.2 in². An area 900 represents the boundaries of $L_{CORE}/D_{CORE}$ and $HSP_X$. $L_{CORE}/D_{CORE}$ and $HSP_X$ are bounded by an upper bound 902. The upper bound 902 is given by (21):

$$\frac{L_{CORE}}{D_{CORE}} < \frac{4.08}{(HSP_X - 8)^{0.14}} \quad (21)$$

With reference to TABLE 2 and FIG. 9, in general, $L_{CORE}/D_{CORE}$ decreases as $HSP_X$ increases, and $L_{CORE}/D_{CORE}$ increases as $HSP_X$ decreases, as detailed above. $HSP_X$ increases with increased $A_{EX}$ and/or increases $OPR_{T/O}$, and decreases with increased $FN_{T/O}$, as detailed above.

TABLE 3 lists embodiments of the HP compressor and the HP shaft along with the associated $HSP_{AR}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP_{AR}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 3

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in²) | $A_{EX}$ (in²) | AR | $HSP_X$ (in²) | $HSP_{AR}$ |
|---|---|---|---|---|---|---|---|---|---|---|---|
| 1 | 35940 | 49.5 | 10 | 0.47 | 8.35 | 6.9 | 170 | 21 | 7.9 | 9.3 | 144 |
| 2 | 36228 | 44.1 | 9 | 0.56 | 8.68 | 7.58 | 162 | 22 | 7.3 | 10.8 | 87 |
| 3 | 36228 | 41.8 | 10 | 0.47 | 8.85 | 7.86 | 192 | 22 | 8.6 | 8.5 | 115 |

TABLE 3-continued

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in²) | $A_{EX}$ (in²) | AR | $HSP_X$ (in²) | $HSP_{AR}$ |
|---|---|---|---|---|---|---|---|---|---|---|---|
| 4 | 36228 | 40.7 | 10 | 0.47 | 8.6 | 7.72 | 181 | 22 | 8.4 | 7.7 | 118 |
| 5 | 36228 | 44.1 | 9 | 0.56 | 8.9 | 7.8 | 171 | 23 | 7.3 | 12.2 | 79 |
| 6 | 36228 | 44.1 | 10 | 0.56 | 10.25 | 8.03 | 227 | 29 | 7.8 | 15.1 | 97 |
| 7 | 36228 | 44.1 | 11 | 0.56 | 11.2 | 8.41 | 270 | 32 | 8.5 | 15 | 103 |
| 8 | 36228 | 44.1 | 9 | 0.56 | 9.4 | 8.38 | 190 | 26 | 7.2 | 15.5 | 70 |
| 9 | 36228 | 44.1 | 9 | 0.56 | 9.1 | 8.01 | 178 | 25 | 7.2 | 13.5 | 80 |
| 10 | 39515 | 44.1 | 9 | 0.56 | 10.35 | 8.43 | 230 | 32 | 7.2 | 20.6 | 93 |
| 11 | 39515 | 44.1 | 8 | 0.57 | 10.25 | 8.76 | 223 | 34 | 6.5 | 30.4 | 69 |
| 12 | 27633 | 37.4 | 8 | 0.57 | 9.69 | 8.76 | 199 | 34 | 5.8 | 36.9 | 50 |
| 13 | 19324 | 31.7 | 8 | 0.57 | 9.69 | 8.76 | 199 | 34 | 5.8 | 44.7 | 41 |
| 14 | 18124 | 40.9 | 9 | 0.4 | 5.68 | 4.73 | 85 | 12 | 7.2 | 5.7 | 228 |
| 15 | 12674 | 34.6 | 9 | 0.4 | 5.68 | 4.73 | 85 | 12 | 7.2 | 6.9 | 205 |
| 16 | 75161 | 47.8 | 10 | 0.4 | 13.98 | 13.4 | 516 | 68 | 7.6 | 43 | 54 |
| 17 | 107480 | 56.4 | 10 | 0.4 | 16.32 | 15.83 | 703 | 95 | 7.4 | 69.1 | 53 |
| 18 | 25247 | 44.9 | 8 | 0.52 | 8.02 | 7.37 | 148 | 24 | 6.1 | 24.2 | 68 |
| 19 | 25288 | 41.7 | 8 | 0.56 | 8.76 | 7.62 | 165 | 26 | 6.4 | 25.4 | 68 |
| 20 | 29198 | 32.5 | 8 | 0.57 | 10.07 | 9.24 | 213 | 30 | 7.1 | 23.4 | 48 |
| 21 | 26169 | 26.3 | 8 | 0.58 | 9.96 | 9.2 | 207 | 34 | 6.2 | 26 | 44 |
| 22 | 23249 | 32.5 | 8 | 0.54 | 9.2 | 8.17 | 190 | 28 | 6.7 | 25.7 | 61 |
| 23 | 29699 | 53.5 | 9 | 0.47 | 8.37 | 7.43 | 172 | 22 | 7.7 | 16.2 | 95 |
| 24 | 20081 | 32.5 | 9 | 0.54 | 9.09 | 8.23 | 184 | 26 | 7.1 | 19.5 | 63 |
| 25 | 27940 | 62.9 | 9 | 0.56 | 8.23 | 7.35 | 145 | 19 | 7.6 | 14.8 | 86 |
| 26 | 24574 | 53.5 | 10 | 0.5 | 9.06 | 8.64 | 194 | 18 | 10.9 | 10.1 | 92 |
| 27 | 28698 | 53.4 | 10 | 0.55 | 9.55 | 8.49 | 201 | 19 | 10.4 | 10.2 | 87 |
| 28 | 22111 | 53.5 | 10 | 0.46 | 7.39 | 7.03 | 136 | 15 | 8.8 | 8.4 | 118 |
| 29 | 24668 | 62.9 | 10 | 0.53 | 8.45 | 7.52 | 162 | 16 | 10.1 | 9.7 | 109 |
| 30 | 25477 | 62.9 | 10 | 0.54 | 7.91 | 7.16 | 139 | 15 | 9.6 | 7.6 | 116 |
| 31 | 26508 | 82 | 10 | 0.57 | 8.16 | 7.23 | 141 | 13 | 10.5 | 8.1 | 118 |
| 32 | 31781 | 62.9 | 10 | 0.43 | 8.21 | 7.73 | 173 | 20 | 8.6 | 11.7 | 99 |
| 33 | 29444 | 34.9 | 8 | 0.46 | 9.13 | 8.61 | 207 | 29 | 7.2 | 22.3 | 67 |
| 34 | 25868 | 40.6 | 8 | 0.52 | 8.11 | 7.35 | 151 | 22 | 6.9 | 17.3 | 76 |
| 35 | 25169 | 51.2 | 9 | 0.44 | 7.6 | 7.43 | 147 | 18 | 8 | 12.5 | 97 |
| 36 | 29459 | 43 | 9 | 0.47 | 9.12 | 8.65 | 202 | 26 | 7.8 | 17.7 | 77 |
| 37 | 30518 | 58.8 | 10 | 0.51 | 9.72 | 8.69 | 219 | 22 | 9.9 | 13.9 | 107 |
| 38 | 25749 | 64.6 | 10 | 0.55 | 9.01 | 7.77 | 177 | 18 | 10 | 11.6 | 123 |
| 39 | 18136 | 40.6 | 10 | 0.54 | 6.89 | 5.8 | 106 | 11 | 9.2 | 4.3 | 178 |
| 40 | 36229 | 40.7 | 9 | 0.4 | 7.95 | 6.62 | 167 | 24 | 7.1 | 11.4 | 163 |
| 41 | 36254 | 40.6 | 10 | 0.4 | 8.53 | 7.19 | 192 | 23 | 8.3 | 8.8 | 155 |
| 42 | 36253 | 40.4 | 10 | 0.4 | 9.03 | 7.71 | 215 | 23 | 9.4 | 8.6 | 171 |
| 43 | 52524 | 40.7 | 9 | 0.54 | 10.46 | 8.59 | 243 | 34 | 7.1 | 16.5 | 84 |
| 44 | 52523 | 41 | 9 | 0.54 | 10.97 | 9.1 | 268 | 34 | 7.8 | 16.6 | 93 |
| 45 | 52525 | 40.1 | 9 | 0.6 | 10.6 | 8.54 | 226 | 36 | 6.3 | 17.7 | 59 |
| 46 | 52561 | 40.7 | 10 | 0.54 | 10.91 | 9 | 265 | 35 | 7.6 | 13.9 | 74 |
| 47 | 52558 | 40.1 | 10 | 0.54 | 12.48 | 10.69 | 347 | 34 | 10.3 | 12.7 | 97 |
| 48 | 52560 | 40.6 | 10 | 0.6 | 11.55 | 9.49 | 268 | 34 | 7.9 | 13.1 | 63 |
| 49 | 52523 | 40.8 | 9 | 0.4 | 9.99 | 8.94 | 263 | 34 | 7.6 | 16.8 | 96 |
| 50 | 52524 | 40.8 | 9 | 0.54 | 10.57 | 9.25 | 249 | 36 | 6.9 | 18.2 | 57 |
| 51 | 52522 | 40.9 | 9 | 0.54 | 11.4 | 10.2 | 289 | 34 | 8.4 | 16.7 | 68 |
| 52 | 52523 | 40.8 | 9 | 0.6 | 11.17 | 9.75 | 251 | 35 | 7.2 | 17.1 | 49 |
| 53 | 52522 | 40.8 | 9 | 0.6 | 12.09 | 10.81 | 294 | 33 | 8.8 | 15.8 | 57 |
| 54 | 52560 | 40.7 | 10 | 0.4 | 10.55 | 9.51 | 294 | 35 | 14 | 14 | 84 |
| 55 | 52558 | 39.9 | 10 | 0.4 | 11.82 | 10.98 | 369 | 34 | 10.7 | 13.3 | 97 |
| 56 | 18124 | 40.8 | 9 | 0.6 | 7.06 | 6.71 | 100 | 12 | 8.5 | 5.7 | 88 |
| 57 | 18136 | 39.4 | 10 | 0.54 | 8.26 | 8.27 | 152 | 12 | 12.5 | 4.7 | 96 |
| 58 | 36228 | 40.9 | 9 | 0.4 | 8.32 | 7.9 | 182 | 24 | 7.6 | 11.8 | 86 |
| 59 | 36228 | 41 | 9 | 0.54 | 9.56 | 9.1 | 203 | 24 | 8.4 | 12.1 | 60 |
| 60 | 36228 | 40.2 | 9 | 0.54 | 10.72 | 10.57 | 256 | 24 | 10.8 | 11.4 | 67 |
| 61 | 36230 | 40.1 | 9 | 0.6 | 8.66 | 7.84 | 151 | 27 | 5.6 | 14.4 | 41 |
| 62 | 36253 | 39.8 | 10 | 0.4 | 10.08 | 10.01 | 268 | 24 | 11 | 9.5 | 83 |
| 63 | 52523 | 40.9 | 9 | 0.4 | 10.12 | 9.62 | 270 | 36 | 7.6 | 17.9 | 66 |
| 64 | 29791 | 46.7 | 10 | 0.46 | 8.88 | 8.71 | 194 | 16 | 12.4 | 5.6 | 111 |
| 65 | 38564 | 48.5 | 8 | 0.45 | 7.87 | 7.08 | 156 | 21 | 7.3 | 13 | 108 |
| 66 | 41861 | 39.3 | 10 | 0.45 | 9.07 | 8.25 | 205 | 22 | 9.3 | 6.7 | 117 |
| 67 | 34695 | 40.3 | 9 | 0.45 | 7.51 | 6.66 | 142 | 19 | 7.6 | 7.4 | 113 |
| 68 | 45080 | 40.2 | 9 | 0.54 | 9.14 | 7.57 | 185 | 26 | 7.1 | 11.1 | 83 |
| 69 | 38835 | 42.3 | 8 | 0.53 | 8.55 | 7.78 | 165 | 19 | 8.5 | 9.4 | 92 |
| 70 | 41411 | 39.3 | 8 | 0.51 | 8.69 | 7.62 | 174 | 29 | 6.1 | 17.7 | 75 |
| 71 | 40010 | 44.2 | 9 | 0.54 | 8.53 | 8.29 | 161 | 18 | 8.7 | 6.8 | 70 |
| 72 | 34589 | 40.1 | 8 | 0.55 | 7.86 | 7.06 | 135 | 19 | 7.1 | 9.5 | 77 |
| 73 | 36392 | 45.2 | 10 | 0.48 | 8.02 | 6.74 | 155 | 18 | 8.4 | 6.1 | 138 |
| 74 | 29097 | 46.7 | 9 | 0.56 | 8.03 | 7.36 | 140 | 13 | 10.6 | 5.1 | 124 |
| 75 | 29975 | 47.3 | 9 | 0.45 | 7.56 | 7.08 | 143 | 13 | 10.9 | 4 | 165 |
| 76 | 35983 | 38.4 | 8 | 0.51 | 8.03 | 7.1 | 151 | 21 | 7.4 | 10.3 | 102 |
| 77 | 35202 | 39.2 | 8 | 0.45 | 7.58 | 6.94 | 143 | 26 | 5.6 | 16.8 | 73 |
| 78 | 28834 | 42.3 | 10 | 0.55 | 7.91 | 6.88 | 138 | 14 | 9.8 | 4.2 | 134 |
| 79 | 38443 | 38.2 | 9 | 0.55 | 8.83 | 8.52 | 171 | 20 | 8.4 | 7.5 | 64 |
| 80 | 27754 | 43.6 | 10 | 0.47 | 7.19 | 6.17 | 126 | 13 | 9.5 | 4.1 | 175 |

TABLE 3-continued

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in²) | $A_{EX}$ (in²) | AR | $HSP_X$ (in²) | $HSP_{AR}$ |
|---|---|---|---|---|---|---|---|---|---|---|---|
| 81 | 27382 | 43.3 | 10 | 0.42 | 7.46 | 6.35 | 144 | 15 | 9.5 | 5.4 | 203 |
| 82 | 34118 | 48.9 | 10 | 0.49 | 7.71 | 6.38 | 142 | 15 | 9.4 | 4.8 | 185 |
| 83 | 41362 | 48.9 | 10 | 0.53 | 8.96 | 7.99 | 182 | 17 | 10.9 | 4.9 | 117 |
| 84 | 33372 | 44.3 | 10 | 0.43 | 7.91 | 6.83 | 160 | 20 | 8 | 7.9 | 148 |
| 85 | 44425 | 43.2 | 9 | 0.43 | 8.17 | 6.96 | 172 | 28 | 6.2 | 13.4 | 100 |
| 86 | 28190 | 45.3 | 10 | 0.41 | 7.78 | 7.46 | 158 | 13 | 12.4 | 3.8 | 182 |
| 87 | 35231 | 47.9 | 10 | 0.53 | 8.98 | 8.12 | 182 | 15 | 12.4 | 4.3 | 127 |
| 88 | 28272 | 44.8 | 10 | 0.49 | 7.3 | 6.66 | 127 | 13 | 9.6 | 4.1 | 138 |
| 89 | 42416 | 48.5 | 10 | 0.41 | 8.43 | 7.63 | 186 | 17 | 10.9 | 4.9 | 149 |
| 90 | 28346 | 40 | 10 | 0.4 | 7.88 | 6.84 | 164 | 15 | 11.1 | 4.5 | 216 |
| 91 | 43315 | 41.3 | 9 | 0.45 | 8.86 | 7.21 | 196 | 27 | 7.3 | 12.5 | 129 |
| 92 | 33540 | 47.8 | 10 | 0.45 | 8.93 | 8.52 | 200 | 14 | 13.9 | 4.3 | 150 |
| 93 | 42603 | 41.4 | 9 | 0.44 | 8.82 | 7.39 | 198 | 26 | 7.6 | 12.1 | 129 |
| 94 | 29583 | 47.6 | 10 | 0.46 | 7.4 | 6.45 | 135 | 13 | 10.7 | 3.8 | 198 |
| 95 | 31357 | 41.7 | 10 | 0.56 | 8.55 | 7.57 | 158 | 15 | 10.2 | 4.7 | 105 |
| 96 | 44345 | 42.4 | 10 | 0.4 | 8.73 | 7.29 | 201 | 23 | 8.9 | 7.2 | 163 |
| 97 | 36178 | 45.9 | 10 | 0.41 | 8.11 | 6.89 | 172 | 17 | 10.3 | 5.2 | 199 |
| 98 | 33158 | 46 | 10 | 0.48 | 8.11 | 7.35 | 158 | 15 | 10.8 | 4.4 | 131 |
| 99 | 32153 | 48.7 | 10 | 0.41 | 6.94 | 6.61 | 125 | 14 | 9 | 4.3 | 138 |
| 100 | 44003 | 48.4 | 8 | 0.44 | 7.93 | 7.37 | 159 | 26 | 6 | 17.6 | 76 |
| 101 | 42640 | 41.3 | 9 | 0.51 | 8.56 | 6.89 | 171 | 27 | 6.3 | 13.1 | 96 |
| 102 | 30510 | 39.3 | 10 | 0.41 | 7.61 | 6.42 | 152 | 16 | 9.6 | 4.7 | 211 |
| 103 | 39341 | 43.8 | 9 | 0.41 | 8.26 | 6.9 | 178 | 22 | 8.1 | 9.7 | 165 |
| 104 | 38354 | 43.6 | 10 | 0.45 | 7.59 | 6.33 | 144 | 19 | 7.4 | 6.3 | 137 |
| 105 | 39061 | 48.7 | 10 | 0.49 | 8.39 | 7.01 | 168 | 16 | 10.6 | 4.6 | 185 |
| 106 | 34146 | 45.3 | 10 | 0.44 | 7.32 | 6.24 | 136 | 16 | 8.6 | 4.9 | 159 |
| 107 | 44129 | 42.1 | 10 | 0.44 | 9.29 | 7.9 | 219 | 25 | 8.9 | 8.5 | 144 |
| 108 | 39281 | 47.1 | 9 | 0.55 | 8.24 | 7.5 | 149 | 17 | 8.9 | 6.1 | 91 |
| 109 | 27391 | 45 | 9 | 0.53 | 7.5 | 7.19 | 126 | 14 | 9.1 | 5.8 | 101 |
| 110 | 36428 | 43.8 | 10 | 0.41 | 8.35 | 7.04 | 182 | 19 | 9.7 | 6.2 | 184 |
| 111 | 45242 | 44.8 | 10 | 0.43 | 7.81 | 6.65 | 156 | 20 | 7.6 | 6.1 | 130 |
| 112 | 31468 | 46.1 | 10 | 0.55 | 7.83 | 6.89 | 135 | 14 | 9.6 | 4.2 | 147 |
| 113 | 44365 | 44.5 | 9 | 0.49 | 8.52 | 6.97 | 174 | 27 | 6.5 | 13.1 | 96 |
| 114 | 40875 | 46.7 | 8 | 0.5 | 8.51 | 7.74 | 171 | 20 | 8.4 | 11 | 94 |
| 115 | 38425 | 40.3 | 9 | 0.4 | 7.62 | 6.8 | 153 | 21 | 7.2 | 8.6 | 118 |
| 116 | 42939 | 44.4 | 8 | 0.44 | 8.37 | 7.6 | 178 | 21 | 8.3 | 10.8 | 114 |
| 117 | 38881 | 46.8 | 9 | 0.48 | 8.96 | 8.52 | 194 | 20 | 9.5 | 9.1 | 93 |
| 118 | 43139 | 43.5 | 10 | 0.43 | 8.39 | 7.28 | 181 | 21 | 8.7 | 6.5 | 132 |
| 119 | 36707 | 40.8 | 8 | 0.45 | 7.54 | 7.18 | 143 | 23 | 6.3 | 13 | 79 |
| 120 | 43047 | 42.7 | 10 | 0.42 | 8.39 | 7.18 | 182 | 23 | 7.9 | 7.7 | 123 |

The embodiments 1 to 120 of TABLE 3 are the same as the embodiments 1 to 120 of TABLES 1 and 2, but TABLE 3 includes parameters in the $HSP_{AR}$ relationship (10) above. The ranges of $FN_{T/O}$, $N2_{R/L}$, $OPR_{T/O}$, $N_{STG}$, $R_{HUB,IN}/R_{TIP,IN}$, $R_{TIP,IN}$, $R_{TIP,EX}$, $A_{IN}$, $A_{EX}$, AR, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ are proportional to engine core size. $A_{IN}$ increases to achieve higher HP compressor pressure ratios. AR is indicative of the HP compressor pressure ratio, and, thus, indicative of T25. Accordingly, embodiments 1 to 120 provide for lowering the core size, while accounting for the dynamics margins and overall engine performance.

Figure 10:
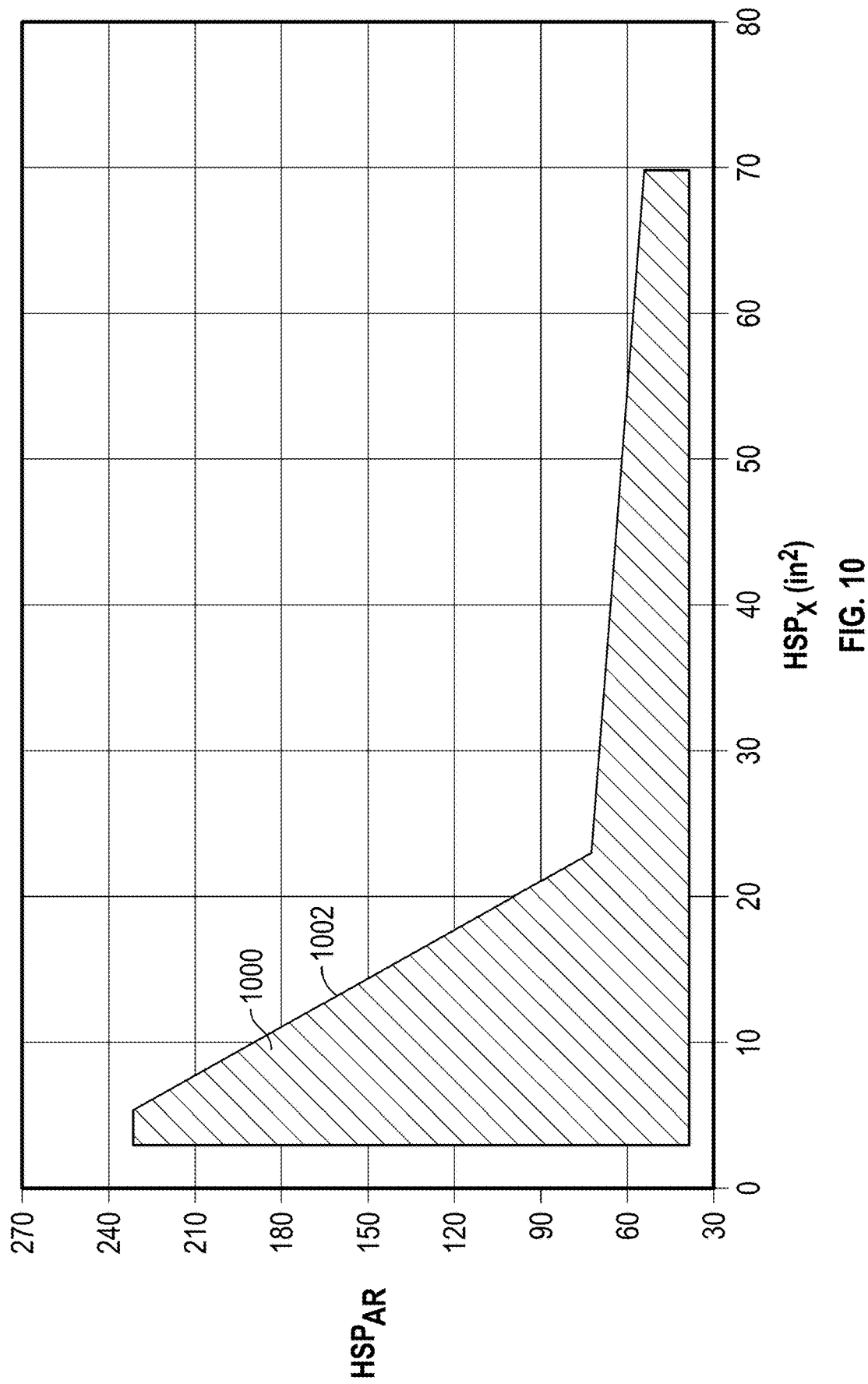
FIG. 10 represents, in graph form, an area ratio high-speed shaft rating ($HSP_{AR}$) as a function of the $HSP_X$.

FIG. 10 represents, in graph form, the $HSP_{AR}$ as a function of the $HSP_X$. $HSP_X$ is given by relationship (8) detailed above. $HSP_{AR}$ is in a range from 41 to 228 and $HSP_X$ is in a range from 3.8 in² to 69.1 in². An area 1000 represents the boundaries of $HSP_{AR}$ and $HSP_X$. $HSP_{AR}$ is given by relationship (10) above. $HSP_{AR}$ and $HSP_X$ are bounded by an upper bound 1002. The upper bound 1002 is given by (22):

$$HSP_{AR} < MAX(280-9*(HSP_X), 82-0.4*(HSP_X)) \quad (22)$$

With reference to TABLE 3 and FIG. 10, in general, $HSP_{AR}$ increases as $HSP_X$ increases, and $HSP_{AR}$ decreases as $HSP_X$ increases. $HSP_X$ increases with increased $A_{EX}$ and/or increases $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Higher AR, higher HP compressor pressure ratio, lower T25, and higher inlet corrected flow result in lower $N2_{R/L}$. Increased radius ratio, reduced blade height, reduce HP compressor speeds, and lower HP compressor pressure ratios result in diminishing returns on dynamics margins with poor performance. Accordingly, embodiments 1 to 120 provide for balancing higher AR with increased radius ratios to meet dynamics margins with improved performance of the engine core (and of the overall engine).

The lower the $HSP_{AR}$, the greater the third mode margin and the lower the HP compressor tip radius ratio for improved performance of the HP compressor and the HP turbine. Thus, the $HSP_{AR}$ is selected for providing a balance among improving the third mode margin of the HP shaft, without overly sacrificing performance of the HP compressor and/or the HP turbine.

Figure 11:
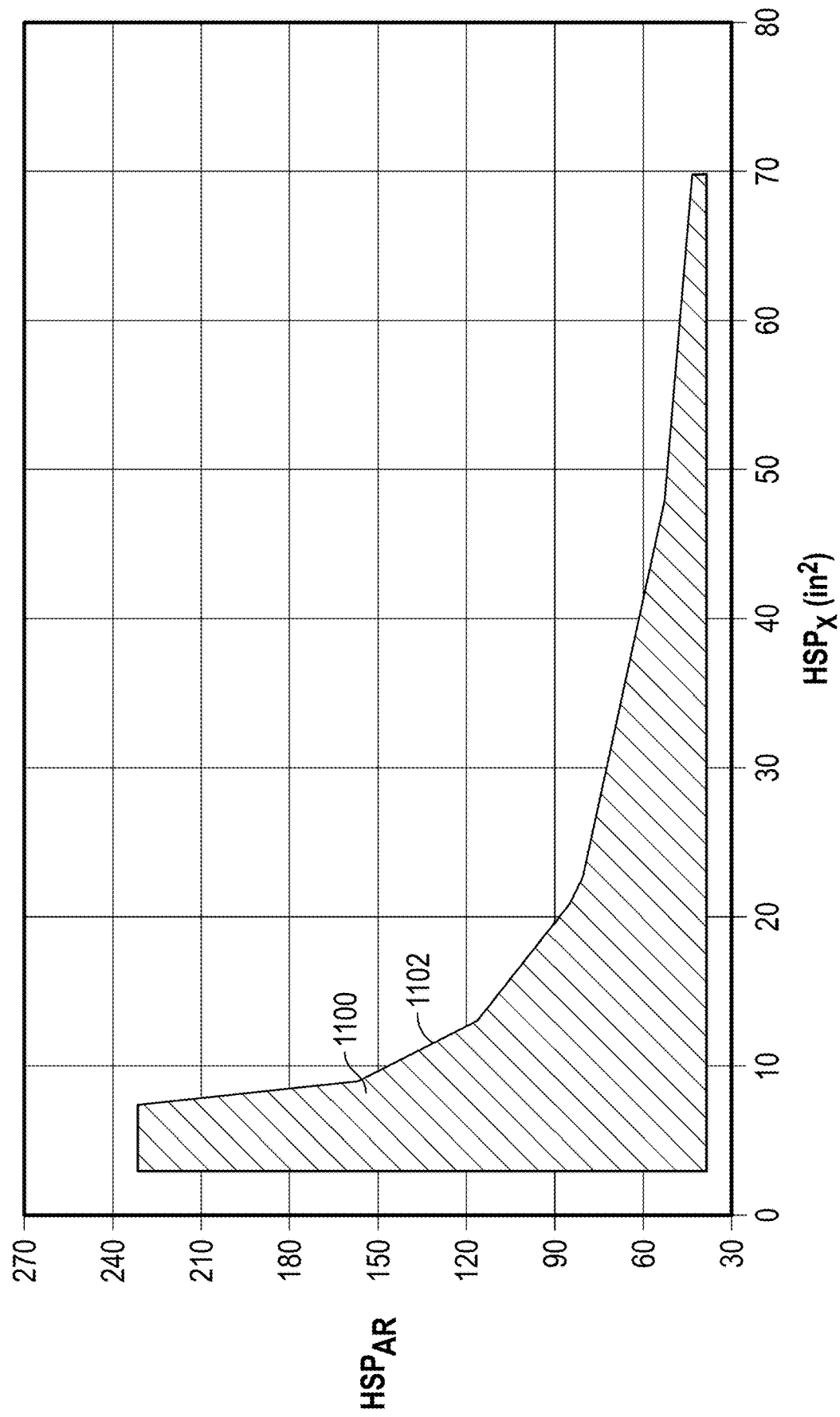
FIG. 11 represents, in graph form, an area ratio high-speed shaft rating ($HSP_{AR}$) as a function of the $HSP_X$, according to another embodiment.

FIG. 11 represents, in graph form, the $HSP_{AR}$ as a function of the $HSP_X$, according to another embodiment. $HSP_X$ is given by relationship (8) detailed above. $HSP_{AR}$ is in a range from 41 to 228 and $HSP_X$ is in a range from 3.8 in² to 69.1 in². An area 1100 represents the boundaries of $HSP_{AR}$ and $HSP_X$. $HSP_{AR}$ is bounded by an upper bound 1102. The upper bound 1102 is given by (23):

$$HSP_{AR} < \frac{350}{(HSP_X - 4)^{0.5}} \quad (23)$$

With reference to TABLE 3 and FIG. 11, in general, $HSP_{AR}$ increases as $HSP_X$ increases, and $HSP_{AR}$ decreases as $HSP_X$ increases, as detailed above. $HSP_X$ increases with increased $A_{EX}$ and/or increases $OPR_{T/O}$, and decreases with increased $FN_{T/O}$, as detailed above.

TABLE 4 lists embodiments of the HP compressor and the HP shaft along with the associated $HSP\_A_{IN}$ values of the HP compressor and the HP shaft. The embodiments inform the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP\_A_{IN}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 4

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in²) | $A_{EX}$ (in²) | $L_{CORE}/D_{CORE}$ | $HSP_{X1}$ (in²/klbf) | $HSP\_A_{IN}$ (in²) |
|---|---|---|---|---|---|---|---|---|---|---|
| 1 | 35940 | 24788 | 0.47 | 8.35 | 6.9 | 170 | 21 | 3.4 | 0.6 | 3081 |
| 2 | 36228 | 23020 | 0.56 | 8.68 | 7.58 | 162 | 22 | 2.9 | 0.76 | 1927 |
| 3 | 36228 | 22481 | 0.47 | 8.85 | 7.86 | 192 | 22 | 2.9 | 0.62 | 2572 |
| 4 | 36228 | 22417 | 0.47 | 8.6 | 7.72 | 181 | 22 | 3 | 0.6 | 2565 |
| 5 | 36228 | 22246 | 0.56 | 8.9 | 7.8 | 171 | 23 | 2.8 | 0.8 | 1852 |
| 6 | 36228 | 20928 | 0.56 | 10.25 | 8.03 | 227 | 29 | 2.9 | 0.8 | 2828 |
| 7 | 36228 | 19967 | 0.56 | 11.2 | 8.41 | 270 | 32 | 2.8 | 0.73 | 3288 |
| 8 | 36228 | 21281 | 0.56 | 9.4 | 8.38 | 190 | 26 | 2.6 | 0.9 | 1841 |
| 9 | 36228 | 21695 | 0.56 | 9.1 | 8.01 | 178 | 25 | 2.8 | 0.84 | 1988 |
| 10 | 39515 | 19922 | 0.56 | 10.35 | 8.43 | 230 | 32 | 3 | 1.0 | 2970 |
| 11 | 39515 | 20809 | 0.57 | 10.25 | 8.76 | 223 | 34 | 2.7 | 1.36 | 2369 |
| 12 | 27633 | 20809 | 0.57 | 9.69 | 8.76 | 199 | 34 | 2.5 | 1.95 | 1729 |
| 13 | 19324 | 20809 | 0.57 | 9.69 | 8.76 | 199 | 34 | 2.3 | 2.79 | 1427 |
| 14 | 18124 | 35788 | 0.4 | 5.68 | 4.73 | 85 | 12 | 4.3 | 0.8 | 2683 |
| 15 | 12674 | 35788 | 0.4 | 5.68 | 4.73 | 85 | 12 | 4 | 1.15 | 2406 |
| 16 | 75161 | 12306 | 0.4 | 13.98 | 13.4 | 516 | 68 | 2.1 | 0.9 | 3665 |
| 17 | 107480 | 10580 | 0.4 | 16.32 | 15.83 | 703 | 95 | 2.1 | 0.88 | 5017 |
| 18 | 25247 | 24181 | 0.52 | 8.02 | 7.37 | 148 | 24 | 2.8 | 1.51 | 1645 |
| 19 | 25288 | 23523 | 0.56 | 8.76 | 7.62 | 165 | 26 | 2.7 | 1.6 | 1771 |
| 20 | 29198 | 18378 | 0.57 | 10.07 | 9.24 | 213 | 30 | 2.2 | 1.62 | 1444 |
| 21 | 26169 | 18401 | 0.58 | 9.96 | 9.2 | 207 | 34 | 2.3 | 2 | 1462 |
| 22 | 23249 | 21259 | 0.54 | 9.2 | 8.17 | 190 | 28 | 2.5 | 1.9 | 1726 |
| 23 | 29699 | 23255 | 0.47 | 8.37 | 7.43 | 172 | 22 | 2.8 | 0.92 | 2110 |
| 24 | 20081 | 20398 | 0.54 | 9.09 | 8.23 | 184 | 26 | 2.5 | 1.58 | 1628 |
| 25 | 27940 | 24432 | 0.56 | 8.23 | 7.35 | 145 | 19 | 2.8 | 0.84 | 1642 |
| 26 | 24574 | 19914 | 0.5 | 9.06 | 8.64 | 194 | 18 | 2.4 | 0.72 | 1641 |
| 27 | 28698 | 19790 | 0.55 | 9.55 | 8.49 | 201 | 19 | 2.4 | 0.67 | 1682 |
| 28 | 22111 | 24618 | 0.46 | 7.39 | 7.03 | 136 | 15 | 3 | 0.7 | 1819 |
| 29 | 24668 | 23073 | 0.53 | 8.45 | 7.52 | 162 | 16 | 2.7 | 0.65 | 1757 |
| 30 | 25477 | 24152 | 0.54 | 7.91 | 7.16 | 139 | 15 | 2.9 | 0.57 | 1682 |
| 31 | 26508 | 24437 | 0.57 | 8.16 | 7.23 | 141 | 13 | 2.8 | 0.51 | 1585 |
| 32 | 31781 | 23043 | 0.43 | 8.21 | 7.73 | 173 | 20 | 2.7 | 0.63 | 1981 |
| 33 | 29444 | 20310 | 0.46 | 9.13 | 8.61 | 207 | 29 | 2.5 | 1.52 | 1911 |
| 34 | 25868 | 23662 | 0.52 | 8.11 | 7.35 | 151 | 22 | 2.7 | 1.32 | 1656 |
| 35 | 25169 | 24039 | 0.44 | 7.6 | 7.43 | 147 | 18 | 2.8 | 0.9 | 1784 |
| 36 | 29459 | 20133 | 0.47 | 9.12 | 8.65 | 202 | 26 | 2.6 | 1.08 | 1998 |
| 37 | 30518 | 20410 | 0.51 | 9.72 | 8.69 | 219 | 22 | 2.7 | 0.73 | 2369 |
| 38 | 25749 | 22900 | 0.55 | 9.01 | 7.77 | 177 | 18 | 2.9 | 0.69 | 2191 |
| 39 | 18136 | 28164 | 0.54 | 6.89 | 5.8 | 106 | 11 | 3.6 | 0.63 | 2045 |
| 40 | 36229 | 25626 | 0.4 | 7.95 | 6.62 | 167 | 24 | 3.6 | 0.81 | 3841 |
| 41 | 36254 | 23225 | 0.4 | 8.53 | 7.19 | 192 | 23 | 3.3 | 0.64 | 3582 |
| 42 | 36253 | 21410 | 0.4 | 9.03 | 7.71 | 215 | 23 | 3.3 | 0.63 | 3912 |
| 43 | 52524 | 19521 | 0.54 | 10.46 | 8.59 | 243 | 34 | 2.8 | 0.81 | 2881 |
| 44 | 52523 | 18233 | 0.54 | 10.97 | 9.1 | 268 | 34 | 2.8 | 0.8 | 3166 |
| 45 | 52525 | 19710 | 0.6 | 10.6 | 8.54 | 226 | 36 | 2.6 | 0.84 | 2126 |
| 46 | 52561 | 18510 | 0.54 | 10.91 | 9 | 265 | 35 | 2.6 | 0.66 | 2596 |
| 47 | 52558 | 15207 | 0.54 | 12.48 | 10.69 | 347 | 34 | 2.5 | 0.64 | 3269 |
| 48 | 52560 | 17374 | 0.6 | 11.55 | 9.49 | 268 | 34 | 2.4 | 0.65 | 2161 |
| 49 | 52523 | 20022 | 0.4 | 9.99 | 8.94 | 263 | 34 | 2.7 | 0.81 | 3313 |
| 50 | 52524 | 19304 | 0.54 | 10.57 | 9.25 | 249 | 36 | 2.4 | 0.84 | 2063 |
| 51 | 52522 | 17220 | 0.54 | 11.4 | 10.2 | 289 | 34 | 2.4 | 0.81 | 2318 |
| 52 | 52523 | 18140 | 0.6 | 11.17 | 9.75 | 251 | 35 | 2.2 | 0.82 | 1707 |
| 53 | 52522 | 16123 | 0.6 | 12.09 | 10.81 | 294 | 33 | 2.2 | 0.79 | 1915 |
| 54 | 52560 | 18670 | 0.4 | 10.55 | 9.51 | 294 | 35 | 2.5 | 0.67 | 2953 |
| 55 | 52558 | 15873 | 0.4 | 11.82 | 10.98 | 369 | 34 | 2.3 | 0.66 | 3333 |
| 56 | 18124 | 27161 | 0.6 | 7.06 | 6.71 | 100 | 12 | 2.8 | 0.8 | 1038 |
| 57 | 18136 | 22208 | 0.54 | 8.26 | 8.27 | 152 | 12 | 2.4 | 0.67 | 1167 |
| 58 | 36228 | 24006 | 0.4 | 8.32 | 7.9 | 182 | 24 | 2.6 | 0.82 | 2057 |
| 59 | 36228 | 20495 | 0.54 | 9.56 | 9.1 | 203 | 24 | 2.3 | 0.83 | 1460 |
| 60 | 36228 | 17397 | 0.54 | 10.72 | 10.57 | 256 | 24 | 2.1 | 0.81 | 1584 |

TABLE 4-continued

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in$^2$) | $A_{EX}$ (in$^2$) | $L_{CORE}/D_{CORE}$ | $HSP_{X1}$ (in$^2$/klbf) | $HSP\_A_{IN}$ (in$^2$) |
|---|---|---|---|---|---|---|---|---|---|---|
| 61 | 36230 | 24405 | 0.6 | 8.66 | 7.84 | 151 | 27 | 2.3 | 0.91 | 1101 |
| 62 | 36253 | 18478 | 0.4 | 10.08 | 10.01 | 268 | 24 | 2.2 | 0.67 | 2020 |
| 63 | 52523 | 19700 | 0.4 | 10.12 | 9.62 | 270 | 36 | 2.3 | 0.84 | 2367 |
| 64 | 29791 | 20730 | 0.46 | 8.88 | 8.71 | 194 | 16 | 2.5 | 0.53 | 1743 |
| 65 | 38564 | 26513 | 0.45 | 7.87 | 7.08 | 156 | 21 | 3 | 0.86 | 2282 |
| 66 | 41861 | 20516 | 0.45 | 9.07 | 8.25 | 205 | 22 | 2.8 | 0.53 | 2578 |
| 67 | 34695 | 27440 | 0.45 | 7.51 | 6.66 | 142 | 19 | 3.1 | 0.66 | 2115 |
| 68 | 45080 | 22948 | 0.54 | 9.14 | 7.57 | 185 | 26 | 2.8 | 0.72 | 2172 |
| 69 | 38835 | 23902 | 0.53 | 8.55 | 7.78 | 165 | 19 | 2.7 | 0.78 | 1774 |
| 70 | 41411 | 23444 | 0.51 | 8.69 | 7.62 | 174 | 29 | 2.9 | 1.08 | 2137 |
| 71 | 40010 | 22409 | 0.54 | 8.53 | 8.29 | 161 | 18 | 2.4 | 0.57 | 1278 |
| 72 | 34589 | 26430 | 0.55 | 7.86 | 7.06 | 135 | 19 | 2.8 | 0.85 | 1464 |
| 73 | 36392 | 24926 | 0.48 | 8.02 | 6.74 | 155 | 18 | 3.2 | 0.5 | 2529 |
| 74 | 29097 | 24030 | 0.56 | 8.03 | 7.36 | 140 | 13 | 2.9 | 0.56 | 1637 |
| 75 | 29975 | 24497 | 0.45 | 7.56 | 7.08 | 143 | 13 | 3.1 | 0.44 | 2160 |
| 76 | 35983 | 25286 | 0.51 | 8.03 | 7.1 | 151 | 21 | 3 | 0.89 | 2098 |
| 77 | 35202 | 27176 | 0.45 | 7.58 | 6.94 | 143 | 26 | 2.9 | 1.14 | 1879 |
| 78 | 28834 | 24306 | 0.55 | 7.91 | 6.88 | 138 | 14 | 3.1 | 0.49 | 1877 |
| 79 | 38443 | 21613 | 0.55 | 8.83 | 8.52 | 171 | 20 | 2.4 | 0.66 | 1308 |
| 80 | 27754 | 27294 | 0.47 | 7.19 | 6.17 | 126 | 13 | 3.4 | 0.48 | 2321 |
| 81 | 27382 | 26052 | 0.42 | 7.46 | 6.35 | 144 | 15 | 3.6 | 0.56 | 3090 |
| 82 | 34118 | 26029 | 0.49 | 7.71 | 6.38 | 142 | 15 | 3.5 | 0.44 | 2798 |
| 83 | 41362 | 21762 | 0.53 | 8.96 | 7.99 | 182 | 17 | 2.7 | 0.4 | 1953 |
| 84 | 33372 | 24839 | 0.43 | 7.91 | 6.83 | 160 | 20 | 3.4 | 0.6 | 2966 |
| 85 | 44425 | 25546 | 0.43 | 8.17 | 6.96 | 172 | 28 | 3.1 | 0.77 | 2743 |
| 86 | 28190 | 23396 | 0.41 | 7.78 | 7.46 | 158 | 13 | 3 | 0.45 | 2321 |
| 87 | 35231 | 21419 | 0.53 | 8.98 | 8.12 | 182 | 15 | 2.7 | 0.42 | 1872 |
| 88 | 28272 | 26095 | 0.49 | 7.3 | 6.66 | 127 | 13 | 3.1 | 0.47 | 1829 |
| 89 | 42416 | 23364 | 0.41 | 8.43 | 7.63 | 186 | 17 | 2.9 | 0.4 | 2538 |
| 90 | 28346 | 24653 | 0.4 | 7.88 | 6.84 | 164 | 15 | 3.4 | 0.52 | 3179 |
| 91 | 43315 | 23589 | 0.45 | 8.86 | 7.21 | 196 | 27 | 3.3 | 0.77 | 3472 |
| 92 | 33540 | 20805 | 0.45 | 8.93 | 8.52 | 200 | 14 | 2.7 | 0.43 | 2150 |
| 93 | 42603 | 23344 | 0.44 | 8.82 | 7.39 | 198 | 26 | 3.2 | 0.76 | 3379 |
| 94 | 29583 | 26303 | 0.46 | 7.4 | 6.45 | 135 | 13 | 3.4 | 0.43 | 2515 |
| 95 | 31357 | 23050 | 0.56 | 8.55 | 7.57 | 158 | 15 | 2.7 | 0.49 | 1619 |
| 96 | 44345 | 23094 | 0.4 | 8.73 | 7.29 | 201 | 23 | 3.3 | 0.51 | 3681 |
| 97 | 36178 | 24334 | 0.41 | 8.11 | 6.89 | 172 | 17 | 3.4 | 0.46 | 3319 |
| 98 | 33158 | 24109 | 0.48 | 8.11 | 7.35 | 158 | 15 | 2.8 | 0.44 | 1921 |
| 99 | 32153 | 27525 | 0.41 | 6.94 | 6.61 | 125 | 14 | 3.1 | 0.43 | 1918 |
| 100 | 44003 | 26067 | 0.44 | 7.93 | 7.37 | 159 | 26 | 2.8 | 0.94 | 2012 |
| 101 | 42640 | 24924 | 0.51 | 8.56 | 6.89 | 171 | 27 | 3.1 | 0.79 | 2614 |
| 102 | 30510 | 25797 | 0.41 | 7.61 | 6.42 | 152 | 16 | 3.6 | 0.52 | 3318 |
| 103 | 39341 | 24704 | 0.41 | 8.26 | 6.9 | 178 | 22 | 3.4 | 0.69 | 3614 |
| 104 | 38354 | 26645 | 0.45 | 7.59 | 6.33 | 144 | 19 | 3.4 | 0.51 | 2666 |
| 105 | 39061 | 23578 | 0.49 | 8.39 | 7.01 | 168 | 16 | 3.3 | 0.4 | 2928 |
| 106 | 34146 | 27652 | 0.44 | 7.32 | 6.24 | 136 | 16 | 3.4 | 0.46 | 2507 |
| 107 | 44129 | 21015 | 0.44 | 9.29 | 7.9 | 219 | 25 | 3.1 | 0.56 | 3548 |
| 108 | 39281 | 24454 | 0.55 | 8.24 | 7.5 | 149 | 17 | 2.7 | 0.53 | 1523 |
| 109 | 27391 | 25294 | 0.53 | 7.5 | 7.19 | 126 | 14 | 2.8 | 0.63 | 1410 |
| 110 | 36428 | 24002 | 0.41 | 8.35 | 7.04 | 182 | 19 | 3.3 | 0.51 | 3434 |
| 111 | 45242 | 25956 | 0.43 | 7.81 | 6.65 | 156 | 20 | 3.2 | 0.45 | 2654 |
| 112 | 31468 | 23911 | 0.55 | 7.83 | 6.89 | 135 | 14 | 3.2 | 0.45 | 2063 |
| 113 | 44365 | 24993 | 0.49 | 8.52 | 6.97 | 174 | 27 | 3.1 | 0.75 | 2585 |
| 114 | 40875 | 24106 | 0.5 | 8.51 | 7.74 | 171 | 20 | 2.8 | 0.78 | 1929 |
| 115 | 38425 | 26699 | 0.4 | 7.62 | 6.8 | 153 | 21 | 3.1 | 0.68 | 2503 |
| 116 | 42939 | 24229 | 0.44 | 8.37 | 7.6 | 178 | 21 | 2.9 | 0.78 | 2435 |
| 117 | 38881 | 21483 | 0.48 | 8.96 | 8.52 | 194 | 20 | 2.6 | 0.65 | 1900 |
| 118 | 43139 | 23965 | 0.43 | 8.39 | 7.28 | 181 | 21 | 3 | 0.49 | 2763 |
| 119 | 36707 | 26550 | 0.45 | 7.54 | 7.18 | 143 | 23 | 2.9 | 0.96 | 1793 |
| 120 | 43047 | 24214 | 0.42 | 8.39 | 7.18 | 182 | 23 | 3.1 | 0.53 | 2828 |

The embodiments 1 to 120 of TABLE 4 are the same as the embodiments 1 to 120 of TABLES 1 to 3, but TABLE 4 includes parameters in the $HSP\_A_{IN}$ relationship (12) above. The ranges of $FN_{T/O}$, $N2_{R/L}$, $OPR_{T/O}$, $R_{HUB,IN}/R_{TIP,IN}$, $R_{TIP,IN}$, $R_{TIP,EX}$, $R_{HUB,EX}$, $A_{IN}$, $A_{EX}$, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ is proportional to the engine core size. $A_{IN}$ is indicative of the HP compressor inlet corrected flow and the HP compressor pressure ratio, and, thus, indicative of T25. Accordingly, embodiments 1 to 120 provide for lowering the core size, while accounting for the dynamics margins and overall engine performance.

Figure 12:
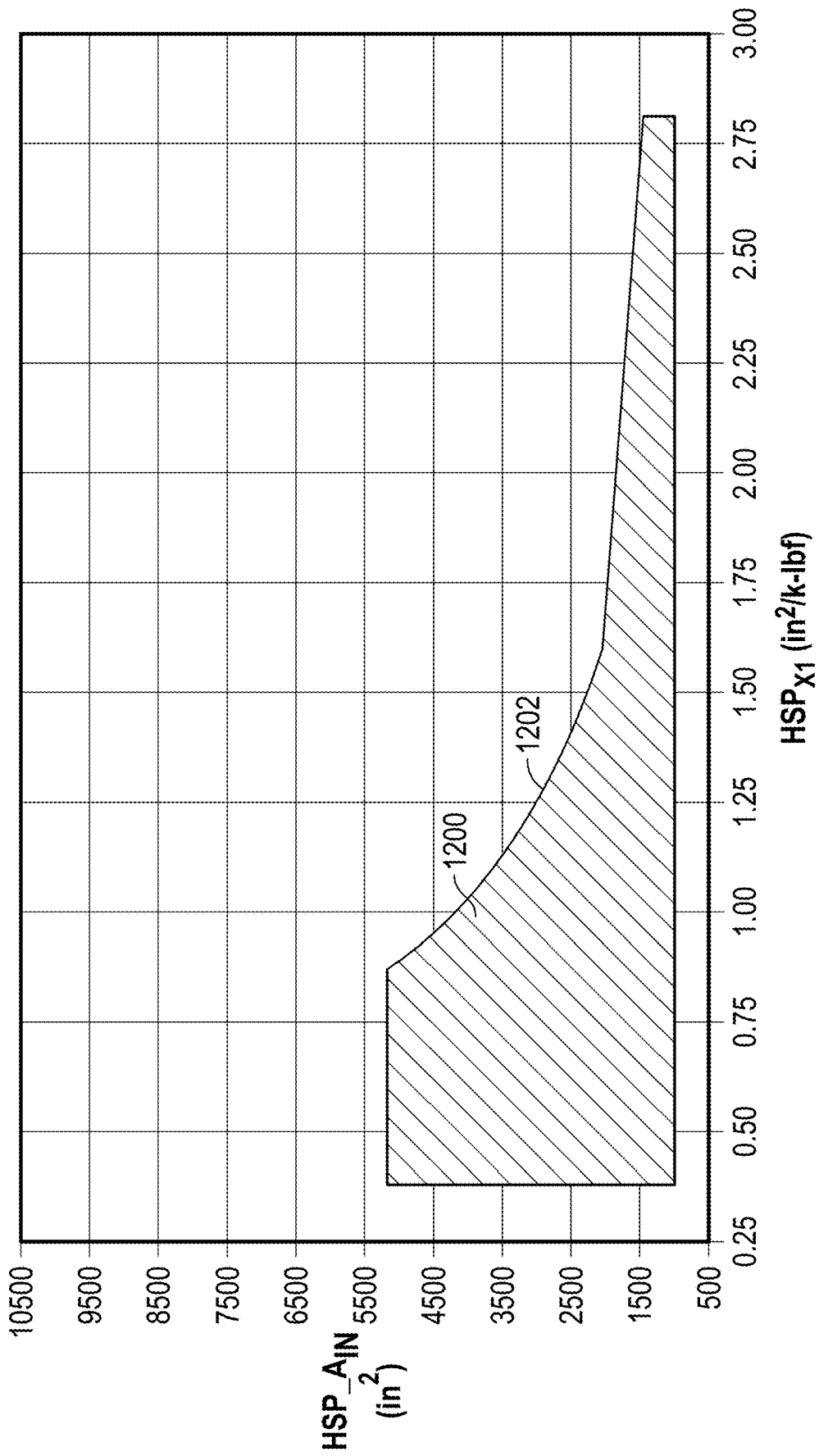
FIG. 12 represents, in graph form, an inlet area high-speed shaft rating ($HSP\_A_{IN}$) as a function of a second high-speed shaft operating parameter ($HSP_{X1}$) as given by relationship (12) detailed below.

FIG. 12 represents, in graph form, the $HSP\_A_{IN}$ as a function of the $HSP_{X1}$. $HSP_{X1}$ is given by relationship (13) detailed above. $HSP\_A_{IN}$ is in a range from 1038 in$^2$ to 5017 in$^2$, and $HSP_{X1}$ is in a range from 0.4 in$^2$/k-lbf to 2.79 in$^2$/k-lbf. In some embodiments, $HSP\_A_{IN}$ is in a range from 1,420 in$^2$ to 3,920 in$^2$. An area 1200 represents the boundaries of $HSP\_A_{IN}$ and $HSP_{X1}$. $HSP\_A_{IN}$ and $HSP_{X1}$ are bounded by an upper bound 1202. The upper bound 1202 is given by the relationship (24):

$$\text{HSP\_A}_{IN} < \text{MAX}\left(\frac{4200}{(HSP_{X1})^{1.5}}, 2850 - 500*(HSP_{X1})\right) \quad (24)$$

With reference to TABLE 4 and FIG. 12, in general, $\text{HSP\_A}_{IN}$ increases as $\text{HSP}_{X1}$ increases, and $\text{HSP\_A}_{IN}$ decreases as $\text{HSP}_{X1}$ increases. $\text{HSP}_{X1}$ increases with increased $A_{EX}$, and decreases with increased $\text{FN}_{T/O}$. In general, better engine performance, higher BPR, smaller engine core size, higher $L_{CORE}/D_{CORE}$, and higher T25 result in reduced dynamics margins. Higher AR, higher HP compressor pressure ratio, lower T25, and higher inlet corrected flow result in lower $\text{N2}_{R/L}$. Increased radius ratio, reduced blade height, reduce HP compressor speeds, and lower HP compressor pressure ratios result in diminishing returns on dynamics margins with poor performance. Accordingly, embodiments 1 to 120 provide for balancing higher $A_{IN}$ with increased radius ratios to meet dynamics margins with improved performance of the engine core (and of the overall engine).

The lower the $\text{HSP\_A}_{IN}$, the greater the third mode margin and the lower the HP compressor tip radius ratio for improved performance of the HP compressor and the HP turbine. Thus, the $\text{HSP\_A}_{IN}$ is selected for providing a balance among improving the third mode margin of the HP shaft, without overly sacrificing performance of the HP compressor and/or the HP turbine.

TABLE 5 lists embodiments of the HP compressor and HP shaft along with the associated $\text{HSP\_U}_{RIM,RL}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $\text{HSP\_U}_{RIM,R/L}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 5

| Emb. | $\text{N2}_{R/L}$ (RPM) | $\text{OPR}_{T/O}$ | $T_{IC}$ (°R) | $N_{Stg}$ | AR | $\text{T25}_{T/O}$ (°R) | $\text{T3}_{T/O}$ (°R) | $\text{HSP}_X$ (in$^2$) | $A_{F,IN}$ (in$^2$) | $U_{RIM,R/L}$ (ft/s) | $\text{HSP\_U}_{RIM,R/L}$ (in$^{-2/3}$ (ft/s/°R)$^3$) |
|---|---|---|---|---|---|---|---|---|---|---|---|
| 1 | 24788 | 49.5 | 0 | 10 | 7.9 | 747 | 1881 | 9.3 | 219 | 1382 | 0.48 |
| 2 | 23020 | 44.1 | 0 | 9 | 7.3 | 745 | 1818 | 10.8 | 236 | 1426 | 0.31 |
| 3 | 22481 | 41.8 | 0 | 10 | 8.6 | 690 | 1788 | 8.5 | 246 | 1450 | 0.26 |
| 4 | 22417 | 40.7 | 0 | 10 | 8.4 | 690 | 1774 | 7.7 | 232 | 1420 | 0.29 |
| 5 | 22246 | 44.1 | 0 | 9 | 7.3 | 745 | 1818 | 12.2 | 249 | 1419 | 0.28 |
| 6 | 20928 | 44.1 | 0 | 10 | 7.8 | 725 | 1818 | 15.1 | 330 | 1357 | 0.29 |
| 7 | 19967 | 44.1 | 0 | 11 | 8.5 | 702 | 1818 | 15 | 394 | 1356 | 0.24 |
| 8 | 21281 | 44.1 | 0 | 9 | 7.2 | 749 | 1818 | 15.5 | 278 | 1460 | 0.23 |
| 9 | 21695 | 44.1 | 0 | 9 | 7.2 | 749 | 1818 | 13.5 | 260 | 1420 | 0.29 |
| 10 | 19922 | 44.1 | 0 | 9 | 7.2 | 748 | 1818 | 20.6 | 337 | 1356 | 0.34 |
| 11 | 20809 | 44.1 | 0 | 8 | 6.5 | 780 | 1818 | 30.4 | 330 | 1473 | 0.25 |
| 12 | 20809 | 37.4 | 0 | 8 | 5.8 | 777 | 1729 | 36.9 | 295 | 1473 | 0.19 |
| 13 | 20809 | 31.7 | 0 | 8 | 5.8 | 740 | 1646 | 44.7 | 295 | 1473 | 0.13 |
| 14 | 35788 | 40.9 | 0 | 9 | 7.2 | 730 | 1776 | 5.7 | 101 | 1347 | 1 |
| 15 | 35788 | 34.6 | 0 | 9 | 7.2 | 695 | 1690 | 6.9 | 101 | 1347 | 0.77 |
| 16 | 12306 | 47.8 | −100 | 10 | 7.6 | 651 | 1614 | 43 | 614 | 1350 | 0.09 |
| 17 | 10580 | 56.4 | −100 | 10 | 7.4 | 696 | 1711 | 69.1 | 837 | 1371 | 0.09 |
| 18 | 24181 | 44.9 | −71 | 8 | 6.1 | 735 | 1667 | 24.2 | 202 | 1441 | 0.25 |
| 19 | 23523 | 41.7 | −3 | 8 | 6.4 | 770 | 1781 | 25.4 | 241 | 1449 | 0.28 |
| 20 | 18378 | 32.5 | −59 | 8 | 7.1 | 629 | 1515 | 23.4 | 319 | 1395 | 0.12 |
| 21 | 18401 | 26.3 | −7 | 8 | 6.2 | 673 | 1539 | 26 | 312 | 1380 | 0.13 |
| 22 | 21259 | 32.5 | −18 | 8 | 6.7 | 684 | 1615 | 25.7 | 266 | 1409 | 0.18 |
| 23 | 23255 | 53.5 | −98 | 9 | 7.7 | 673 | 1680 | 16.2 | 220 | 1408 | 0.25 |
| 24 | 20398 | 32.5 | −6 | 9 | 7.1 | 679 | 1644 | 19.5 | 259 | 1374 | 0.18 |
| 25 | 24432 | 62.9 | −54 | 9 | 7.6 | 760 | 1886 | 14.8 | 213 | 1477 | 0.31 |
| 26 | 19914 | 53.5 | −80 | 10 | 10.9 | 600 | 1698 | 10.1 | 258 | 1443 | 0.15 |
| 27 | 19790 | 53.4 | −66 | 10 | 10.4 | 625 | 1742 | 10.2 | 287 | 1402 | 0.17 |
| 28 | 24618 | 53.5 | −66 | 10 | 8.8 | 668 | 1752 | 8.4 | 171 | 1433 | 0.29 |
| 29 | 23073 | 62.9 | −63 | 10 | 10.1 | 671 | 1848 | 9.7 | 224 | 1444 | 0.26 |
| 30 | 24152 | 62.9 | −70 | 10 | 9.6 | 678 | 1832 | 7.6 | 197 | 1439 | 0.3 |
| 31 | 24437 | 82 | −93 | 10 | 10.5 | 690 | 1929 | 8.1 | 209 | 1478 | 0.3 |
| 32 | 23043 | 62.9 | −60 | 10 | 8.6 | 717 | 1866 | 11.7 | 212 | 1468 | 0.25 |
| 33 | 20310 | 34.9 | −98 | 8 | 7.2 | 598 | 1455 | 22.3 | 262 | 1429 | 0.12 |
| 34 | 23662 | 40.6 | −93 | 8 | 6.9 | 650 | 1551 | 17.3 | 206 | 1416 | 0.21 |
| 35 | 24039 | 51.2 | −98 | 9 | 8 | 654 | 1652 | 12.5 | 182 | 1474 | 0.22 |
| 36 | 20133 | 43 | −58 | 9 | 7.8 | 661 | 1657 | 17.7 | 261 | 1434 | 0.18 |
| 37 | 20410 | 58.8 | −14 | 10 | 9.9 | 711 | 1944 | 13.9 | 297 | 1474 | 0.25 |
| 38 | 22900 | 64.6 | −6 | 10 | 10 | 737 | 2020 | 11.6 | 255 | 1478 | 0.34 |
| 39 | 28164 | 40.6 | 0 | 10 | 9.2 | 665 | 1773 | 4.3 | 149 | 1347 | 0.56 |
| 40 | 25626 | 40.7 | 0 | 9 | 7.1 | 736 | 1774 | 11.4 | 199 | 1348 | 0.58 |
| 41 | 23225 | 40.6 | 0 | 10 | 8.3 | 691 | 1772 | 8.8 | 229 | 1350 | 0.4 |
| 42 | 21410 | 40.4 | 0 | 10 | 9.4 | 660 | 1770 | 8.6 | 256 | 1350 | 0.38 |
| 43 | 19521 | 40.7 | 0 | 9 | 7.1 | 735 | 1774 | 16.5 | 344 | 1350 | 0.28 |
| 44 | 18233 | 41 | 0 | 9 | 7.8 | 709 | 1778 | 16.6 | 378 | 1350 | 0.28 |
| 45 | 19710 | 40.1 | 0 | 9 | 6.3 | 766 | 1766 | 17.7 | 353 | 1350 | 0.23 |
| 46 | 18510 | 40.7 | 0 | 10 | 7.6 | 716 | 1774 | 13.9 | 374 | 1350 | 0.21 |
| 47 | 15207 | 40.1 | 0 | 10 | 10.3 | 636 | 1766 | 12.7 | 489 | 1350 | 0.18 |
| 48 | 17374 | 40.6 | 0 | 10 | 7.9 | 705 | 1773 | 13.1 | 419 | 1350 | 0.17 |

TABLE 5-continued

| Emb. | $N2_{R/L}$ (RPM) | $OPR_{T/O}$ | $T_{IC}$ (°R) | $N_{Stg}$ | AR | $T25_{T/O}$ (°R) | $T3_{T/O}$ (°R) | $HSP_X$ (in²) | $A_{F,IN}$ (in²) | $U_{RIM,R/L}$ (ft/s) | $HSP\_U_{RIM,R/L}$ (in$^{-2/3}$ (ft/s/°R)³) |
|---|---|---|---|---|---|---|---|---|---|---|---|
| 49 | 20022 | 40.8 | 0 | 9 | 7.6 | 715 | 1776 | 16.8 | 313 | 1450 | 0.23 |
| 50 | 19304 | 40.8 | 0 | 9 | 6.9 | 742 | 1776 | 18.2 | 351 | 1450 | 0.17 |
| 51 | 17220 | 40.9 | 0 | 9 | 8.4 | 689 | 1777 | 16.7 | 408 | 1450 | 0.15 |
| 52 | 18140 | 40.8 | 0 | 9 | 7.2 | 730 | 1775 | 17.1 | 392 | 1450 | 0.14 |
| 53 | 16123 | 40.8 | 0 | 9 | 8.8 | 678 | 1775 | 15.8 | 459 | 1450 | 0.13 |
| 54 | 18670 | 40.7 | 0 | 10 | 8.4 | 690 | 1774 | 14 | 350 | 1450 | 0.16 |
| 55 | 15873 | 39.9 | 0 | 10 | 10.7 | 627 | 1764 | 13.3 | 439 | 1450 | 0.13 |
| 56 | 27161 | 40.8 | 0 | 9 | 8.5 | 687 | 1776 | 5.7 | 156 | 1523 | 0.26 |
| 57 | 22208 | 39.4 | 0 | 10 | 12.5 | 591 | 1757 | 4.7 | 214 | 1557 | 0.14 |
| 58 | 24006 | 40.9 | 0 | 9 | 7.6 | 717 | 1776 | 11.8 | 217 | 1550 | 0.19 |
| 59 | 20495 | 41 | 0 | 9 | 8.4 | 691 | 1778 | 12.1 | 287 | 1550 | 0.13 |
| 60 | 17397 | 40.2 | 0 | 9 | 10.8 | 627 | 1767 | 11.4 | 361 | 1550 | 0.1 |
| 61 | 24405 | 40.1 | 0 | 9 | 5.6 | 803 | 1766 | 14.4 | 236 | 1550 | 0.14 |
| 62 | 18478 | 39.8 | 0 | 10 | 11 | 620 | 1762 | 9.5 | 319 | 1550 | 0.1 |
| 63 | 19700 | 40.9 | 0 | 9 | 7.6 | 717 | 1778 | 17.9 | 322 | 1550 | 0.13 |
| 64 | 20730 | 46.7 | 0 | 10 | 12.4 | 599 | 1774 | 5.6 | 248 | 1523 | 0.15 |
| 65 | 26513 | 48.5 | 0 | 8 | 7.3 | 739 | 1809 | 13 | 195 | 1523 | 0.34 |
| 66 | 20516 | 39.3 | 0 | 10 | 9.3 | 656 | 1756 | 6.7 | 259 | 1399 | 0.25 |
| 67 | 27440 | 40.3 | −25 | 9 | 7.6 | 714 | 1769 | 7.4 | 177 | 1484 | 0.32 |
| 68 | 22948 | 40.2 | −25 | 9 | 7.1 | 733 | 1768 | 11.1 | 262 | 1401 | 0.27 |
| 69 | 23902 | 42.3 | 0 | 8 | 8.5 | 693 | 1795 | 9.4 | 230 | 1538 | 0.24 |
| 70 | 23444 | 39.3 | 0 | 8 | 6.1 | 771 | 1755 | 17.7 | 237 | 1432 | 0.31 |
| 71 | 22409 | 44.2 | 0 | 9 | 8.7 | 670 | 1753 | 6.8 | 228 | 1550 | 0.15 |
| 72 | 26430 | 40.1 | 0 | 8 | 7.1 | 730 | 1766 | 9.5 | 194 | 1527 | 0.26 |
| 73 | 24926 | 45.2 | 0 | 10 | 8.4 | 685 | 1767 | 6.1 | 202 | 1369 | 0.38 |
| 74 | 24030 | 46.7 | −25 | 9 | 10.6 | 634 | 1779 | 5.1 | 203 | 1482 | 0.27 |
| 75 | 24497 | 47.3 | 0 | 10 | 10.9 | 630 | 1786 | 4 | 180 | 1448 | 0.33 |
| 76 | 25286 | 38.4 | −25 | 8 | 7.4 | 711 | 1743 | 10.3 | 203 | 1461 | 0.34 |
| 77 | 27176 | 39.2 | −25 | 8 | 5.6 | 801 | 1754 | 16.8 | 181 | 1501 | 0.3 |
| 78 | 24306 | 42.3 | −25 | 10 | 9.8 | 633 | 1726 | 4.2 | 197 | 1388 | 0.31 |
| 79 | 21613 | 38.2 | 0 | 9 | 8.4 | 676 | 1740 | 7.5 | 245 | 1534 | 0.14 |
| 80 | 27294 | 43.6 | 0 | 10 | 9.5 | 647 | 1744 | 4.1 | 162 | 1385 | 0.43 |
| 81 | 26052 | 43.3 | −25 | 10 | 9.5 | 646 | 1740 | 5.4 | 175 | 1355 | 0.49 |
| 82 | 26029 | 48.9 | 0 | 10 | 9.4 | 674 | 1808 | 4.8 | 187 | 1360 | 0.52 |
| 83 | 21762 | 48.9 | −25 | 10 | 10.9 | 637 | 1804 | 4.9 | 252 | 1452 | 0.22 |
| 84 | 24839 | 44.3 | −25 | 10 | 8 | 720 | 1820 | 7.9 | 197 | 1376 | 0.45 |
| 85 | 25546 | 43.2 | −25 | 9 | 6.2 | 763 | 1749 | 13.4 | 210 | 1403 | 0.35 |
| 86 | 23396 | 45.3 | −25 | 10 | 12.4 | 593 | 1758 | 3.8 | 190 | 1468 | 0.28 |
| 87 | 21419 | 47.9 | 0 | 10 | 12.4 | 605 | 1789 | 4.3 | 253 | 1463 | 0.21 |
| 88 | 26095 | 44.8 | −25 | 10 | 9.6 | 651 | 1759 | 4.1 | 167 | 1443 | 0.32 |
| 89 | 23364 | 48.5 | −25 | 10 | 10.9 | 635 | 1799 | 4.9 | 223 | 1481 | 0.24 |
| 90 | 24653 | 40 | −25 | 10 | 11.1 | 620 | 1766 | 4.5 | 195 | 1396 | 0.4 |
| 91 | 23589 | 41.3 | −25 | 9 | 7.3 | 731 | 1782 | 12.5 | 247 | 1356 | 0.43 |
| 92 | 20805 | 47.8 | −25 | 10 | 13.9 | 579 | 1784 | 4.3 | 251 | 1497 | 0.19 |
| 93 | 23344 | 41.4 | 0 | 9 | 7.6 | 721 | 1783 | 12.1 | 244 | 1386 | 0.39 |
| 94 | 26303 | 47.6 | 0 | 10 | 10.7 | 637 | 1790 | 3.8 | 172 | 1407 | 0.44 |
| 95 | 23050 | 41.7 | −25 | 10 | 10.2 | 646 | 1787 | 4.7 | 230 | 1456 | 0.22 |
| 96 | 23094 | 42.4 | 0 | 10 | 8.9 | 683 | 1796 | 7.2 | 239 | 1367 | 0.39 |
| 97 | 24334 | 45.9 | −25 | 10 | 10.3 | 637 | 1770 | 5.2 | 206 | 1380 | 0.41 |
| 98 | 24109 | 46 | 0 | 10 | 10.8 | 627 | 1770 | 4.4 | 207 | 1477 | 0.23 |
| 99 | 27525 | 48.7 | 0 | 10 | 9 | 683 | 1806 | 4.3 | 151 | 1505 | 0.31 |
| 100 | 26067 | 48.4 | −25 | 8 | 6 | 801 | 1813 | 17.6 | 197 | 1541 | 0.28 |
| 101 | 24924 | 41.3 | −25 | 9 | 5.3 | 776 | 1782 | 13.1 | 230 | 1354 | 0.4 |
| 102 | 25797 | 39.3 | −25 | 10 | 9.6 | 648 | 1756 | 4.7 | 182 | 1355 | 0.49 |
| 103 | 24704 | 43.8 | −25 | 9 | 8.1 | 688 | 1751 | 9.7 | 214 | 1374 | 0.46 |
| 104 | 26645 | 43.6 | 0 | 10 | 7.4 | 713 | 1750 | 6.3 | 181 | 1355 | 0.43 |
| 105 | 23578 | 48.7 | 0 | 10 | 10.6 | 643 | 1803 | 4.6 | 221 | 1367 | 0.43 |
| 106 | 27652 | 45.3 | −25 | 10 | 8.6 | 680 | 1768 | 4.9 | 168 | 1406 | 0.41 |
| 107 | 21015 | 42.1 | −25 | 10 | 8.9 | 682 | 1793 | 8.5 | 271 | 1354 | 0.35 |
| 108 | 24454 | 47.1 | −25 | 9 | 8.9 | 679 | 1788 | 6.1 | 213 | 1523 | 0.22 |
| 109 | 25294 | 45 | −25 | 9 | 9.1 | 665 | 1763 | 5.8 | 177 | 1517 | 0.25 |
| 110 | 24002 | 43.8 | 0 | 10 | 9.7 | 667 | 1814 | 6.2 | 219 | 1384 | 0.42 |
| 111 | 25956 | 44.8 | 0 | 10 | 7.6 | 710 | 1764 | 6.1 | 191 | 1392 | 0.36 |
| 112 | 23911 | 46.1 | −25 | 10 | 9.6 | 654 | 1774 | 4.2 | 193 | 1368 | 0.4 |
| 113 | 24993 | 44.5 | 0 | 9 | 6.5 | 758 | 1764 | 13.1 | 228 | 1379 | 0.36 |
| 114 | 24106 | 46.7 | −25 | 8 | 8.4 | 694 | 1784 | 11 | 228 | 1537 | 0.24 |
| 115 | 26699 | 40.3 | −25 | 9 | 7.2 | 728 | 1769 | 8.6 | 182 | 1463 | 0.34 |
| 116 | 24229 | 44.4 | −25 | 8 | 8.3 | 685 | 1757 | 10.8 | 220 | 1510 | 0.28 |
| 117 | 21483 | 46.8 | −25 | 9 | 9.5 | 662 | 1783 | 9.1 | 252 | 1524 | 0.19 |
| 118 | 23965 | 43.5 | 0 | 10 | 8.7 | 695 | 1810 | 6.5 | 221 | 1423 | 0.32 |
| 119 | 26550 | 40.8 | −25 | 8 | 6.3 | 770 | 1776 | 13 | 179 | 1542 | 0.28 |
| 120 | 24214 | 42.7 | −25 | 10 | 7.9 | 715 | 1799 | 7.7 | 221 | 1404 | 0.32 |

The embodiments 1 to 120 of TABLE 5 are the same as the embodiments 1 to 120 of TABLES 1 to 4, but TABLE 5 includes parameters in the $HSP\_U_{RIM,R/L}$ relationship (14) above. The ranges of $N2_{R/L}$, $OPR_{T/O}$, $T_{IC}$, $N_{STG}$, $A_{IN}$, $A_{EX}$, AR, $T25_{T/O}$, $T3_{T/O}$, $L_{CORE}/D_{CORE}$, $A_{F,IN}$, and $U_{RIM,R/L}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ is proportional to the engine core size. $A_{IN}$ is indicative of the HP compressor inlet corrected flow and the HP compressor pressure ratio, and, thus, indicative of T25. AR is indicative of the HP compressor pressure ratio (e.g., indicative of T25). $U_{RIM,R/L}$ is indicative of the HP compressor exit hub radius and $N2_{R/L}$. $A_{F,IN}$ and $T3_{T/O}$ are indicative of the HP compressor inlet temperature and the corrected flow. Accordingly, embodiments 1 to 120 provide for lowering the core size, while accounting for the dynamics margins and overall engine performance.

Figure 13:
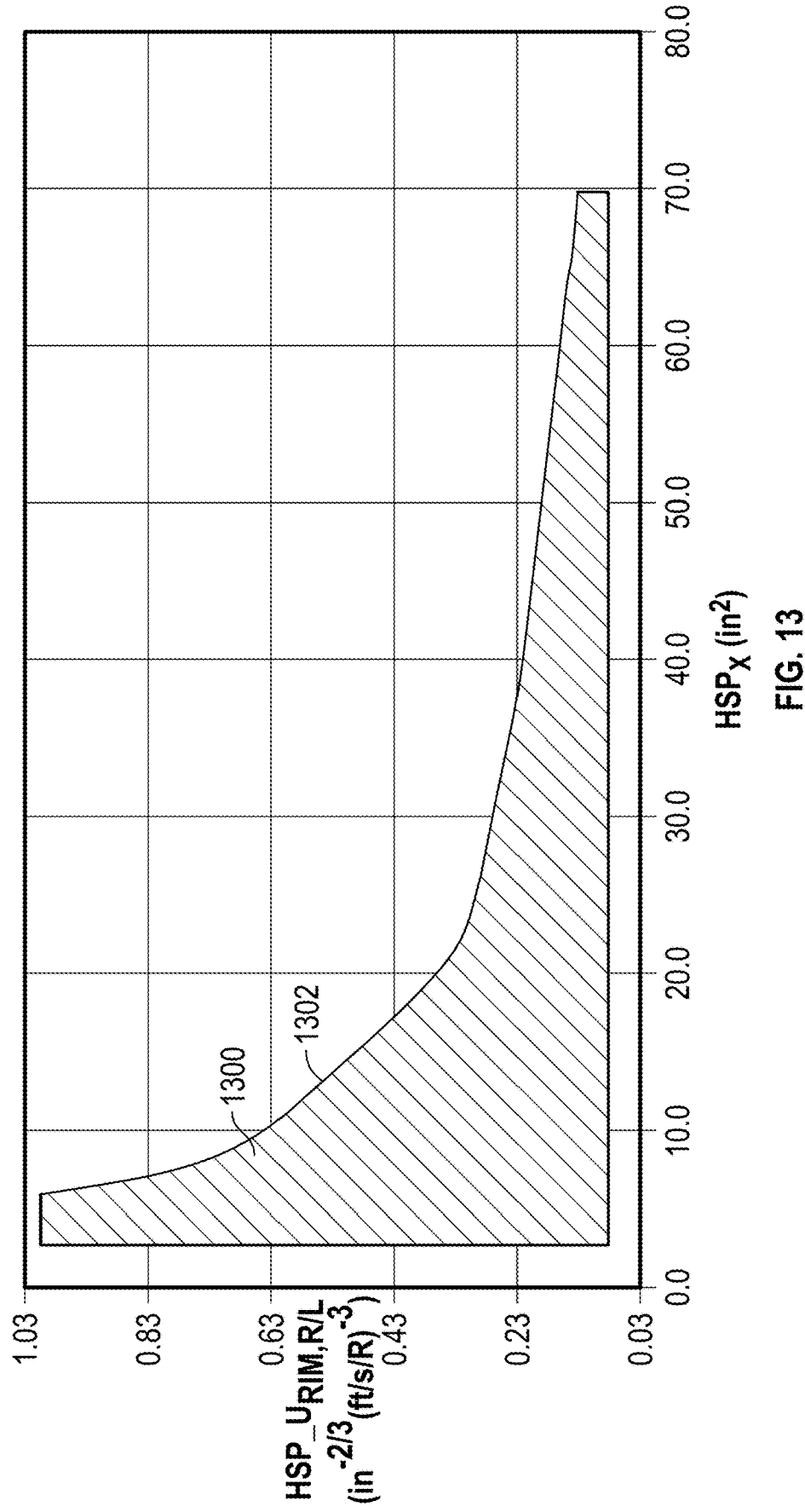
FIG. 13 represents, in graph form, an exit rim speed (at redline speeds) high-speed shaft rating ($HSP\_U_{RIM,R/L}$) as a function of the $HSP_X$.

FIG. 13 represents, in graph form, the $HSP\_U_{RIM,R/L}$ as a function of the $HSP_X$. $HSP_X$ is given by relationship (8) detailed above. $HSP\_U_{RIM,R/L}$ is in a range from 0.09 in $^{2/3}$(ft/s/° R)$^{-3}$ to 1.00 in$^{2/3}$(ft/s/° R)$^{-3}$, and $HSP_X$ is in a range from 3.8 in$^2$ to 69.1 in$^2$. An area 1300 represents the boundaries of $HSP\_U_{RIM,R/L}$ and $HSP_X$. $HSP\_U_{RIM,R/L}$ and $HSP_X$ are bounded by an upper bound 1302. The upper bound 1302 is given by (25):

$$HSP\_U_{RIM,R/L} < \frac{6.6}{(HSP_X)} \tag{25}$$

With reference to TABLE 5 and FIG. 13, in general, $HSP\_U_{RIM,R/L}$ increases as $HSP_X$ increases, and $HSP\_U_{RIM,R/L}$ decreases as $HSP_X$ increases. $HSP_X$ increases with increased $A_{EX}$, increased $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Higher $A_{F,IN}$, greater amount of HP compressor stages, higher HP compressor pressure ratio, lower T25, and higher inlet corrected flow result in lower $N2_{R/L}$. Higher $U_{RIM,R/L}$ and reduced blade height, or increased HP compressor speeds, and lower HP compressor pressure ratios result in improved dynamics margin with marginal performance penalties.

Accordingly, embodiments 1 to 120 provide for balancing higher $N_{STG}$ and $A_{F,IN}$ with increased radius ratios to meet dynamics margins with improved performance of the engine core (and of the overall engine).

The lower the $HSP\_U_{RIM,R/L}$, the greater the third mode margin and the higher T3 (OPR capability) for performance. Thus, the $HSP\_U_{RIM,R/L}$ is selected for providing a balance among improving the third mode margin of the HP shaft, without overly reducing performance of the HP compressor and/or the HP turbine.

Figure 14:
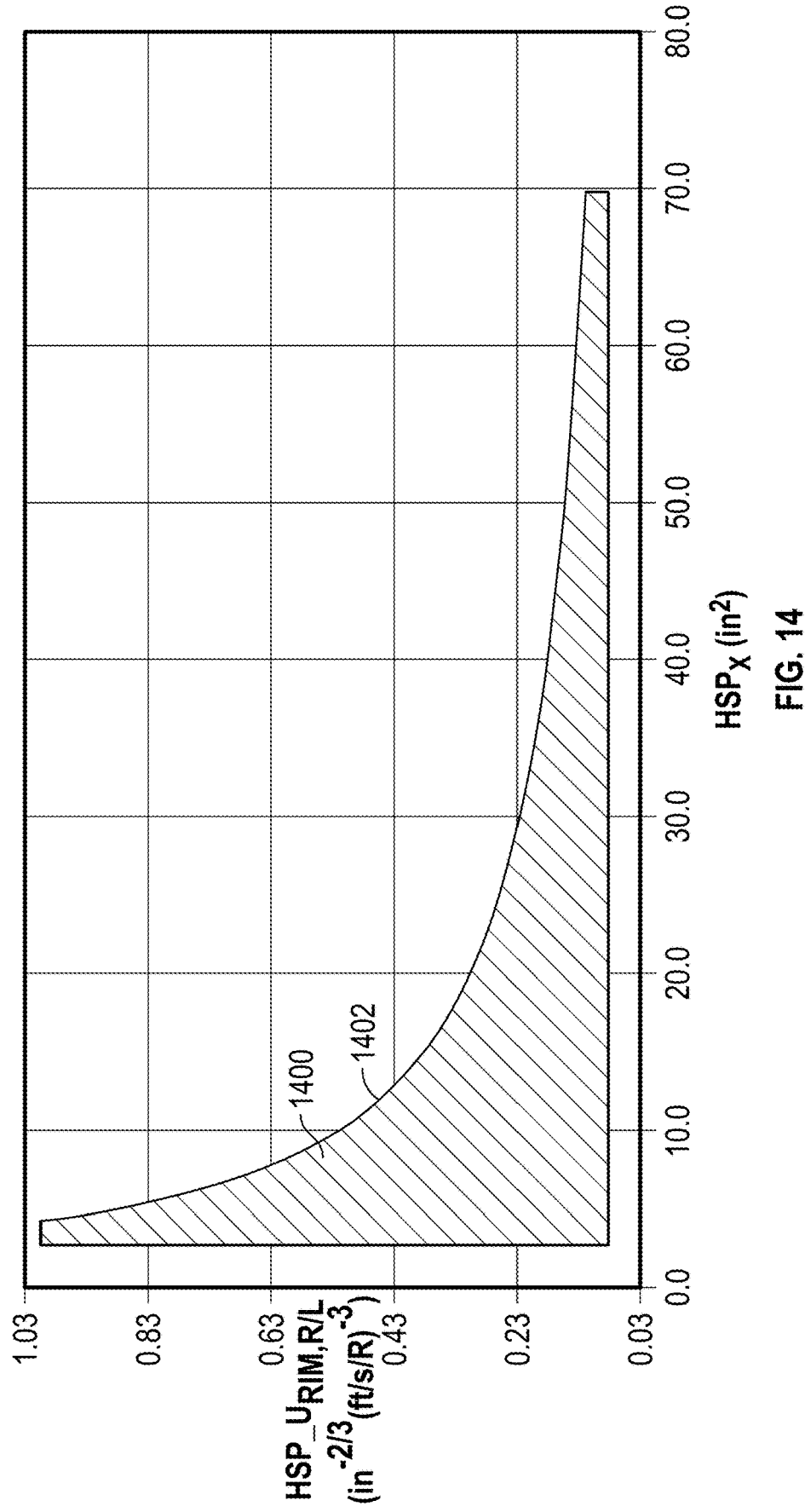
FIG. 14 represents, in graph form, an exit rim speed (at redline speeds) high-speed shaft rating ($HSP\_U_{RIM,R/L}$) as a function of the $HSP_X$, according to another embodiment.

FIG. 14 represents, in graph form, the $HSP\_U_{RIM,R/L}$ as a function of the $HSP_X$, according to another embodiment. $HSP_X$ is given by relationship (5) detailed above. $HSP\_U_{RIM,R/L}$ is in a range from 0.09 in$^{-2/3}$(ft/s/° R)$^{-3}$ to 1.00 in$^{-2/3}$(ft/s/° R)$^{-3}$, and $HSP_X$ is in a range from 3.8 in$^2$ to 69.1 in$^2$. An area 1400 represents the boundaries of $HSP\_U_{RIM,R/L}$ and $HSP_X$. $HSP\_U_{RIM,R/L}$ and $HSP_X$ are bounded by an upper bound 1402. The upper bound 1402 is given by (26):

$$HSP\_U_{RIM,R/L} < \frac{2.9}{HSP_X^{0.75}} \tag{26}$$

With reference to TABLE 5 and FIG. 14, in general, $HSP\_U_{RIM,R/L}$ increases as $HSP_X$ increases, and $HSP\_U_{RIM,R/L}$ decreases as $HSP_X$ increases, as detailed above. $HSP_X$ increases with increased $A_{EX}$, increased $OPR_{T/O}$, and decreases with increased $FN_{T/O}$, as detailed above.

TABLE 6 lists embodiments of the HP compressor and the HP shaft along with the associated $HSP_{RR}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP_{RR}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 6

| Emb. | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in$^2$) | $HSP_{RR}$ |
|---|---|---|---|---|---|---|---|---|---|---|
| 1 | 49.5 | 0 | 10 | 0.47 | 8.35 | 6.9 | 7.9 | 747 | 9.3 | 37.6 |
| 2 | 44.1 | 0 | 9 | 0.56 | 8.68 | 7.58 | 7.3 | 745 | 10.8 | 24.6 |
| 3 | 41.8 | 0 | 10 | 0.47 | 8.85 | 7.86 | 8.6 | 690 | 8.5 | 23.7 |
| 4 | 40.7 | 0 | 10 | 0.47 | 8.6 | 7.72 | 8.4 | 690 | 7.7 | 25 |
| 5 | 44.1 | 0 | 9 | 0.56 | 8.9 | 7.8 | 7.3 | 745 | 12.2 | 22.4 |
| 6 | 44.1 | 0 | 10 | 0.56 | 10.25 | 8.03 | 7.8 | 725 | 15.1 | 24.4 |
| 7 | 44.1 | 0 | 11 | 0.56 | 11.2 | 8.41 | 8.5 | 702 | 15 | 22.3 |
| 8 | 44.1 | 0 | 9 | 0.56 | 9.4 | 8.38 | 7.2 | 749 | 15.5 | 20.3 |
| 9 | 44.1 | 0 | 9 | 0.56 | 9.1 | 8.01 | 7.2 | 749 | 13.5 | 23.3 |
| 10 | 44.1 | 0 | 9 | 0.56 | 10.35 | 8.43 | 7.2 | 748 | 20.6 | 26.8 |
| 11 | 44.1 | 0 | 8 | 0.57 | 10.25 | 8.76 | 6.5 | 780 | 30.4 | 24 |
| 12 | 37.4 | 0 | 8 | 0.57 | 9.69 | 8.76 | 5.8 | 777 | 36.9 | 19.5 |
| 13 | 31.7 | 0 | 8 | 0.57 | 9.69 | 8.76 | 5.8 | 740 | 44.7 | 14.6 |
| 14 | 40.9 | 0 | 9 | 0.4 | 5.68 | 4.73 | 7.2 | 730 | 5.7 | 62.5 |
| 15 | 34.6 | 0 | 9 | 0.4 | 5.68 | 4.73 | 7.2 | 695 | 6.9 | 50.7 |
| 16 | 47.8 | −100 | 10 | 0.4 | 13.98 | 13.4 | 7.6 | 651 | 43 | 11.2 |
| 17 | 56.4 | −100 | 10 | 0.4 | 16.32 | 15.83 | 7.4 | 696 | 69.1 | 12.9 |
| 18 | 44.9 | −71 | 8 | 0.52 | 8.02 | 7.37 | 6.1 | 735 | 24.2 | 22.4 |
| 19 | 41.7 | −3 | 8 | 0.56 | 8.76 | 7.62 | 6.4 | 770 | 25.4 | 23.6 |
| 20 | 32.5 | −59 | 8 | 0.57 | 10.07 | 9.24 | 7.1 | 629 | 23.4 | 9.9 |
| 21 | 26.3 | −7 | 8 | 0.58 | 9.96 | 9.2 | 6.2 | 673 | 26 | 11.9 |
| 22 | 32.5 | −18 | 8 | 0.54 | 9.2 | 8.17 | 6.7 | 684 | 25.7 | 15.8 |

TABLE 6-continued

| Emb. | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in²) | $HSP_{RR}$ |
|---|---|---|---|---|---|---|---|---|---|---|
| 23 | 53.5 | −98 | 9 | 0.47 | 8.37 | 7.43 | 7.7 | 673 | 16.2 | 20.6 |
| 24 | 32.5 | −6 | 9 | 0.54 | 9.09 | 8.23 | 7.1 | 679 | 19.5 | 15.1 |
| 25 | 62.9 | −54 | 9 | 0.56 | 8.23 | 7.35 | 7.6 | 760 | 14.8 | 24.4 |
| 26 | 53.5 | −80 | 10 | 0.5 | 9.06 | 8.64 | 10.9 | 600 | 10.1 | 11.3 |
| 27 | 53.4 | 66 | 10 | 0.55 | 9.55 | 8.49 | 10.4 | 625 | 10.2 | 12.1 |
| 28 | 53.5 | −66 | 10 | 0.46 | 7.39 | 7.03 | 8.8 | 668 | 8.4 | 22.2 |
| 29 | 62.9 | 63 | 10 | 0.53 | 8.45 | 7.52 | 10.1 | 671 | 9.7 | 18.2 |
| 30 | 62.9 | −70 | 10 | 0.54 | 7.91 | 7.16 | 9.6 | 678 | 7.6 | 20.7 |
| 31 | 82 | −93 | 10 | 0.57 | 8.16 | 7.23 | 10.5 | 690 | 8.1 | 19.9 |
| 32 | 62.9 | −60 | 10 | 0.43 | 8.21 | 7.73 | 8.6 | 717 | 11.7 | 21.9 |
| 33 | 34.9 | −98 | 8 | 0.46 | 9.13 | 8.61 | 7.2 | 598 | 22.3 | 12.3 |
| 34 | 40.6 | −93 | 8 | 0.52 | 8.11 | 7.35 | 6.9 | 650 | 17.3 | 17.2 |
| 35 | 51.2 | −98 | 9 | 0.44 | 7.6 | 7.43 | 8 | 654 | 12.5 | 19.3 |
| 36 | 43 | −58 | 9 | 0.47 | 9.12 | 8.65 | 7.8 | 661 | 17.7 | 16 |
| 37 | 58.8 | −14 | 10 | 0.51 | 9.72 | 8.69 | 9.9 | 711 | 13.9 | 20.3 |
| 38 | 64.6 | −6 | 10 | 0.55 | 9.01 | 7.77 | 10 | 737 | 11.6 | 24.9 |
| 39 | 40.6 | 0 | 10 | 0.54 | 6.89 | 5.8 | 9.2 | 665 | 4.3 | 31.8 |
| 40 | 40.7 | 0 | 9 | 0.4 | 7.95 | 6.62 | 7.1 | 736 | 11.4 | 46.3 |
| 41 | 40.6 | 0 | 10 | 0.4 | 8.53 | 7.19 | 8.3 | 691 | 8.8 | 33.1 |
| 42 | 40.4 | 0 | 10 | 0.4 | 9.03 | 7.71 | 9.4 | 660 | 8.6 | 29.4 |
| 43 | 40.7 | 0 | 9 | 0.54 | 10.46 | 8.59 | 7.1 | 735 | 16.5 | 23.7 |
| 44 | 41 | 0 | 9 | 0.54 | 10.97 | 9.1 | 7.8 | 709 | 16.6 | 22 |
| 45 | 40.1 | 0 | 9 | 0.6 | 10.6 | 8.54 | 6.3 | 766 | 17.7 | 20.5 |
| 46 | 40.7 | 0 | 10 | 0.54 | 10.91 | 9 | 7.6 | 716 | 13.9 | 18.7 |
| 47 | 40.1 | 0 | 10 | 0.54 | 12.48 | 10.69 | 10.3 | 636 | 12.7 | 14.2 |
| 48 | 40.6 | 0 | 10 | 0.6 | 11.55 | 9.49 | 7.9 | 705 | 13.1 | 14.9 |
| 49 | 40.8 | 0 | 9 | 0.4 | 9.99 | 8.94 | 7.6 | 715 | 16.8 | 23.9 |
| 50 | 40.8 | 0 | 9 | 0.54 | 10.57 | 9.25 | 6.9 | 742 | 18.2 | 17 |
| 51 | 40.9 | 0 | 9 | 0.54 | 11.4 | 10.2 | 8.4 | 689 | 16.7 | 14.1 |
| 52 | 40.8 | 0 | 9 | 0.6 | 11.17 | 9.75 | 7.2 | 730 | 17.1 | 13.5 |
| 53 | 40.8 | 0 | 9 | 0.6 | 12.09 | 10.81 | 8.8 | 678 | 15.8 | 11.1 |
| 54 | 40.7 | 0 | 10 | 0.4 | 10.55 | 9.51 | 8.4 | 690 | 14 | 17.8 |
| 55 | 39.9 | 0 | 10 | 0.4 | 11.82 | 10.98 | 10.7 | 627 | 13.3 | 13.2 |
| 56 | 40.8 | 0 | 9 | 0.6 | 7.06 | 6.71 | 8.5 | 687 | 5.7 | 18.2 |
| 57 | 39.4 | 0 | 10 | 0.54 | 8.26 | 8.27 | 12.5 | 591 | 4.7 | 10 |
| 58 | 40.9 | 0 | 9 | 0.4 | 8.32 | 7.9 | 7.6 | 717 | 11.8 | 21.5 |
| 59 | 41 | 0 | 9 | 0.54 | 9.56 | 9.1 | 8.4 | 691 | 12.1 | 12.7 |
| 60 | 40.2 | 0 | 9 | 0.54 | 10.72 | 10.57 | 10.8 | 627 | 11.4 | 9.1 |
| 61 | 40.1 | 0 | 9 | 0.6 | 8.66 | 7.84 | 5.6 | 803 | 14.4 | 17.5 |
| 62 | 39.8 | 0 | 10 | 0.4 | 10.08 | 10.01 | 11 | 620 | 9.5 | 10.8 |
| 63 | 40.9 | 0 | 9 | 0.4 | 10.12 | 9.62 | 7.6 | 717 | 17.9 | 16.7 |
| 64 | 46.7 | 0 | 10 | 0.46 | 8.88 | 8.71 | 12.4 | 599 | 5.6 | 12 |
| 65 | 48.5 | 0 | 8 | 0.45 | 7.87 | 7.08 | 7.3 | 739 | 13 | 29.7 |
| 66 | 39.3 | 0 | 10 | 0.45 | 9.07 | 8.25 | 9.3 | 656 | 6.7 | 20.1 |
| 67 | 40.3 | −25 | 9 | 0.45 | 7.51 | 6.66 | 7.6 | 714 | 7.4 | 28.3 |
| 68 | 40.2 | −25 | 9 | 0.54 | 9.14 | 7.57 | 7.1 | 733 | 11.1 | 23.5 |
| 69 | 42.3 | 0 | 8 | 0.53 | 8.55 | 7.78 | 8.5 | 693 | 9.4 | 19.2 |
| 70 | 39.3 | 0 | 8 | 0.51 | 8.69 | 7.62 | 6.1 | 771 | 17.7 | 27.1 |
| 71 | 44.2 | 0 | 9 | 0.54 | 8.53 | 8.29 | 8.7 | 670 | 6.8 | 13.3 |
| 72 | 40.1 | 0 | 8 | 0.55 | 7.86 | 7.06 | 7.1 | 730 | 9.5 | 21.5 |
| 73 | 45.2 | 0 | 10 | 0.48 | 8.02 | 6.74 | 8.4 | 685 | 6.1 | 28.5 |
| 74 | 46.7 | −25 | 9 | 0.56 | 8.03 | 7.36 | 10.6 | 634 | 5.1 | 17.5 |
| 75 | 47.3 | 0 | 10 | 0.45 | 7.56 | 7.08 | 10.9 | 630 | 4 | 22.3 |
| 76 | 38.4 | −25 | 8 | 0.51 | 8.03 | 7.1 | 7.4 | 711 | 10.3 | 26.1 |
| 77 | 39.2 | −25 | 8 | 0.45 | 7.58 | 6.94 | 5.6 | 801 | 16.8 | 31.2 |
| 78 | 42.3 | −25 | 10 | 0.55 | 7.91 | 6.88 | 9.8 | 633 | 4.2 | 20.4 |
| 79 | 38.2 | 0 | 9 | 0.55 | 8.83 | 8.52 | 8.4 | 676 | 7.5 | 13 |
| 80 | 43.6 | 0 | 10 | 0.47 | 7.19 | 6.17 | 9.5 | 647 | 4.1 | 28.8 |
| 81 | 43.3 | −25 | 10 | 0.42 | 7.46 | 6.35 | 9.5 | 646 | 5.4 | 33.3 |
| 82 | 48.9 | 0 | 10 | 0.49 | 7.71 | 6.38 | 9.4 | 674 | 4.8 | 33.3 |
| 83 | 48.9 | −25 | 10 | 0.53 | 8.96 | 7.99 | 10.9 | 637 | 4.9 | 16.2 |
| 84 | 44.3 | −25 | 10 | 0.43 | 7.91 | 6.83 | 8 | 720 | 7.9 | 35.8 |
| 85 | 43.2 | −25 | 9 | 0.43 | 8.17 | 6.96 | 6.2 | 763 | 13.4 | 34.6 |
| 86 | 45.3 | −25 | 10 | 0.41 | 7.78 | 7.46 | 12.4 | 593 | 3.8 | 19.2 |
| 87 | 47.9 | 0 | 10 | 0.53 | 8.98 | 8.12 | 12.4 | 605 | 4.3 | 14 |
| 88 | 44.8 | −25 | 10 | 0.49 | 7.3 | 6.66 | 9.6 | 651 | 4.1 | 22.7 |
| 89 | 48.5 | −25 | 10 | 0.41 | 8.43 | 7.63 | 10.9 | 635 | 4.9 | 20.4 |
| 90 | 40 | −25 | 10 | 0.4 | 7.88 | 6.84 | 11.1 | 620 | 4.5 | 27.8 |
| 91 | 41.3 | −25 | 9 | 0.45 | 8.86 | 7.21 | 7.3 | 731 | 12.5 | 35.3 |
| 92 | 47.8 | −25 | 10 | 0.45 | 8.93 | 8.52 | 13.9 | 579 | 4.3 | 13.4 |
| 93 | 41.4 | 0 | 9 | 0.44 | 8.82 | 7.39 | 7.6 | 721 | 12.1 | 33 |
| 94 | 47.6 | 0 | 10 | 0.46 | 7.4 | 6.45 | 10.7 | 637 | 3.8 | 28.1 |
| 95 | 41.7 | −25 | 10 | 0.56 | 8.55 | 7.57 | 10.2 | 646 | 4.7 | 15.9 |
| 96 | 42.4 | 0 | 10 | 0.4 | 8.73 | 7.29 | 8.9 | 683 | 7.2 | 31.8 |
| 97 | 45.9 | −25 | 10 | 0.41 | 8.11 | 6.89 | 10.3 | 637 | 5.2 | 29.2 |
| 98 | 46 | 0 | 10 | 0.48 | 8.11 | 7.35 | 10.8 | 627 | 4.4 | 17.7 |
| 99 | 48.7 | 0 | 10 | 0.41 | 6.94 | 6.61 | 9 | 683 | 4.3 | 26.5 |

TABLE 6-continued

| Emb. | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in²) | $HSP_{RR}$ |
|---|---|---|---|---|---|---|---|---|---|---|
| 100 | 48.4 | −25 | 8 | 0.44 | 7.93 | 7.37 | 6 | 801 | 17.6 | 30.1 |
| 101 | 41.3 | −25 | 9 | 0.51 | 8.56 | 6.89 | 6.3 | 776 | 13.1 | 34.2 |
| 102 | 39.3 | −25 | 10 | 0.41 | 7.61 | 6.42 | 9.6 | 648 | 4.7 | 34.2 |
| 103 | 43.8 | −25 | 9 | 0.41 | 8.26 | 6.9 | 8.1 | 688 | 9.7 | 35.7 |
| 104 | 43.6 | 0 | 10 | 0.45 | 7.59 | 6.33 | 7.4 | 713 | 6.3 | 35 |
| 105 | 48.7 | 0 | 10 | 0.49 | 8.39 | 7.01 | 10.6 | 643 | 4.6 | 26.9 |
| 106 | 45.3 | −25 | 10 | 0.44 | 7.32 | 6.24 | 8.6 | 680 | 4.9 | 31.7 |
| 107 | 42.1 | −25 | 10 | 0.44 | 9.29 | 7.9 | 8.9 | 682 | 8.5 | 28 |
| 108 | 47.1 | −25 | 9 | 0.55 | 8.24 | 7.5 | 8.9 | 679 | 6.1 | 17.5 |
| 109 | 45 | −25 | 9 | 0.53 | 7.5 | 7.19 | 9.1 | 665 | 5.8 | 18.4 |
| 110 | 43.8 | 0 | 10 | 0.41 | 8.35 | 7.04 | 9.7 | 667 | 6.2 | 31.3 |
| 111 | 44.8 | −25 | 10 | 0.43 | 7.81 | 6.65 | 7.6 | 710 | 6.1 | 31.9 |
| 112 | 46.1 | −25 | 10 | 0.55 | 7.83 | 6.89 | 9.6 | 654 | 4.2 | 24.3 |
| 113 | 44.5 | 0 | 9 | 0.49 | 8.52 | 6.97 | 6.5 | 758 | 13.1 | 31.7 |
| 114 | 46.7 | −25 | 8 | 0.5 | 8.51 | 7.74 | 8.4 | 694 | 11 | 20.2 |
| 115 | 40.3 | −25 | 9 | 0.4 | 7.62 | 6.8 | 7.2 | 728 | 8.6 | 32.2 |
| 116 | 44.4 | −25 | 8 | 0.44 | 8.37 | 7.6 | 8.3 | 685 | 10.8 | 23.9 |
| 117 | 46.8 | −25 | 9 | 0.48 | 8.96 | 8.52 | 9.5 | 662 | 9.1 | 15.9 |
| 118 | 43.5 | 0 | 10 | 0.43 | 8.39 | 7.28 | 8.7 | 695 | 6.5 | 27.4 |
| 119 | 40.8 | −25 | 8 | 0.45 | 7.54 | 7.18 | 6.3 | 770 | 13 | 27.6 |
| 120 | 42.7 | −25 | 10 | 0.42 | 8.39 | 7.18 | 7.9 | 715 | 7.7 | 29.5 |

The embodiments 1 to 120 of TABLE 6 are the same as the embodiments 1 to 120 of TABLES 1 to 5, but TABLE 6 includes parameters in the $HSP_{RR}$ relationship (19) above. The ranges of $OPR_{T/O}$, $T_{IC}$, $R_{HUB,IN}/R_{TIP,IN}$, $R_{TIP,IN}$, $R_{HUB,EX}$, $A_{IN}$, $A_{EX}$, AR, $T25_{T/O}$, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ are proportional to the engine core size. $A_{IN}$ is larger for higher HP compressor pressure ratios. The inlet radius ratio is indicative of the HP shaft speed. The exit radius ratio is indicative of the HP compressor pressure ratio and T25. Accordingly, embodiments 1 to 120 provide for lowering the core size, while accounting for the dynamics margins and overall engine performance.

Figure 15:
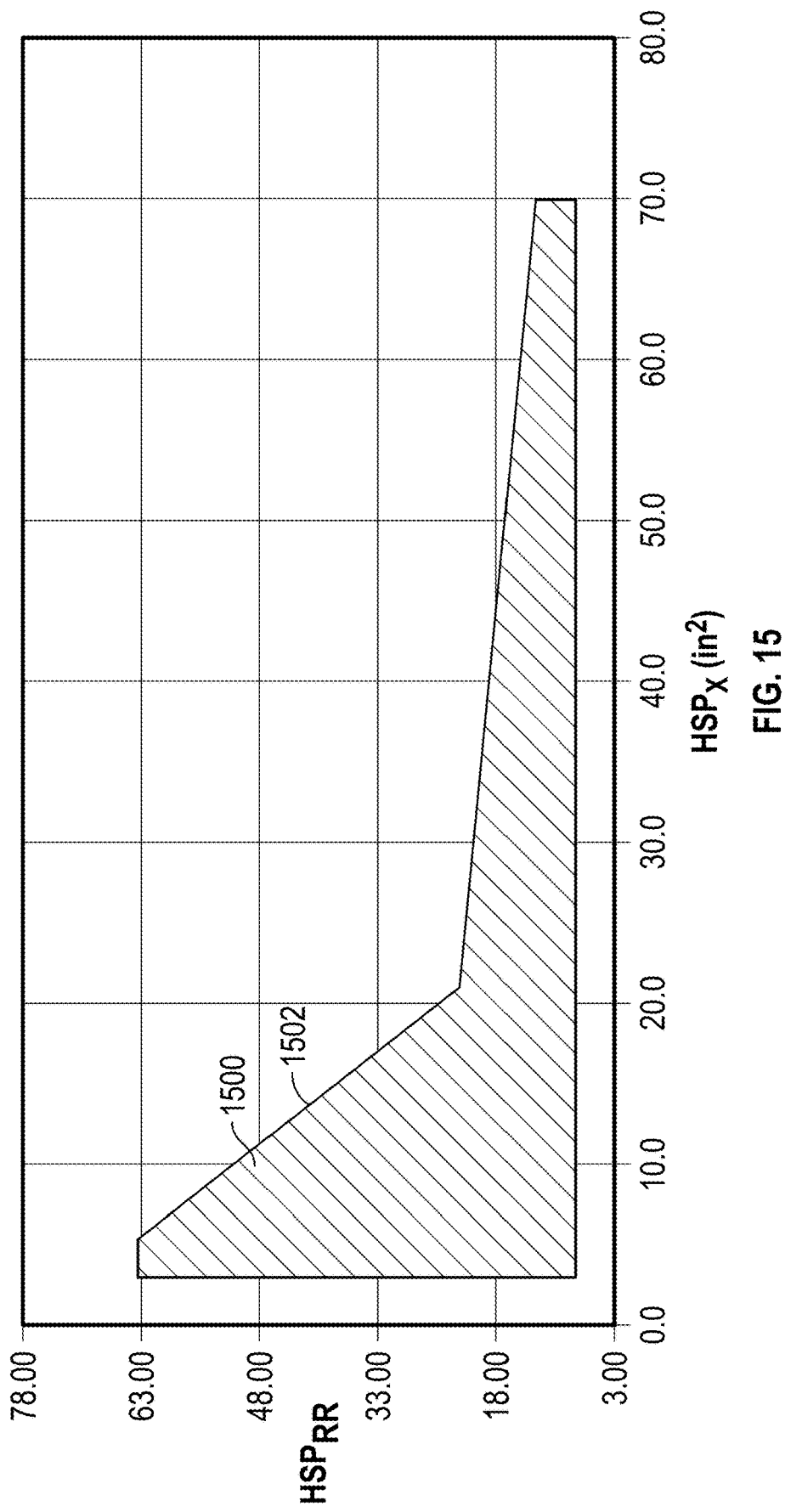
FIG. 15 represents, in graph form, a HP compressor tip radius ratio high-speed shaft rating ($HSP_{RR}$) as a function of the $HSP_X$.

FIG. 15 represents, in graph form, the $HSP_{RR}$ as a function of the $HSP_X$. $HSP_X$ is given by relationship (8) detailed above. $HSP_{RR}$ is in a range from 9.1 to 62.5, and $HSP_X$ is in a range from 3.8 in² to 69.1 in². An area 1500 represents the boundaries of $HSP_{RR}$ and $HSP_X$. $HSP_{RR}$ and $HSP_X$ are bounded by an upper bound 1502. The upper bound 1502 is given by (27):

$$HSP_{RR} < MAX(77-2.6*(HSP_X), 27-0.2*(HSP_X)) \quad (27)$$

With reference to TABLE 6 and FIG. 15, in general, $HSP_{RR}$ increases as $HSP_X$ increases, and $HSP_{RR}$ decreases as $HSP_X$ increases. $HSP_X$ increases with increased $A_{EX}$, increased $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Lower T25 and lower $N2_{R/L}$ result in higher HP compressor pressure ratio with similar work input. Increased radius ratio, reduced blade height, or reduced HP compressor speeds, and lower HP compressor pressure ratios result in diminishing returns on dynamics margin with poorer performance. Accordingly, embodiments 1 to 120 provide for balancing lower T25 with increased radius ratios to meet dynamics margins with improved performance of the engine core (and of the overall engine).

The lower the $HSP_{RR}$, the greater the third mode margin and the lower the HP compressor tip radius ratio for improved performance of the HP compressor and the HP turbine. Thus, the $HSP_{RR}$ is selected for providing a balance among improving the third mode margin of the HP shaft, without overly sacrificing performance of the HP compressor and/or the HP turbine.

Figure 16:
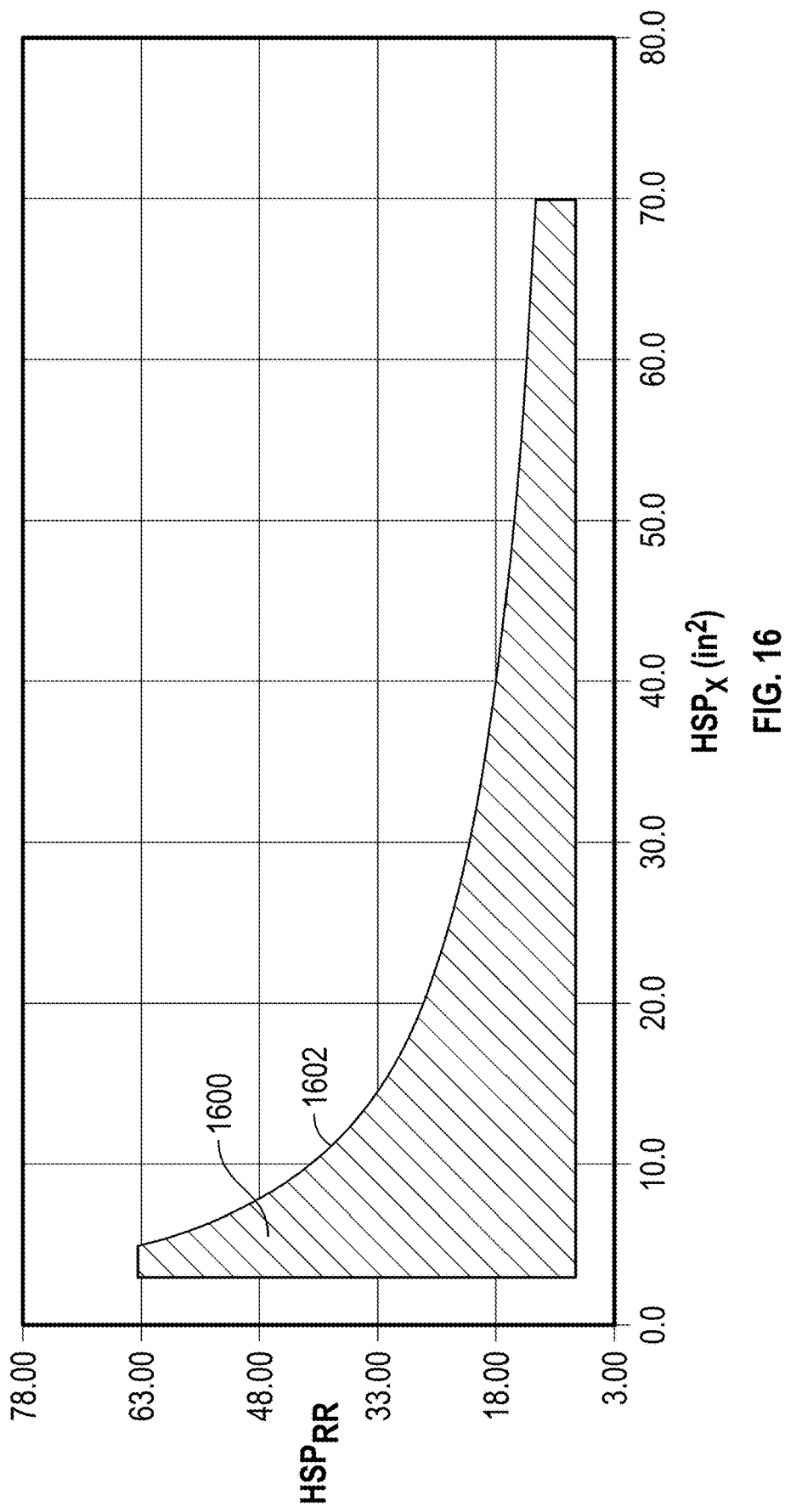
FIG. 16 represents, in graph form, a HP compressor tip radius ratio high-speed shaft rating ($HSP_{RR}$) as a function of the $HSP_X$, according to another embodiment.

FIG. 16 represents, in graph form, the $HSP_{RR}$ as a function of the $HSP_X$, according to another embodiment. $HSP_X$ is given by relationship (8) detailed above. $HSP_{RR}$ is in a range from 9.1 to 62.5, and $HSP_X$ is in a range from 3.8 in² to 69.1 in². An area 1600 represents the boundaries of $HSP_{RR}$ and $HSP_X$. $HSP_{RR}$ and $HSP_X$ are bounded by an upper bound 1602. The upper bound 1602 is given by (28):

$$HSP_{RR} < \frac{165}{HSP_X^{0.6}} \quad (28)$$

With reference to TABLE 6 and FIG. 16, in general, $HSP_{RR}$ increases as $HSP_X$ increases, and $HSP_{RR}$ decreases as $HSP_X$ increases, as detailed above. $HSP_X$ increases with increased $A_{EX}$, increased $OPR_{T/O}$, and decreases with increased $FN_{T/O}$, as detailed above.

Further aspects are provided by the subject matter of the following clauses.

A turbomachine engine comprises an engine core including a high-pressure compressor, a high-pressure turbine, and a combustion chamber in flow communication with the high-pressure compressor and the high-pressure turbine, the engine core having a length ($L_{CORE}$), and the high-pressure compressor having an exit stage diameter ($D_{CORE}$), and a high-pressure shaft coupled to the high-pressure compressor and the high-pressure turbine, the high-pressure shaft characterized by a high-speed shaft rating (HSR) from 1.5 to 6.2, and a ratio of $L_{CORE}/D_{CORE}$ is from 2.1 to 4.3.

The turbomachine engine of the preceding clause, an exhaust gas temperature of the turbomachine engine at redline speeds of the high-pressure shaft being from 1,063° C. to 1,282° C.

The turbomachine engine of any preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $L_{CORE}/D_{CORE}$ being a function of a high-speed shaft operating parameter $HSP_X$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in the high-pressure compressor, $A_{EX}$ is an area of the exit stage of the high-pressure compressor, $P_{AMB}$ is ambient pressure, $OPR_{T/O}$ is an overall pressure ratio of the turbomachine engine at takeoff flight conditions corresponding to a maximum thrust rating for an engine core configuration, and $FN_{T/O}$ is a sea-level static thrust of the turbomachine engine at takeoff flight conditions corresponding to the maximum thrust rating for the engine core configuration.

The turbomachine engine of any preceding clause, $L_{CORE}/D_{CORE}$ being less than MAX(4.8–0.088*($HSP_X$), 3.18–0.015*($HSP_X$)).

The turbomachine engine of any preceding clause, $L_{CORE}/D_{CORE}$ being less than $$\frac{4.08}{(HSP_X - 8)^{0.14}}.$$

The turbomachine engine of any preceding clause, $HSP_X$ being from 3.8 in² to 69.1 in².

The turbomachine engine of any preceding clause, $A_{EX}$ being from 11 in² to 95 in².

The turbomachine engine of any preceding clause, $P_{STD}$ being approximately 14.7 psi.

The turbomachine engine of any preceding clause, $OPR_{T/O}$ being from 26.3 to 82.

The turbomachine engine of any preceding clause, $FN_{T/O}$ being from 12,674 lbf to 107,480 lbf.

The turbomachine engine of any preceding clause, $A_{EX}$ being given by $A_{EX}=\pi*(R_{TIP,EX}^2-R_{HUB,EX}^2)$, where $R_{TIP,EX}$ is a radius of a tip of a high-pressure compressor blade of the exit stage of the high-pressure compressor, and $R_{HUB,EX}$ is a radius of a hub of the high-pressure compressor at the exit stage.

The turbomachine engine of any preceding clause, $R_{TIP,EX}$ being from 4.73 in. to 15.83 in.

The turbomachine engine of any preceding clause, $R_{HUB,EX}$ being from 4.31 in. to 14.85 in.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where $N1_{r/l}$ is a redline speed of the low-pressure shaft, and k is a constant with a value of $10^6$ inch-RPM.

The turbomachine engine of any preceding clause, $HSR_{LP}$ being in a range from 0.8 to 1.6.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft is further characterized by an area ratio high-speed shaft rating ($HSP_{AR}$) from 41 to 228.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP_{AR}$ being a function of a high-speed shaft operating parameter $HSP_X$, and $HSP_X$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in the high-pressure compressor, $A_{EX}$ is an area of the exit stage of the high-pressure compressor, $P_{STD}$ is ambient pressure, $OPT_{T/O}$ is an overall pressure ratio of the turbomachine engine at takeoff flight conditions corresponding to the maximum thrust rating for an engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP_{AR}$ being less than MAX(280–9*($HSP_X$), 82–0.4*($HSP_X$)).

The turbomachine engine of any preceding clause, $HSP_{AR}$ being less than $$\frac{350}{(HSP_X - 4)^{0.5}}.$$

The turbomachine engine of any preceding clause, $HSP_X$ being from 3.8 in² to 69.1 in².

The turbomachine engine of any preceding clause, $A_{EX}$ being from 11 in² to 95 in², $P_{STD}$ is approximately 14.7 psi, $OPR_{T/O}$ is from 26.3 to 82, and $FN_{T/O}$ is from 12,674 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP_{AR}$ being given by:

$$HSP_{AR} = \frac{\left(\frac{L_{core}}{D_{core}}\right)^2 * AR}{\sqrt{\frac{R_{HUB,IN}}{R_{TIP,IN}}} * \sqrt{\frac{R_{TIP,EX}}{R_{TIP,IN}}}},$$

where AR is an area ratio of the high-pressure compressor and is the ratio of the area at an inlet of the high-pressure compressor to the area at an exit of the high-pressure compressor $(A_{IN}/A_{EX})$, $R_{HUB,IN}$ is a radius of a hub at the inlet of the high-pressure compressor, $R_{TIP}IN$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core $(L_{CORE}/D_{CORE})$ being from 2.1 to 4.3.

The turbomachine engine of any preceding clause, $R_{HUB,IN}/R_{TIP,IN}$ being a high-pressure compressor inlet radius ratio, and the high-pressure compressor inlet radius ratio is from 0.4 to 0.6.

The turbomachine engine of any preceding clause, $R_{TIP,EX}/R_{TIP,IN}$ being a high-pressure compressor tip radius ratio, and the high-pressure compressor tip radius ratio is from 0.75 to 1.00.

The turbomachine engine of any preceding clause, AR being from 5.6 to 13.9.

The turbomachine engine of any preceding clause, $A_{IN}$ being from 85 in$^2$ to 703 in$^2$.

The turbomachine engine of any preceding clause, $A_{EX}$ being from 11 in$^2$ to 95 in$^2$.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by $$HSR_{LP} = \frac{1}{k} * N1_{r/l} * D_{CORE} * \left(\frac{L_{CORE}}{D_{CORE}}\right)^2,$$

where $N1_{r/l}$ is a redline speed of the low-pressure shaft, and k is a constant with a value of $10^6$ inch-RPM.

The turbomachine engine of any preceding clause, $HSR_{LP}$ being in a range from 0.8 to 1.6.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft being further characterized by an inlet area high-speed shaft rating parameter ($HSP\_A_{IN}$) from 1,038 in$^2$ to 5,017 in$^2$.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP\_A_{IN}$ being a function of a high-speed shaft operating parameter ($HSP_{X1}$), and $HSP_{X1}$ is given by:

$$HSP_{X1} = \frac{A_{ex} * 1000}{FN_{T/O} * (N_{Stg}/10)^2},$$

where $N_{Stg}$ is the number of stages in the high-pressure compressor, $A_{EX}$ is an area of the exit stage of the high-pressure compressor, and $FN_{T/O}$ is a sea-level static thrust of the turbomachine engine at takeoff flight conditions corresponding to the maximum thrust rating for an engine core configuration.

The turbomachine engine of any preceding clause, $HSP\_A_{IN}$ being less than $$\text{MAX}\left(\frac{4200}{(HSP_{X1})^{1.5}}, 2850 - 500 * (HSP_{X1})\right).$$

The turbomachine engine of any preceding clause, $HSP_{X1}$ being from 0.4 to 2.79.

The turbomachine engine of any preceding clause, $A_{EX}$ being from 11 in$^2$ to 95 in$^2$.

The turbomachine engine of any preceding clause, $FN_{T/O}$ being from 12,674 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP\_A_{IN}$ being given by:

$$HSP\_A_{IN} = \frac{\left(\frac{L_{core}}{D_{core}}\right)^2 * A_{IN}}{\sqrt{\frac{R_{HUB,IN}}{R_{TIP,IN}}} * \sqrt{\frac{R_{TIP,EX}}{R_{TIP,IN}}}},$$

where $A_{IN}$ is the area at an inlet of the high-pressure compressor, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,IN}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $A_{IN}$ being from 85 in² to 703 in².

The turbomachine engine of any preceding clause, $R_{HUB,IN}/R_{TIP,IN}$ being a high-pressure compressor inlet radius ratio, and the high-pressure compressor inlet radius ratio is from 0.4 to 0.6.

The turbomachine engine of any preceding clause, $R_{TIP,EX}$ being from 4.73 in. to 15.83 in.

The turbomachine engine of any preceding clause, $R_{TIP,IN}$ being from 5.68 in. to 16.32 in.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where $N1_{r/l}$ is a redline speed of the low-pressure shaft, and k is a constant $D_{CORE}$ with a value of $10^6$ inch-RPM.

The turbomachine engine of any preceding clause, $HSR_{LP}$ being in a range from 0.8 to 1.6

The turbomachine engine of any preceding clause, the redline speed of the low-pressure shaft being from 6,345 RPM to 13,225 RPM.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft being further characterized by an exit rim speed high-speed shaft rating ($HSP\_U_{RIM,R/L}$) from 0.09 to 1.00 in$^{-2/3}$(ft/s/° R)$^{-3}$.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, $HSP\_U_{RIM,R/L}$ being a function of a high-speed shaft operating parameter ($HSP_X$), and $HSP_X$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in the high-pressure compressor, $A_{EX}$ is an area of the exit stage of the high-pressure compressor, $P_{STD}$ is standard pressure, $OPR_{T/O}$ is an overall pressure ratio of the turbomachine engine at takeoff flight conditions corresponding to the maximum thrust rating for a engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP\_U_{RIM,R/L}$ being less than $$\frac{6.6}{(HSP_x)}.$$

The turbomachine engine of any preceding clause, $HSP\_U_{RIM,R/L}$ being less than $$\frac{2.9}{HSP_X^{0.75}}.$$

The turbomachine engine of any preceding clause, $HSP_X$ being from 3.8 in² to 69.1 in².

The turbomachine engine of any preceding clause, $A_{EX}$ being from 11 in² to 95 in², $P_{AMB}$ is approximately 14.7 psi, $OPR_{T/O}$ is from 26.3 to 82, and $FN_{T/O}$ is from 12,674 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP\_U_{RIM,R/L}$ being given by:

$$HSP\_U_{RIM,R/L} = \frac{\left(\frac{L_{CORE}}{D_{CORE}}\right)^2}{N_{stg} * A_{F,IN}^{1/3}} * \left(\frac{T3_{T/O}}{U_{RIM,R/L}}\right)^3,$$

where $N_{Stg}$ is a number of stages of the high-pressure compressor, $T3_{T/O}$ is a temperature at the exit of the high-pressure compressor at takeoff flight conditions, $A_{F,IN}$ is a frontal area of the high-pressure compressor, and $U_{RIM,R/L}$ is an exit rim speed of the high-pressure compressor at redline speeds of the high-pressure shaft.

The turbomachine engine of any preceding clause, a ratio of the length of the engine core to the diameter of the engine core ($L_{CORE}/D_{CORE}$) being from 2.1 to 4.3.

The turbomachine engine of any preceding clause, $N_{stg}$ being eight stages, nine stage, ten stage, or eleven stages.

The turbomachine engine of any preceding clause, $A_{F,IN}$ being from 101 to 837.

The turbomachine engine of any preceding clause, $U_{RIM,R/L}$ being given by:

$$U_{RIM,R/L} = \frac{\pi * N2_{R/L}}{30} * \frac{R_{HUB,EX}}{12},$$

where $R_{HUB,EX}$ is a radius of a hub at an exit stage of the high-pressure compressor.

The turbomachine engine of any preceding clause, $T3_{T/O}$ being given by:

$$T3_{T/O} = T25_{T/O} * (3.465 * AR - 5.7)^{\frac{\gamma-1}{\gamma * \eta_{Poly}}},$$

where $T25_{T/O}$ is a temperature at an inlet of the high-pressure compressor, AR is an area ratio of the high-pressure compressor and is the ratio of the area at the inlet of the high-pressure compressor to the area at an exit of the high-pressure compressor ($A_{IN}/A_{EX}$), $\gamma$ is a gas constant of air and is equal to 1.37, and $\eta_{Poly}$ is a compressor efficiency of the high-pressure compressor and is approximately equal to 0.9.

The turbomachine engine of any preceding clause, AR being from 5.6 to 13.9.

The turbomachine engine of any preceding clause, $T25_{T/O}$ being from 579° R to 803° R.

The turbomachine engine of any preceding clause, $T25_{T/O}$ being given by:

$$T25_{T/O} = T_{ISA} * \left(\frac{1.25 * OPR_{T/O}}{3.465 * AR - 5.7}\right)^{\frac{\gamma-1}{\gamma * \eta_{Poly}}} + T_{IC},$$

where $T_{ISA}$ is ambient temperature and is approximately equal to 545.67° R, $OPR_{T/O}$ is an overall pressure ratio of the turbomachine engine at takeoff flight conditions corresponding to the maximum thrust rating for a engine core configuration, $\gamma$ is a gas constant of air and is equal to 1.37, $\eta_{Poly}$ is an overall compression efficiency of the turbomachine engine and is approximately equal to 0.9, and $T_{IC}$ is an intercooler temperature upstream of the high-pressure compressor.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where $N1_{r/l}$ is a redline speed of the low-pressure shaft, k is a constant with a value of $10^6$ inch-RPM, and $HSR_{LP}$ is in a range from 0.8 to 1.6.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft being further characterized by a radius ratio high-speed shaft rating ($HSP_{RR}$) from 9.1 to 62.5.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP_{RR}$ being a function of a high-speed shaft operating parameter ($HSP_X$), and $HSP_X$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in HP compressor, $A_{EX}$ is an area of the exit stage of the high-pressure compressor, $P_{STD}$ is standard pressure, $OPR_{T/O}$ is an overall pressure ratio of the turbomachine engine at takeoff flight conditions corresponding to the maximum thrust rating for an engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP_{RR}$ being less than MAX(77−2.6*($HSP_X$), 27−0.2*($HSP_X$)).

The turbomachine engine of any preceding clause, $HSP_{RR}$ being less than $$\frac{165}{HSP_X^{0.6}}.$$

The turbomachine engine of any preceding clause, $HSP_X$ being from 3.8 in² to 69.1 in².

The turbomachine engine of any preceding clause, $A_{EX}$ being from 11 in² to 95 in², $P_{AMB}$ is approximately 14.7 psi, $OPR_{T/O}$ is from 26.3 to 82, and $FN_{T/O}$ is from 12,674 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP_{RR}$ being given by:

$$HSP_{RR} = \frac{\left(\frac{L_{core}}{D_{core}} * \frac{T25_{T/O}}{T_{STD}}\right)^2}{\sqrt{\frac{R_{HUB,IN}}{R_{TIP,IN}}} * \sqrt{\frac{R_{TIP,EX}}{R_{TIP,IN}}}},$$

where $T25_{T/O}$ is a temperature at an inlet of the high-pressure compressor, $T_{STD}$ is standard day temperature and is equal to 518.67° R, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $R_{HUB,IN}/R_{TIP,IN}$ being a high-pressure compressor inlet radius ratio, and the high-pressure compressor inlet radius ratio is from 0.4 to 0.6.

The turbomachine engine of any preceding clause, $R_{TIP,EX}/R_{TIP,IN}$ being a high-pressure compressor tip radius ratio, and the high-pressure compressor tip radius ratio is from 0.75 to 1.0.

The turbomachine engine of any preceding clause, $T25_{T/O}$ being from 579° R to 803° R.

The turbomachine engine of any preceding clause, $T25_{T/O}$ being given by:

$$T25_{T/O} = T_{ISA} * \left( \frac{1.25 * OPR_{T/O}}{3.465 * AR - 5.7} \right)^{\frac{\gamma - 1}{\gamma * \eta_{Poly}}} + T_{IC},$$

where $T_{ISA}$ is ambient temperature and is approximately equal to 545.67° R, $OPR_{T/O}$ is an overall pressure ratio of the turbomachine engine at takeoff flight conditions corresponding to a maximum thrust rating for an engine core configuration, $\gamma$ is a gas constant of air and is equal to 1.37, $\eta_{Poly}$ is an overall compression efficiency of the turbomachine engine and is approximately equal to 0.9, and $T_{IC}$ is an intercooler temperature upstream of the HP compressor.

The turbomachine engine of any preceding clause, $OPR_{T/O}$ being from 26.3 to 82.

The turbomachine engine of any preceding clause, $T_{IC}$ being from −100° R to 0° R.

The turbomachine engine of any preceding clause, AR being from 5.6 to 13.9.

The turbomachine engine of any preceding clause, wherein the high-pressure shaft first mode margin with respect to the low-pressure shaft redline speed is given by:

$$-0.1 > \left( \frac{0.55}{(HSR_{LP})^2} + LST \right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$-0.2 > \left( \frac{0.55}{(HSR_{LP})^2} + LST \right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$-0.3 > \left( \frac{0.55}{(HSR_{LP})^2} + LST \right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$\left( \frac{0.55}{(HSR_{LP})^2} + LST \right) > -0.1,$$

wherein LST accounts for the effects that the HPC pressure ratio and the HPC exit temperature can have on the first mode.

The turbomachine engine of any preceding clause, wherein LST is from −0.15 to −0.67.

The turbomachine engine of any preceding clause, wherein the high-pressure shaft second mode margin with respect to the high-pressure shaft redline speed is given by:

$$\left( -0.1215 * HSR + \left( \frac{2 * HST - 1}{3} \right) \right) < -0.1,$$

wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: −0.1>(−0.1822*HSR+HST)>0, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: −0.2>(−0.1822*HSR+HST)>0, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: −0.3>(−0.1822*HSR+HST)>0, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: (−0.1822*HSR+HST)>−0.1, wherein HST accounts for the effects that the HPC pressure ratio and the HPC exit temperature have on the third mode.

The turbomachine engine of any preceding clause, wherein HST is from 0.46 to 0.78.

The turbomachine engine of any preceding clause, wherein HST is given by: $HST=-0.726*T25/T_{STD}+1.61$, wherein T25 is from 615° R to 855° R and $T_{STD}$ is the standard temperature defined by a constant value of 518.67° R The turbomachine engine of any preceding clause, further comprising a power turbine and a low-pressure shaft coupled to the power turbine, the high-pressure shaft being characterized by a second high-pressure shaft rating ($HSR_{LP}$) given by:

$$HSR_{LP} = \frac{1}{k} * N1_{r/l} * D_{CORE} * \left( \frac{L_{CORE}}{D_{CORE}} \right)^2,$$

where $N1_{r/l}$ is a redline speed of the low-pressure shaft, k is a constant with a value of $10^6$ inch-RPM, and $HSR_{LP}$ is in a range from 0.8 to 1.6.

The turbomachine engine of any preceding clause, further comprising an intermediate-pressure turbine, an intermediate-pressure compressor, and an intermediate-pressure shaft coupled to the intermediate-pressure turbine and the intermediate-pressure compressor.

The turbomachine engine of any preceding clause, further comprising an intercooler between the high-pressure compressor and the low-pressure compressor.

The turbomachine engine of any preceding clause, further comprising a fan, the fan being directly coupled to the low-pressure shaft.

The turbomachine engine of any preceding clause, further comprising a fan and a gearbox assembly, the fan coupled to the low-pressure shaft through the gearbox assembly.

The turbomachine engine of any preceding clause, the turbomachine engine being a ducted turbine engine.

The turbomachine engine of any preceding clause, the turbomachine engine being an unducted turbine engine.

The turbomachine engine of any preceding clause, the turbomachine engine being a three stream turbine engine.

The turbomachine engine of any preceding clause, the fan including a plurality of fan blades, the plurality of fan blades being configured to pitch about a pitch axis.

The turbomachine engine of any preceding clause, the turbomachine engine including a counter rotating low-pressure architecture in which two shafts of the turbomachine engine rotate in opposite directions and pass through the engine core.

The turbomachine engine of any preceding clause, the turbomachine engine including a vaneless counter rotating turbine.

The turbomachine engine of any preceding clause, $L_{CORE}$ being from 36 in. to 67 in.

The turbomachine engine of any preceding clause, at least one of the high-pressure compressor, the high-pressure turbine, or the power turbine including a ceramic matrix composite (CMC) material.

The turbomachine engine of the preceding clause, the power turbine including the CMC material.

The turbomachine engine of the preceding clause, the CMC material being a first CMC material, and the high-pressure turbine including the first CMC material or a second CMC material.

The turbomachine engine of the preceding clause, the high-pressure compressor including the first CMC material or the second CMC material or a third CMC material.

The turbomachine engine of any preceding clause, the high-pressure turbine including the CMC material.

The turbomachine engine of the preceding clause, the high-pressure turbine including at least one nozzle and at least one airfoil, the at least one nozzle, the at least one airfoil, or both the at least one nozzle and the at least one airfoil including the CMC material.

The turbomachine engine of any preceding clause, the high-pressure turbine having one stage or two stages, and at least one stage including the CMC material.

The turbomachine engine of any preceding clause, the CMC material being a first CMC material, and the power turbine including the first CMC material or a second CMC material.

The turbomachine engine of any preceding clause, the high-pressure compressor including the first CMC material or the second CMC material or a third CMC material.

The turbomachine engine of any preceding clause, the high-pressure compressor including the CMC material.

The turbomachine engine of any preceding clause, the high-pressure compressor having eight stages, nine stages, ten stages, or eleven stages, and at least one stage including the CMC material.

The turbomachine engine of any preceding clause, the high-pressure compressor having nine stages and at least one stage of the nine stages includes the CMC material.

The turbomachine engine of any preceding clause, the CMC material being a first CMC material, and the high-pressure turbine including the first CMC material or a second CMC material.

The turbomachine engine of any preceding clause, the power turbine including the first CMC material, the second CMC material, or a third CMC material.

The turbomachine engine of any preceding clause, the first CMC material and the second CMC material being the same materials.

The turbomachine engine of any preceding clause, the first CMC material and the second CMC material being different materials.

The turbomachine engine of any preceding clause, the third CMC material being the same material as the first CMC material, the second CMC material, or both the first CMC material and the second CMC material.

The turbomachine engine of any preceding clause, the third CMC material being a different material than the first CMC material, the second CMC material, or both the first CMC material and the second CMC material.

A method of operating the turbomachine engine of any preceding clause, the method comprising operating the turbomachine engine to generate an engine thrust, a redline speed of the high-pressure shaft being from 10,580 RPM to 35,788 RPM.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbomachine engine comprising:
an engine core including a high-pressure compressor, a high-pressure turbine, and a combustion chamber in flow communication with the high-pressure compressor and the high-pressure turbine, wherein the engine core further includes a core forward bearing and a core aft bearing, the core forward bearing being positioned forward of a stage of the high-pressure compressor and the core aft bearing being positioned aft of a stage of the high-pressure turbine, and the length ($L_{CORE}$) of the engine core is defined from the core forward bearing to the core aft bearing, and the diameter ($D_{CORE}$) of the engine core is an exit stage diameter of the high-pressure compressor; and
a high-pressure shaft coupled to the high-pressure compressor and the high-pressure turbine, the high-pressure shaft characterized by a high-speed shaft rating (HSR) from 1.5 to 6.2, and wherein the high-pressure shaft is further characterized by an inlet area high-speed shaft rating parameter ($HSP\_A_{IN}$) that is greater than or equal to 1,038 in$^2$ and less than $$\text{MAX}\left(\frac{4200}{(HSP_{X1})^{1.5}}, 2850 - 500*(HSP_{X1})\right),$$

wherein HSR is given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM, $HSP\_A_{IN}$ is given by:

$$\frac{\left(\frac{L_{CORE}}{D_{CORE}}\right)^2 * A_{IN}}{\sqrt{\frac{R_{HUB,IN}}{R_{TIF,IN}}} * \sqrt{\frac{R_{TIP,EX}}{R_{TIP,IN}}}},$$

wherein $A_{IN}$ is an area at an inlet of the high-pressure compressor, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor, and $HSP_{X1}$ is a high-speed shaft operating parameter and is given by:

$$HSP_{X1} = \frac{A_{ex} * 1000}{FN_{\frac{T}{O}} * \left(\frac{N_{Stg}}{10}\right)^2},$$

where $N_{Stg}$ is a number of stages in the high-pressure compressor, $A_{EX}$ is an area of an exit stage of the high-pressure compressor, and $FN_{T/O}$ is a sea-level static thrust of the turbomachine engine at takeoff flight conditions corresponding to the maximum thrust rating for the engine core configuration.

2. The turbomachine engine of claim 1, wherein the high-pressure compressor includes eight stages, nine stages, ten stages, or eleven stages.

3. The turbomachine engine of claim 1, wherein the high-pressure turbine includes one stage or two stages.

4. The turbomachine engine of claim 1, wherein $HSP_{X1}$ is from 0.4 to 2.79.

5. The turbomachine engine of claim 1, wherein $A_{EX}$ is from 11 in$^2$ to 95 in$^2$.

6. The turbomachine engine of claim 1, wherein $FN_{T/O}$ is from 12,674 lbf to 107,480 lbf.

7. The turbomachine engine of claim 1, wherein $N2_{R/L}$ is from 10,580 RPM to 35,788 RPM.

8. The turbomachine engine of claim 1, wherein $L_{CORE}/D_{CORE}$ is from 2.1 to 4.3.

9. The turbomachine engine of claim 1, wherein Arm is from 85 in$^2$ to 703 in$^2$.

10. The turbomachine engine of claim 1, wherein $R_{HUB,IN}/R_{TIP,IN}$ is a high-pressure compressor inlet radius ratio, and the high-pressure compressor inlet radius ratio is from 0.4 to 0.6.

11. The turbomachine engine of claim 1, wherein $R_{TIP,EX}$ is from 4.73 in. to 15.83 in.

12. The turbomachine engine of claim 1, wherein $R_{TIP,IN}$ is from 5.68 in. to 16.32 in.

13. A turbomachine engine comprising:
an engine core including a high-pressure compressor, a high-pressure turbine, and a combustion chamber in flow communication with the high-pressure compressor and the high-pressure turbine, wherein the engine core further includes a core forward bearing and a core aft bearing, the core forward bearing being positioned forward of a stage of the high-pressure compressor and the core aft bearing being positioned aft of a stage of the high-pressure turbine, and the length ($L_{CORE}$) of the engine core is defined from the core forward bearing to the core aft bearing, and the diameter ($D_{CORE}$) of the engine core is an exit stage diameter of the high-pressure compressor;
a power turbine in flow communication with the high-pressure turbine;
a low-pressure shaft coupled to the power turbine; and
a high-pressure shaft coupled to the high-pressure compressor and the high-pressure turbine, the high-pressure shaft characterized by a high-speed shaft rating (HSR) from 1.5 to 6.2, and wherein the high-pressure shaft is further characterized by an inlet area high-speed shaft rating parameter ($HSP\_A_{IN}$) that is greater than or equal to 1,038 in$^2$ and less than $$\text{MAX}\left(\frac{4200}{(HSP_{X1})^{1.5}}, 2850 - 500*(HSP_{X1})\right),$$

wherein HSR is given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM, $HSP\_A_{IN}$ is given by:

$$\frac{\left(\frac{L_{CORE}}{D_{CORE}}\right)^2 * A_{IN}}{\sqrt{\frac{R_{HUB,IN}}{R_{TIF,IN}}} * \sqrt{\frac{R_{TIP,EX}}{R_{TIP,IN}}}},$$

wherein $A_{IN}$ is an area at an inlet of the high-pressure compressor, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor, and $HSP_{X1}$ is a high-speed shaft operating parameter and is given by:

$$HSP_{X1} = \frac{A_{ex} * 1000}{FN_{\frac{T}{O}} * \left(\frac{N_{Stg}}{10}\right)^2},$$

where $N_{Stg}$ is a number of stages in the high-pressure compressor, $A_{EX}$ is an area of an exit stage of the high-pressure compressor, and $FN_{T/O}$ is a sea-level static thrust of the turbomachine engine at takeoff flight conditions corresponding to the maximum thrust rating for the engine core configuration.

14. The turbomachine engine of claim 13, wherein $N2_{R/L}$ is from 10,580 RPM to 35,788 RPM.

15. The turbomachine engine of claim 13, wherein $HSP_{X1}$ is from 0.4 to 2.79.

16. The turbomachine engine of claim 13, wherein $A_{EX}$ is from 11 in² to 95 in² and $FN_{T/O}$ is from 12,674 lbf to 107,480 lbf.

17. The turbomachine engine of claim 13, wherein $L_{CORE}/D_{CORE}$ is from 2.1 to 4.3.

18. The turbomachine engine of claim 13, wherein $A_{IN}$ is from 85 in² to 703 in², $R_{HUB,IN}/R_{TIP,IN}$ is from 0.4 to 0.6, $R_{TIP,EX}$ is from 4.73 in. to 15.83 in., and $R_{TIP,IN}$ is from 5.68 in. to 16.32 in.

19. The turbomachine engine of claim 13, wherein the high-pressure shaft is characterized by a second high-pressure shaft rating ($HSR_{LP}$) given by:

$$HSR_{LP} = \frac{1}{k} * N1_{\frac{r}{l}} * D_{CORE} * \left(\frac{L_{CORE}}{D_{CORE}}\right)^2,$$

where $N1_{r/l}$ is a redline speed of the low-pressure shaft, and k is a constant with a value of $10^6$ inch-RPM.

20. The turbomachine engine of claim 19, wherein $HSR_{LP}$ is in a range from 0.8 to 1.6.

21. The turbomachine engine of claim 19, wherein $N1_{r/l}$ is from 6,345 RPM to 13,225 RPM.

22. A turbomachine engine comprising:

an engine core including a high-pressure compressor, a high-pressure turbine, and a combustion chamber in flow communication with the high-pressure compressor and the high-pressure turbine, wherein a number of stages in the high-pressure compressor is one of eight stages, nine stages, ten stages, or eleven stages, and the high-pressure turbine includes one stage or two stages, wherein the engine core further includes a core forward bearing and a core aft bearing, the core forward bearing being positioned forward of a stage of the high-pressure compressor and the core aft bearing being positioned aft of a stage of the high-pressure turbine, and the length ($L_{CORE}$) of the engine core is defined from the core forward bearing to the core aft bearing, and the diameter ($D_{CORE}$) of the engine core is an exit stage diameter of the high-pressure compressor; and a high-pressure shaft coupled to the high-pressure compressor and the high-pressure turbine, the high-pressure shaft characterized by a high-speed shaft rating (HSR) from 1.5 to 6.2, and wherein the high-pressure shaft is further characterized by an inlet area high-speed shaft rating parameter ($HSP\_A_{IN}$) that is greater than or equal to 1,038 in² and less than $$\text{MAX}\left(\frac{4200}{(HSP_{X1})^{1.5}}, 2850 - 500 * (HSP_{X1})\right),$$

wherein HSR is given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM, $HSP\_A_{IN}$ is given by:

$$\frac{\left(\frac{L_{CORE}}{D_{CORE}}\right)^2 * A_{IN}}{\sqrt{\frac{R_{HUB,IN}}{R_{TIP,IN}}} * \sqrt{\frac{R_{TIP,EX}}{R_{TIP,IN}}}},$$

wherein $A_{IN}$ is an area at an inlet of the high-pressure compressor, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor, and $HSP_{X1}$ is a high-speed shaft operating parameter and is given by:

$$HSP_{X1} = \frac{A_{ex} * 1000}{FN_{\frac{T}{O}} * \left(\frac{N_{Stg}}{10}\right)^2},$$

where $N_{Stg}$ is a number of stages in the high-pressure compressor, $A_{EX}$ is an area of an exit stage of the high-pressure compressor, and $FN_{T/O}$ is a sea-level static thrust of the turbomachine engine at takeoff flight conditions corresponding to the maximum thrust rating for the engine core configuration.

23. The turbomachine engine of claim 22, wherein $N2_{R/L}$ is from 10,580 RPM to 35,788 RPM.

24. The turbomachine engine of claim 22, wherein $HSP_{X1}$ is from 0.4 to 2.79.

25. The turbomachine engine of claim 22, wherein $A_{EX}$ is from 11 in² to 95 in² and $FN_{T/O}$ is from 12,674 lbf to 107,480 lbf.

26. The turbomachine engine of claim 22, wherein $L_{CORE}/D_{CORE}$ is from 2.1 to 4.3.

27. The turbomachine engine of claim 22, wherein $A_{IN}$ is from 85 in² to 703 in², $R_{HUB,IN}/R_{TIP,IN}$ is from 0.4 to 0.6, $R_{TIP,EX}$ is from 4.73 in. to 15.83 in., and $R_{TIP,IN}$ is from 5.68 in. to 16.32 in.

* * * * *